United States Patent
Ceribelli et al.

(10) Patent No.: US 11,803,886 B2
(45) Date of Patent: **\*Oct. 31, 2023**

(54) SYSTEM AND METHOD FOR ENHANCED ACCESS AND CONTROL FOR CONNECTING ENTITIES AND EFFECTING PAYMENTS IN A COMMERCIALLY ORIENTED ENTITY NETWORK

(71) Applicant: Bill.com LLC, San Jose, CA (US)

(72) Inventors: Henrique Pedreira de Freitas Ceribelli, Redwood City, CA (US); Eric Chan, Hayward, CA (US); Mark Orttung, Menlo Park, CA (US); Darren Linscott, San Jose, CA (US)

(73) Assignee: BILL.COM, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,785

(22) Filed: Jun. 1, 2022

(65) Prior Publication Data

US 2022/0405818 A1  Dec. 22, 2022

Related U.S. Application Data

(63) Continuation of application No. 16/780,437, filed on Feb. 3, 2020, now Pat. No. 11,367,114, which is a continuation of application No. 16/136,591, filed on Sep. 20, 2018, now Pat. No. 10,572,921, which is a continuation of application No. 14/284,314, filed on May 21, 2014, now Pat. No. 10,115,137.

(60) Provisional application No. 61/989,328, filed on May 6, 2014, provisional application No. 61/906,341, filed on Nov. 19, 2013, provisional application No. 61/842,911, filed on Jul. 3, 2013.

(51) Int. Cl.
*G06Q 30/00* (2023.01)
*G06Q 30/0601* (2023.01)
*G06Q 50/00* (2012.01)

(52) U.S. Cl.
CPC ......... *G06Q 30/0609* (2013.01); *G06Q 50/01* (2013.01)

(58) Field of Classification Search
CPC .................. G06Q 30/0609; G06Q 50/01
See application file for complete search history.

(56) References Cited

U.S. PATENT DOCUMENTS

| | | |
|---|---|---|
| 5,121,945 A | 6/1992 | Thomson et al. |
| 5,558,232 A | 9/1996 | Stevens et al. |
| 5,576,951 A | 11/1996 | Lockwood |
| 5,649,115 A | 7/1997 | Schrader et al. |
| 5,810,173 A | 9/1998 | Stevens et al. |

(Continued)

OTHER PUBLICATIONS

Moss, V. (2006). Ensure OFAC compliance. Credit Union Magazine, 72(2), 56-58. Retrieved from https://search.proquest.com/docview/235987922?accountid=14753.*

(Continued)

*Primary Examiner* — Kathleen Palavecino
(74) *Attorney, Agent, or Firm* — SHOOK, HARDY & BACON L.L.P.

(57) ABSTRACT

Among other things, embodiments of the present disclosure enables corporate entities to connect with each other and enables social networking interactions, credibility rating, identity verification, and/or business transactions between the corporate entities.

18 Claims, 47 Drawing Sheets

(56) References Cited

U.S. PATENT DOCUMENTS

| | | |
|---|---|---|
| 5,832,460 A | 11/1998 | Bednar et al. |
| 5,920,847 A | 7/1999 | Kolling et al. |
| 5,926,392 A | 7/1999 | York et al. |
| 5,933,817 A | 8/1999 | Hucal |
| 5,956,700 A | 9/1999 | Landry |
| 6,016,486 A | 1/2000 | Nicholas |
| 6,044,362 A | 3/2000 | Neely |
| 6,046,486 A | 4/2000 | McNamara et al. |
| 6,058,380 A | 5/2000 | Anderson et al. |
| 6,067,538 A | 5/2000 | Zorba et al. |
| 6,108,513 A | 8/2000 | Landa et al. |
| 6,285,991 B1 | 9/2001 | Powar |
| 6,289,319 B1 | 9/2001 | Lockwood |
| 6,292,789 B1 | 9/2001 | Schutzer |
| 6,304,860 B1 | 10/2001 | Martin, Jr. et al. |
| 6,343,275 B1 | 1/2002 | Wong |
| 6,360,951 B1 | 3/2002 | Swinehart |
| 6,366,927 B1 | 4/2002 | Meek et al. |
| 6,385,595 B1 | 5/2002 | Kolling et al. |
| 6,408,284 B1 | 6/2002 | Hilt et al. |
| 6,616,458 B1 | 9/2003 | Walker et al. |
| 6,639,980 B1 | 10/2003 | Weiss et al. |
| 6,640,226 B1 | 10/2003 | Shringeri et al. |
| 6,650,767 B2 | 11/2003 | Jones et al. |
| 6,704,714 B1 | 3/2004 | O'Leary et al. |
| 6,790,606 B1 | 9/2004 | Lau |
| 6,970,606 B2 | 11/2005 | Lee et al. |
| 7,004,393 B2 | 2/2006 | Schum et al. |
| 7,117,172 B1 | 10/2006 | Black |
| 7,177,828 B1 | 2/2007 | Land et al. |
| 7,308,434 B2 | 12/2007 | Braverman |
| 7,317,823 B1 | 1/2008 | Price et al. |
| 7,379,912 B1 | 5/2008 | Camin et al. |
| 7,386,484 B1 | 6/2008 | Cuzzocrea |
| 7,412,412 B2 | 8/2008 | Buxton et al. |
| 7,472,090 B1 | 12/2008 | White |
| 7,509,285 B1 | 3/2009 | Maniar et al. |
| 7,512,564 B1 | 3/2009 | Geer |
| 7,515,697 B2 | 4/2009 | Eng et al. |
| 7,536,325 B2 | 5/2009 | Randell et al. |
| 7,606,766 B2 | 10/2009 | Anderson et al. |
| 7,637,423 B2 | 12/2009 | Meidell et al. |
| 7,637,427 B2 | 12/2009 | Weiss |
| 7,668,363 B2 | 2/2010 | Price et al. |
| 7,767,925 B2 | 8/2010 | DiBiaso et al. |
| 7,792,717 B1 | 9/2010 | Hankins et al. |
| 7,792,749 B2 | 9/2010 | Ganesan |
| 7,809,615 B2 | 10/2010 | Hui et al. |
| 7,809,616 B1 | 10/2010 | Orttung et al. |
| 7,881,962 B2 | 2/2011 | Mason |
| 7,945,491 B2 | 5/2011 | Sharma |
| 7,978,900 B2 | 7/2011 | Nepomniachtchi et al. |
| 7,996,308 B1 | 8/2011 | Bent et al. |
| 8,036,987 B1 | 10/2011 | Grbac et al. |
| 8,045,784 B2 | 10/2011 | Price et al. |
| 8,160,959 B2 | 4/2012 | Rackley, III et al. |
| 8,165,381 B1 | 4/2012 | Ferris et al. |
| 8,195,570 B1 | 6/2012 | Barron et al. |
| 8,200,579 B2 | 6/2012 | Jung et al. |
| 8,275,710 B1 | 9/2012 | Hildebrand |
| 8,311,874 B2 | 11/2012 | Gupta et al. |
| 8,315,900 B2 | 11/2012 | Schwarz et al. |
| 8,473,354 B2 | 6/2013 | Psota et al. |
| 8,521,626 B1 | 8/2013 | Orttung et al. |
| 8,548,849 B1 | 10/2013 | Porter |
| 8,672,220 B2 | 3/2014 | Hanna et al. |
| 8,688,579 B1 | 4/2014 | Ethington et al. |
| 8,738,483 B2 | 5/2014 | Orttung et al. |
| 8,819,789 B2 | 8/2014 | Orttung et al. |
| 8,869,244 B1 | 10/2014 | Sundaram et al. |
| 9,141,991 B2 | 9/2015 | Orttung et al. |
| 9,413,737 B2 | 8/2016 | Orttung et al. |
| 9,633,353 B2 | 4/2017 | Orttung et al. |
| 10,043,201 B2 | 8/2018 | Lacerte et al. |
| 2001/0023414 A1 | 9/2001 | Kumar et al. |
| 2001/0032182 A1 | 10/2001 | Kumar et al. |
| 2001/0051918 A1 | 12/2001 | Mason |
| 2002/0023029 A1 | 2/2002 | Denver |
| 2002/0023055 A1 | 2/2002 | Antognini et al. |
| 2002/0023230 A1 | 2/2002 | Bolnick et al. |
| 2002/0049749 A1 | 4/2002 | Helgeson et al. |
| 2002/0082990 A1 | 6/2002 | Jones |
| 2002/0087428 A1 | 7/2002 | Koide et al. |
| 2002/0087882 A1 | 7/2002 | Schneier et al. |
| 2002/0107792 A1 | 8/2002 | Anderson |
| 2002/0111886 A1 | 8/2002 | Chenevich et al. |
| 2002/0111915 A1 | 8/2002 | Clemens et al. |
| 2002/0111916 A1 | 8/2002 | Coronna et al. |
| 2002/0128967 A1 | 9/2002 | Meyer et al. |
| 2002/0133441 A1 | 9/2002 | Tanaka |
| 2002/0143674 A1 | 10/2002 | Beckman |
| 2002/0143692 A1 | 10/2002 | Heimermann et al. |
| 2002/0143716 A1 | 10/2002 | Byrne et al. |
| 2002/0152170 A1 | 10/2002 | Dutta et al. |
| 2002/0188488 A1 | 12/2002 | Hinkle |
| 2002/0194127 A1 | 12/2002 | Randell et al. |
| 2003/0004760 A1 | 1/2003 | Schiff et al. |
| 2003/0009420 A1 | 1/2003 | Jones |
| 2003/0018567 A1 | 1/2003 | Flitcroft et al. |
| 2003/0033159 A1 | 2/2003 | Altomare |
| 2003/0036991 A1 | 2/2003 | Fortes et al. |
| 2003/0036999 A1 | 2/2003 | Mirlas et al. |
| 2003/0055756 A1 | 3/2003 | Allan |
| 2003/0069933 A1 | 4/2003 | Lim et al. |
| 2003/0093414 A1 | 5/2003 | Litzow et al. |
| 2003/0126079 A1 | 7/2003 | Roberson et al. |
| 2003/0144894 A1 | 7/2003 | Roberson et al. |
| 2003/0177078 A1 | 9/2003 | Koziol et al. |
| 2003/0187800 A1 | 10/2003 | Moore et al. |
| 2003/0191701 A1 | 10/2003 | Haseltine et al. |
| 2003/0220855 A1 | 11/2003 | Lam et al. |
| 2003/0220875 A1 | 11/2003 | Lam et al. |
| 2003/0233321 A1 | 12/2003 | Scolini et al. |
| 2004/0015445 A1 | 1/2004 | Heaven et al. |
| 2004/0034594 A1 | 2/2004 | Thomas et al. |
| 2004/0078271 A1 | 4/2004 | Morano et al. |
| 2004/0098338 A1 | 5/2004 | Uehara et al. |
| 2004/0143547 A1 | 7/2004 | Mersky |
| 2004/0167823 A1 | 8/2004 | Neely et al. |
| 2004/0167853 A1 | 8/2004 | Sharma |
| 2004/0181493 A1 | 9/2004 | Cross et al. |
| 2004/0193537 A1 | 9/2004 | Knapp |
| 2004/0199427 A1 | 10/2004 | van der Loo |
| 2004/0216010 A1 | 10/2004 | Muller |
| 2004/0225609 A1 | 11/2004 | Greene |
| 2004/0236660 A1 | 11/2004 | Thomas et al. |
| 2004/0254835 A1 | 12/2004 | Thomas et al. |
| 2004/0268250 A1 | 12/2004 | Danker et al. |
| 2005/0033615 A1 | 2/2005 | Nguyen et al. |
| 2005/0060260 A1 | 3/2005 | Masuda et al. |
| 2005/0065893 A1 | 3/2005 | Josephson |
| 2005/0075978 A1 | 4/2005 | Leavitt et al. |
| 2005/0091132 A1 | 4/2005 | Phillips et al. |
| 2005/0102608 A1 | 5/2005 | Batres |
| 2005/0108153 A1 | 5/2005 | Thomas et al. |
| 2005/0131816 A1 | 6/2005 | Britto et al. |
| 2005/0144125 A1 | 6/2005 | Erbey et al. |
| 2005/0144126 A1 | 6/2005 | Commodore et al. |
| 2005/0151999 A1 | 7/2005 | Inikori |
| 2005/0152170 A1 | 7/2005 | Yon et al. |
| 2005/0154769 A1 | 7/2005 | Eckart et al. |
| 2005/0161502 A1 | 7/2005 | Smith, Jr. et al. |
| 2005/0171900 A1 | 8/2005 | Onneken |
| 2005/0182735 A1 | 8/2005 | Zager et al. |
| 2005/0289051 A1 | 12/2005 | Allin et al. |
| 2006/0116913 A1 | 6/2006 | Hansan et al. |
| 2006/0116956 A1 | 6/2006 | Leavitt et al. |
| 2006/0248573 A1 | 11/2006 | Pannu et al. |
| 2006/0282381 A1 | 12/2006 | Ritchie |
| 2006/0291446 A1 | 12/2006 | Caldwell et al. |
| 2007/0038564 A1 | 2/2007 | Leavitt et al. |
| 2007/0045930 A1 | 3/2007 | Hayduchok et al. |
| 2007/0067240 A1 | 3/2007 | George |
| 2007/0112674 A1 | 5/2007 | Jones |

(56) References Cited

U.S. PATENT DOCUMENTS

| | | |
|---|---|---|
| 2007/0156557 A1 | 7/2007 | Shao et al. |
| 2007/0174112 A1 | 7/2007 | Thorson |
| 2007/0208640 A1 | 9/2007 | Banasiak et al. |
| 2007/0246528 A1 | 10/2007 | Kubo et al. |
| 2007/0260536 A1 | 11/2007 | Stone |
| 2007/0271160 A1 | 11/2007 | Stone et al. |
| 2007/0288364 A1 | 12/2007 | Gendler |
| 2007/0299780 A1 | 12/2007 | Vanska et al. |
| 2008/0010199 A1 | 1/2008 | Allin et al. |
| 2008/0015982 A1 | 1/2008 | Sokolic et al. |
| 2008/0027844 A1 | 1/2008 | Little et al. |
| 2008/0027965 A1 | 1/2008 | Garrett et al. |
| 2008/0033851 A1 | 2/2008 | Williams et al. |
| 2008/0033878 A1 | 2/2008 | Krikorian et al. |
| 2008/0040264 A1 | 2/2008 | Allin et al. |
| 2008/0040280 A1 | 2/2008 | Davis et al. |
| 2008/0046363 A1 | 2/2008 | Ali et al. |
| 2008/0052138 A1 | 2/2008 | Marsh et al. |
| 2008/0114670 A1 | 5/2008 | Friesen |
| 2008/0114679 A1 | 5/2008 | Burchetta et al. |
| 2008/0123932 A1 | 5/2008 | Jones et al. |
| 2008/0147516 A1 | 6/2008 | Rousso et al. |
| 2008/0162311 A1 | 7/2008 | Hendrix et al. |
| 2008/0168068 A1 | 7/2008 | Hutheesing |
| 2008/0208727 A1 | 8/2008 | McLaughlin et al. |
| 2008/0229218 A1 | 9/2008 | Maeng |
| 2008/0249902 A1 | 10/2008 | Lehman et al. |
| 2008/0249926 A1 | 10/2008 | Sgaraglio et al. |
| 2008/0249936 A1 | 10/2008 | Miller et al. |
| 2008/0249951 A1 | 10/2008 | Gilder et al. |
| 2008/0275779 A1 | 11/2008 | Lakshminarayanan |
| 2008/0281628 A1 | 11/2008 | Flynn |
| 2008/0281702 A1 | 11/2008 | Kirkwood |
| 2008/0288413 A1 | 11/2008 | Weber |
| 2008/0319882 A1 | 12/2008 | Wyle |
| 2009/0006432 A1 | 1/2009 | Bossong-Iselborn |
| 2009/0042175 A1 | 2/2009 | Zorba et al. |
| 2009/0063206 A1 | 3/2009 | Payne et al. |
| 2009/0106152 A1 | 4/2009 | Dill et al. |
| 2009/0132286 A1 | 5/2009 | Blaquier |
| 2009/0132414 A1 | 5/2009 | Philliou et al. |
| 2009/0147516 A1 | 6/2009 | Wang et al. |
| 2009/0164325 A1 | 6/2009 | Bishop et al. |
| 2009/0182605 A1 | 7/2009 | Lappas et al. |
| 2009/0198622 A1 | 8/2009 | Temte et al. |
| 2009/0204519 A1 | 8/2009 | Randell et al. |
| 2009/0204522 A1 | 8/2009 | Meyer et al. |
| 2009/0244600 A1 | 10/2009 | Haycock et al. |
| 2009/0292528 A1 | 11/2009 | Kameyama |
| 2009/0292619 A1 | 11/2009 | Kagan et al. |
| 2009/0307177 A1 | 12/2009 | Tirpak et al. |
| 2009/0319347 A1 | 12/2009 | Albrecht |
| 2009/0319387 A1 | 12/2009 | Keithley et al. |
| 2009/0319402 A1 | 12/2009 | Manista et al. |
| 2009/0328158 A1 | 12/2009 | Ollila et al. |
| 2010/0005195 A1 | 1/2010 | Mendez et al. |
| 2010/0070397 A1 | 3/2010 | Hahn-Carlson et al. |
| 2010/0106592 A1 | 4/2010 | Brown |
| 2010/0114766 A1 | 5/2010 | Gustin et al. |
| 2010/0145839 A1 | 6/2010 | Lam et al. |
| 2010/0161466 A1 | 6/2010 | Gilder |
| 2010/0205063 A1 | 8/2010 | Mersky |
| 2010/0211645 A1 | 8/2010 | Wang et al. |
| 2010/0211741 A1 | 8/2010 | Soni et al. |
| 2010/0268665 A1 | 10/2010 | Lutnick et al. |
| 2010/0306103 A1 | 12/2010 | Hankins et al. |
| 2010/0332385 A1 | 12/2010 | Mersky |
| 2011/0029404 A1 | 2/2011 | Hahn-Carlson et al. |
| 2011/0055780 A1 | 3/2011 | Venell |
| 2011/0131131 A1 | 6/2011 | Griffin et al. |
| 2011/0161218 A1 | 6/2011 | Swift |
| 2011/0173294 A1 | 7/2011 | Jackson |
| 2011/0184843 A1 | 7/2011 | Orttung et al. |
| 2011/0196786 A1 | 8/2011 | Lacerte et al. |
| 2011/0218964 A1 | 9/2011 | Hagan et al. |
| 2011/0270749 A1 | 11/2011 | Bennet et al. |
| 2011/0279851 A1 | 11/2011 | Berger et al. |
| 2011/0282788 A1 | 11/2011 | Allison, Jr. et al. |
| 2011/0283196 A1 | 11/2011 | Berger et al. |
| 2012/0023016 A1 | 1/2012 | Roshan Babu |
| 2012/0041879 A1 | 2/2012 | Kim et al. |
| 2012/0054589 A1 | 3/2012 | Berger et al. |
| 2012/0066613 A1 | 3/2012 | Berger |
| 2012/0078736 A1 | 3/2012 | Denzer et al. |
| 2012/0095873 A1 | 4/2012 | Narang et al. |
| 2012/0150743 A1 | 6/2012 | Isaacson et al. |
| 2012/0150762 A1 | 6/2012 | Ormerod |
| 2012/0203616 A1 | 8/2012 | Lobsenz |
| 2012/0210200 A1 | 8/2012 | Berger et al. |
| 2012/0221403 A1 | 8/2012 | Brown et al. |
| 2012/0296822 A1 | 11/2012 | Jung et al. |
| 2012/0303483 A1 | 11/2012 | Lee et al. |
| 2013/0050767 A1 | 2/2013 | Stuart et al. |
| 2013/0066774 A1 | 3/2013 | Li et al. |
| 2013/0066940 A1 | 3/2013 | Shao |
| 2013/0067017 A1 | 3/2013 | Carriere et al. |
| 2013/0204756 A1 | 8/2013 | Orttung et al. |
| 2013/0226798 A1 | 8/2013 | Orttung et al. |
| 2013/0268434 A1 | 10/2013 | Mohsenzadeh |
| 2014/0012489 A1 | 1/2014 | Pieper et al. |
| 2014/0032402 A1 | 1/2014 | Stern et al. |
| 2014/0129431 A1 | 5/2014 | Orttung et al. |
| 2014/0207637 A1 | 7/2014 | Groarke |
| 2014/0241609 A1 | 8/2014 | Vigue et al. |
| 2014/0258032 A1 | 9/2014 | Psota et al. |
| 2014/0279140 A1 | 9/2014 | Kar |
| 2014/0337188 A1 | 11/2014 | Bennett et al. |
| 2014/0344141 A1 | 11/2014 | Cook |
| 2014/0372295 A1 | 12/2014 | Tatham et al. |
| 2015/0051927 A1 | 2/2015 | Dueser et al. |
| 2015/0120563 A1 | 4/2015 | Smith et al. |
| 2016/0342962 A1 | 11/2016 | Brown et al. |
| 2018/0147516 A1 | 5/2018 | Scaife |

OTHER PUBLICATIONS

"Quickbooks course offered at CMCC", Lewiston Sun Journal, Retrieved from Internet URL: https://www sunjournal.com/2007/09/24/quickbooks-course-offered-cmcc/, accessed on Dec. 27, 2018, pp. 2 (Sep. 24, 2007).

"All About Positive Pay", SafeChecks—Positive Pay, Retrieved from Internet URL: http://www.positivepay.net, accessed on May 4, 2020, p. 1.

"Parascale and Alfresco Partner to Deliver Content-as-a-Service in the Cloud—Dialog", Business wire, Software Business Systems, Inc., pp. 1-3 (Jun. 17, 2009).

Avery, S., "Computers, business systems and office products", Purchasing, vol. 120, Issue 11, pp. 1-8 (Jul. 11, 1996).

Bers, J.S., "Image-based bill payment profits Bank of Montreal", Bank Systems and Technology, vol. 33, Issue 10, pp. 1-2 (Oct. 1996).

Bokaba, M., "Dei Ecting Employee Fraud", Accountancy SA, pp. 1-6 (Jun. 2005).

Defelice, A., "Rene Lacerte: Entrepreneur by Blood", Accounting Technology, vol. 24, Issue 1, pp. 1-3 (2008).

Dent, A.L., "Managing Your Agency Office: What Can Your Banker Do To Help?", Canadian Insurance, vol. 85, Issue 10, p. 1 (Sep. 1980).

Fairfield, J.A.T., "Virtual Parentalism", Washington & Lee Review, pp. 1-17 (2009).

Moss, V., "Ensure OFAC Compliance", Credit Union Magazine, vol. 72, No. 2, pp. 1-4 (Feb. 2006).

Tulenko, P., "Keeping honest workers honest", Cincinnati Post, pp. 1-2 (Mar. 20, 2006).

* cited by examiner

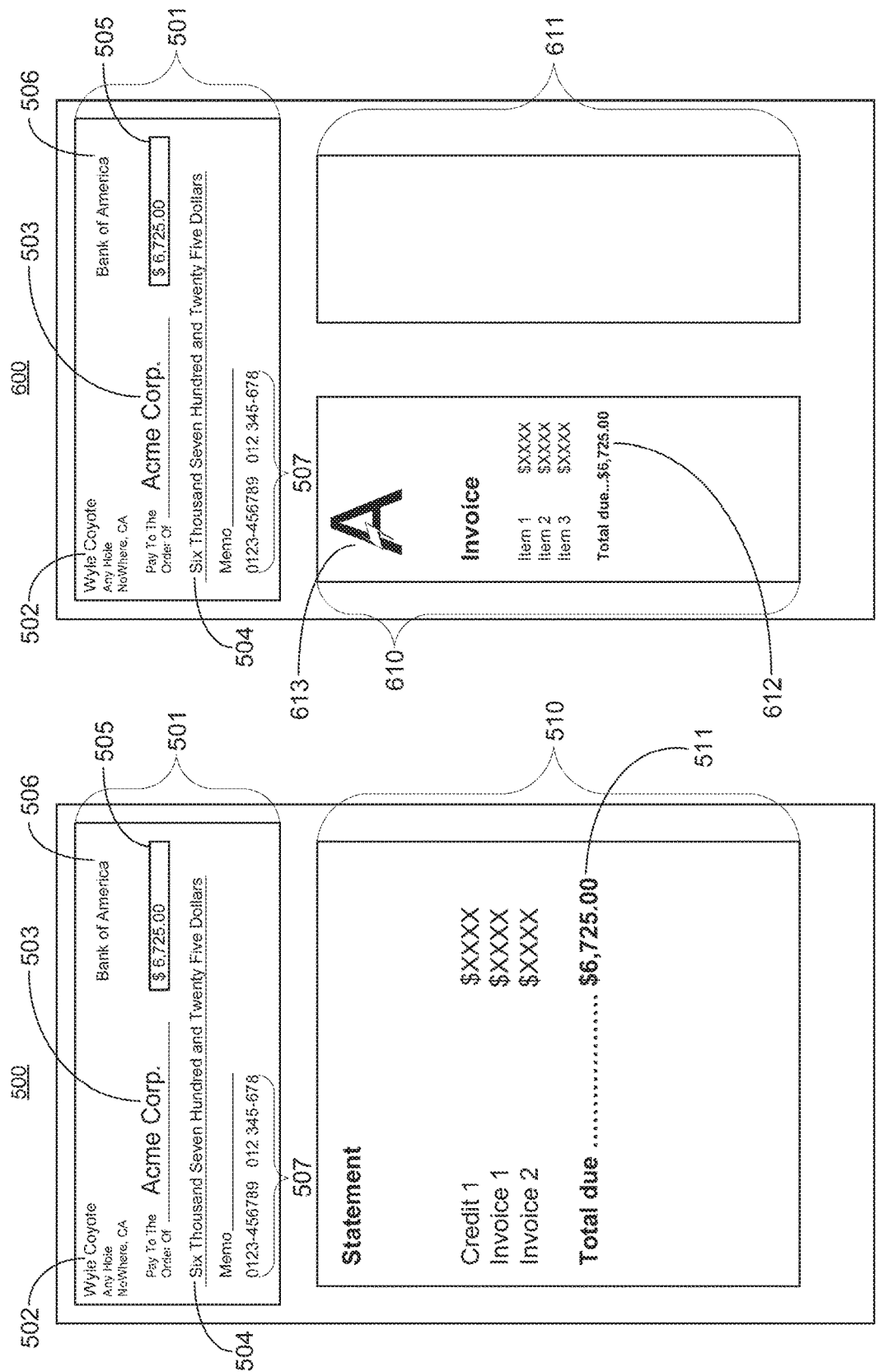

| Action | Name | Sync | From | To | Date | Message |
|---|---|---|---|---|---|---|
| Fix | Your Co. | Update Vendor | BSW | Acct SW | 11/27/12 12:35 AM | Vendor could not be updated because it also has changed in Xero since last sync. |
| Fix | Acme Co | Create Customer | BSW | Acct SW | 11/27/12 12:35 AM | Customer Acme Co could not be created because name is already in use |
| Fix | 002 | Create Invoice | BSW | Acct SW | 11/27/12 12:35 AM | Invoice 002 could not be synced to Xero because customer Acme Co could not be found in Xero. |
| Fix | Your Co. Dec. | Create Bill | BSW | Acct SW | 11/27/12 12:35 AM | Bill Dec could not be synced to Xero because books are closed for the period. |
| Fix | 003 | Create Invoice | BSW | Acct SW | 11/27/12 12:34 AM | Invoice 003 could not be synced to Xero because Accounts Receivables module is not set up. Login to Xero, configure the Accounts Receivables module, then sync again. |
| Fixed | 250 Suspense | Update Account | BSW | Acct SW | 11/26/12 11:50 PM | Account Suspense cannot be updated because it could not be found in Xero |

Figure 43

\* Slide show to fix issues

| Ops | Action | Name | Sync | From | To | Date | Message |
|---|---|---|---|---|---|---|---|
| ☑ | Fixed | 250 Suspense | Update Account | BSW | Acct SW | 11/26/12 11:50 PM | Account Suspense cannot be updated because it could not be found in Xero |
| ☑ | Fix | Acme Co | Create Customer | BSW | Acct SW | 11/26/12 11:43 PM | Customer Acme Co could not be created because name is already in use |
| ☑ | Fix | Your Co. | Update Vendor | BSW | Acct SW | 11/26/12 11:42 PM | Vendor could not be updated because it also has changed in Xero since last sync |

Description
  Created 11/26/12 11:22 AM
  Updated 11/26/12 11:36 PM

Edit Fields for Sync
  Allow Export ☑  ← 4501
  Force Re-sync ☐  ← 4502
  Clear Integration Id ☐  ← 4503

[Save] [Save/Next] [Cancel]

[Sync Now]

FIG. 45

SYSTEM AND METHOD FOR ENHANCED ACCESS AND CONTROL FOR CONNECTING ENTITIES AND EFFECTING PAYMENTS IN A COMMERCIALLY ORIENTED ENTITY NETWORK

CROSS-REFERENCE TO RELATED APPLICATIONS

This application is a continuation of U.S. patent application Ser. No. 16/780,437, filed Feb. 3, 2020 and entitled "SYSTEM AND METHOD FOR ENHANCED ACCESS AND CONTROL FOR CONNECTING ENTITIES AND EFFECTING PAYMENTS IN A COMMERCIALLY ORIENTED ENTITY NETWORK" which is a continuation of U.S. patent application Ser. No. 16/136,591, filed Sep. 20, 2018 and entitled "SYSTEM AND METHOD FOR ENHANCED ACCESS AND CONTROL FOR CONNECTING ENTITIES AND EFFECTING PAYMENTS IN A COMMERCIALLY ORIENTED ENTITY NETWORK," which is a continuation of U.S. patent application Ser. No. 14/284,314, filed May 21, 2014 and entitled "SYSTEM AND METHOD FOR ENHANCED ACCESS AND CONTROL FOR CONNECTING ENTITIES AND EFFECTING PAYMENTS IN A COMMERCIALLY ORIENTED ENTITY NETWORK," which claims priority to U.S. Provisional Patent Application Ser. No. 61/989,328, filed May 6, 2014 and entitled "SYSTEM AND METHOD FOR ENHANCED ACCESS AND CONTROL FOR CONNECTING ENTITIES AND EFFECTING PAYMENTS IN A COMMERCIALLY ORIENTED ENTITY NETWORK" and to U.S. Provisional Patent Application Ser. No. 61/906,341, filed Nov. 19, 2013 and entitled "SYSTEM AND METHOD FOR ENHANCED ACCESS AND CONTROL FOR MODIFICATION OF AUTO-LEARNED CONFLICT RESOLUTION AND RELATED RULE AND VALUE REPLACEMENTS" and to U.S. Provisional Patent Application Ser. No. 61/842,911, filed Jul. 3, 2013 and entitled "SYSTEM AND METHOD FOR ENCHANCED SYNCHRONIZATION OF RECORD ORGANIZED DATA BETWEEN DISPARATE APPLICATIONS," the disclosures of which are hereby incorporated herein by reference.

This application relates to U.S. patent application Ser. No. 14/189,889, filed Feb. 25, 2014 and entitled "SYSTEM AND METHOD FOR ENHANCED ACCESS AND CONTROL FOR MODIFICATION OF AUTO-LEARNED CONFLICT RESOLUTION AND RELATED RULE AND VALUE REPLACEMENTS," and to U.S. patent application Ser. No. 14/053,503, filed Oct. 14, 2013 and entitled "SYSTEM AND METHOD FOR ENHANCED SYNCHRONIZATION OF RECORD ORGANIZED DATA BETWEEN DISPARATE APPLICATIONS," and to U.S. patent application Ser. No. 13/829,986, filed Mar. 14, 2013 and entitled "Systems and Methods for Payment Processing," the disclosures of which are hereby incorporated herein by reference.

BACKGROUND

For years companies have been trying to move transactions into an electronic system. Large businesses have the resources and scale to justify the installation of new electronic systems. However, for a large segment of small and medium size enterprises (SMEs), such attempts have not fared well. This is because it is not cost effective for SMEs to install a dedicated system and there is no standardized transaction system to allow the sharing of costs among many different businesses.

In addition, traditional payment methods typically require related parties to know each other's bank accounts. For example, in order for a payor to electronically transfer a payment into a vendor's bank account, the payor must know the vendor's bank account number and ABA routing number. When the vendor receives the payment, it can also find out the payor's bank account number. Thus, entities cannot hide their bank account information when making/receiving payments using the traditional payment methods.

Historically, third-party bill payment systems have required subscribers to choose between two options: (1) a "closed-loop" process for check payments or (2) a process where checks are written on the account of the subscriber and where the funds are withdrawn from their account when checks are cashed by the payees, but without any of the benefits of the closed-loop process. A closed-loop process typically retrieves images of cashed checks and the payment status of checks into a bill payment system. This process enables delivery of additional features such as display of cashed check images, check payment status, alerts when checks have not been cashed, fraud protection and reporting on all outstanding checks. Typically, this process involves a clearing account for processing the payments to enable the retrieval of check status and images. This process typically requires funds from the account of the payor (also known as the "originator") to be transferred to the clearing account prior to the check being sent, causing the payor to lose access to the funds while the check is delivered to the payee (also known as the "receiver").

Alternatively, bill payment systems have printed and mailed checks that are drawn directly on the payor's account. This alternative process enables the payor access to the funds while the check is delivered, but it does not permit the closed loop process, because there is no simple way to separate out the checks created by the bill payment system from those created manually by the payor via another means. Also, because the check is written on the subscriber's bank account there is no way to provide automated positive pay—a capability offered by the closed-loop process that automatically rejects checks that don't match system data.

Additionally, bill payment systems must often interface with multiple instances (and different types) of accounting software applications and allow edits to the same database records and documents by different applications, and manage the conflicts that may arise from such edits.

Embodiments of the present disclosure may relate to automated computer processing of invoices, payments, and money transfers to address these and other issues.

SUMMARY

Among other things, embodiments of the present disclosure enables corporate entities to connect with each other and enables social networking interactions, credibility rating, identity verification, and/or business transactions between the corporate entities.

A computer-implemented method according to one embodiment of the present disclosure includes: determining, by a computer system, a credibility rating for a first corporate entity, wherein the first corporate entity is part of a network of corporate entities; presenting, by the computer system, a profile of the first corporate entity to a second corporate entity within the network of corporate entities, wherein the profile of the first corporate entity including the credibility rating for the first corporate entity; receiving, by the computer system, a request to connect with the first corporate entity from a second corporate entity in the network of corporate entities; in response to the connection request from the second corporate entity, establishing, by the computer system, a connection within the network of corporate entities between the first corporate entity and the second corporate entity; and effecting, by the computer system and subsequent to establishing the connection between the first corporate entity and the second corporate entity, a payment transaction between the first corporate entity and the second corporate entity.

The present disclosure further includes computing devices which perform such methods, and computer readable media containing instructions that, when executed by one or more computing devices, cause the one or more computing devices to perform such methods.

BRIEF DESCRIPTION OF THE DRAWINGS

A more complete understanding of certain embodiments may be derived by referring to the detailed description and claims when considered in connection with the following illustrative figures.

FIG. 5 is a diagram of a typical payment document according to one embodiment of the present invention.

FIG. 6 is a diagram of an enhanced payment document according to one embodiment of the present invention.

FIGS. 37-45 are exemplary screenshots according to various aspects of the present disclosure.

The figures depict embodiments of the present disclosure for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Automated Invoice Capture

Figure 1:
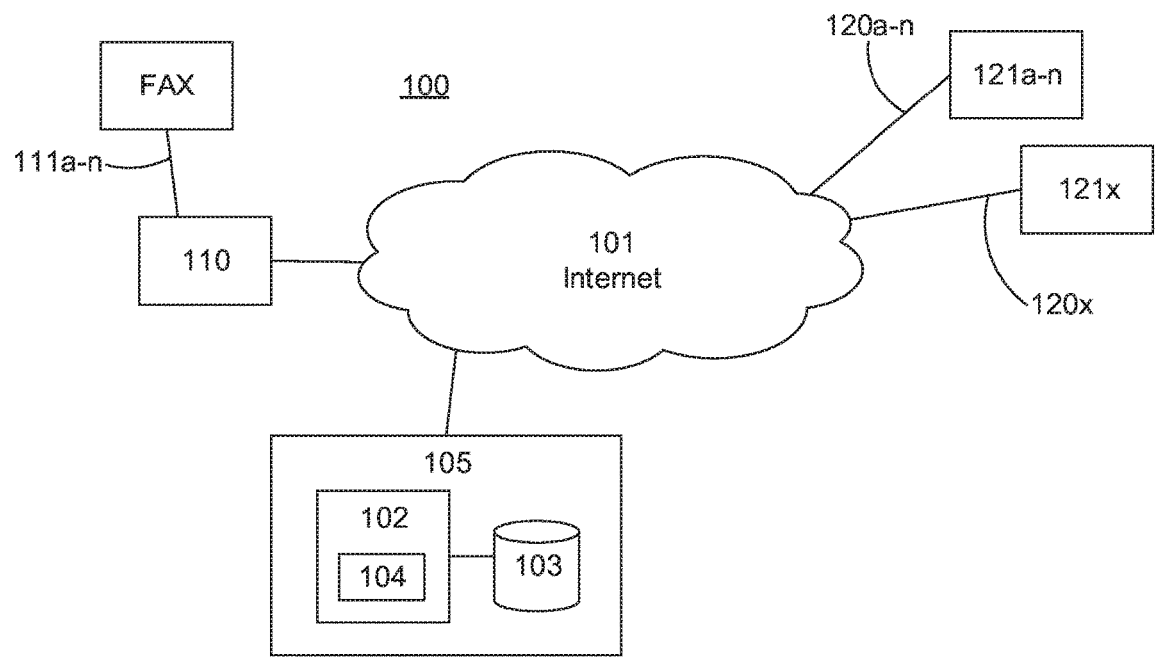
FIG. 1 is a block diagram of an exemplary system according to one embodiment of the present invention.

FIG. 1 shows an overview of an exemplary system 100 according to one embodiment of the present invention. An electronic service provider 110, such as eFax Services, is connected to the Internet 101. Other intranet or networks could be used instead of the Internet. Also connected to electronic service provider 110 are multiple fax lines (or fax numbers) 111 a-n for receiving faxed invoices. Customer sites 121a-n (of which, for clarity and simplicity, only 121x is shown) connect to the Internet 101 via connections 120a-n. Corporate site 105 of an operator of this exemplary system 100 is represented here by a server 102, a storage system 103, and software 104 installed on the server 102. The actual architecture of such a system may, and in most cases probably will, comprise many servers, multiple storage systems and/or hard drives, and multiple instances of software. All these possible components are represented here by the single instances of the components of site 105.

Figure 2:
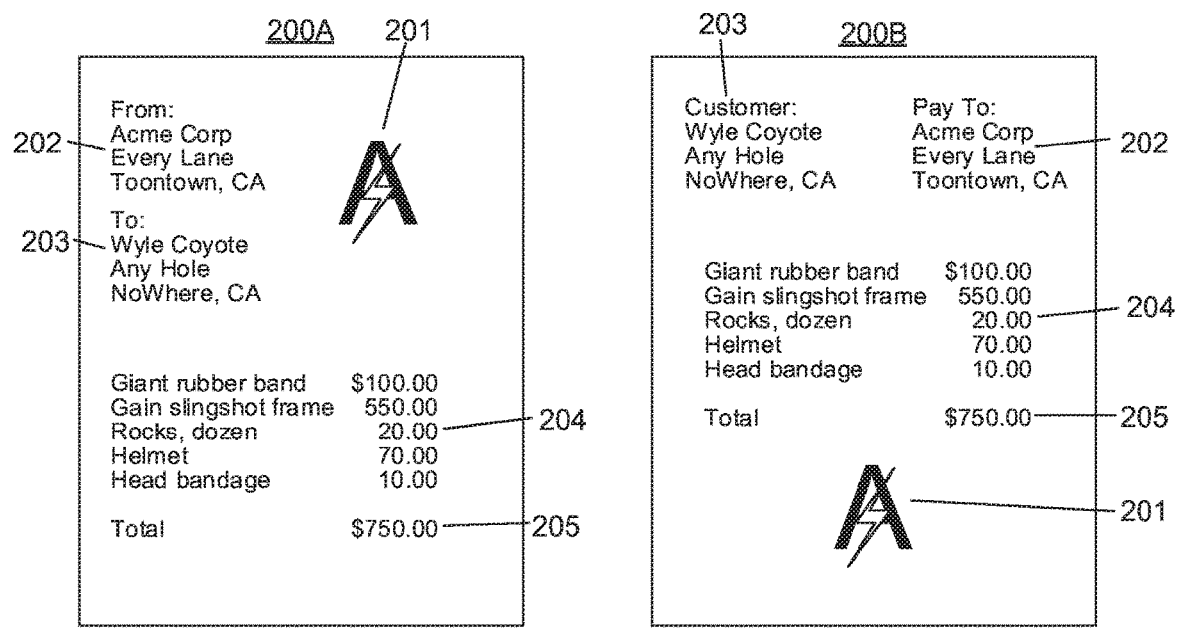
FIG. 2 are diagrams of two exemplary invoices according to one embodiment of the present invention.

FIG. 2 shows typical invoices as received, represented here as exemplary invoices 200A and 200B, according to one embodiment of the present invention. These invoices are issued by one party (the issuer) to another party (the recipient). Invoices 200A and 200B contain the following data, although with a slightly different layout: issuer logo 201, issuer name and address 202, recipient address 203, line items 204 and total amount due 205. Other additional data such as terms, due date, etc., are not shown in FIG. 2, but such data are customarily included on typical invoices.

One aspect of the invention includes approaches for recognizing an invoice, for example identifying the issuer of the invoice and/or recognizing the layout of the invoice. Invoices can be recognized by comparing them to a database of distinguishing features. For example, invoices might be recognized based on the logo of the issuer, name and/or address of the issuer, or other data or signature features that are unique to an issuer. Once an invoice is recognized, a corresponding template can be applied to extract the relevant data from the recognized invoice.

There are various modes by which an invoice may be entered into the system and various media on which the invoice may be received. For example, the recipient of a paper invoice could fax it to a dedicated fax number for that recipient's account, such as, for example, any of fax numbers 111a-n shown in FIG. 1. Alternately, the recipient of the invoice could instruct the issuer to fax the invoice directly to said account's dedicated fax number. In yet another case, an invoice recipient may have a customized email address residing on or connected to server 102, to which invoices may be emailed with attached files of any of various popular word processing or accounting or image capture programs, such as, for example, MS Word or Adobe Acrobat. In any case such a file may be converted into an image file showing the image of the invoice. In the case of a Word file, depending on the complexity of the format, direct parsing may be applied. Alternately, the file may be printed to an Adobe Acrobat portable document file (.PDF) file and then processed as an image.

Once received, invoices can be recognized using many different types of distinguishing features beside those discussed above. Additional examples include but are not limited to black/white histograms, color histograms, sectional signatures and sectional histograms. OCR (Optical Character Recognition) can also be used as a part of the recognition process. It can be applied to just the header, to the entire invoice or to any part of the invoice. The result of the OCR can be used as the basis for recognizing an invoice. Alternately, OCR can be applied after an invoice has been recognized, in order to extract data from the invoice. Other examples of distinguishing features include metadata (e.g., fax number, issuer e-mail address, subject line, pdf- or Word-metadata, keywords, barcode), number of pages, OFX (Open Financial Exchange) download, and XML (eXtensible Markup Language) fields or tags. Other suitable structured files with a certificate may be used in other cases.

Figure 3:
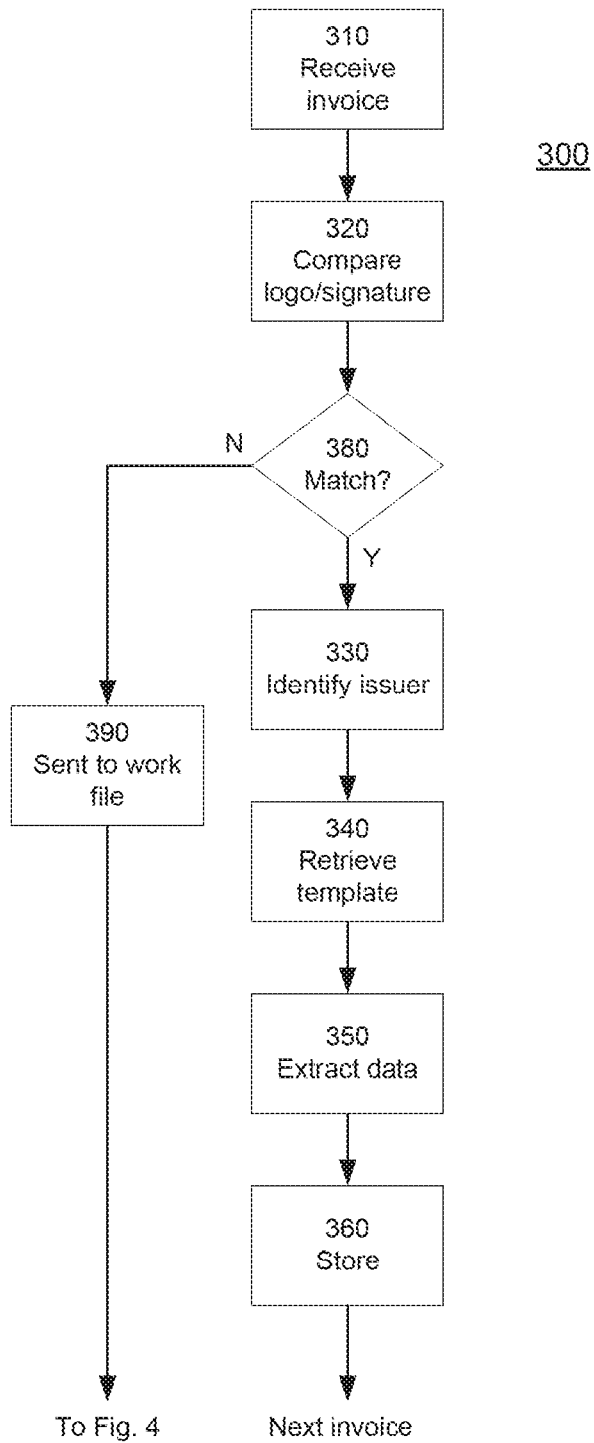
FIG. 3 is a flow diagram of an exemplary method for processing invoices according to one embodiment of the present invention.

FIG. 3 shows an exemplary process 300 for processing a typical invoice, such as invoice 200A or invoice 200B, according to one embodiment of the present invention. The process 300 may be implemented by an electronic payment system such as the one shown in FIG. 1. The invoice image is received 310, for example by one of the ways described above. It may be emailed or uploaded or transferred by any of several electronic means from the site of service provider 110 to the site of system operator 105. The system 105 compares 320 the invoice to a database in storage system 103 that contains distinguishing features for known invoices. For example, the system 105 may search for a matching logo in a library of known issuer logos or search for a matching signature (or seal) in a library of known issuer signatures. In some cases, other distinguishing features (e.g., the originating fax number, the originating email address) may be used in addition to or in place of the logo pattern and signature to recognize the invoice.

At step 380, the process branches. If no match is found (no branch), the invoice is sent 390 to a work file, in which unprocessed documents are stored. Treatment of the documents in this work file is explained below, in the description of FIG. 4. If a match is found for the logo pattern or signature (yes branch), the system 105 identifies 330 the issuer. A corresponding template for the recognized invoice is also retrieved 340 from storage system 103. The template includes instructions for extracting data from the invoice, for example it may define fields identifying where and/or in what format on the invoice certain data is expected to be located. In some cases, an issuer may have more than one template. For example, the issuer may have different templates for personal users and for business customers. As another example, the issuer may have different templates for single-page and multi-page invoices, or may simply change the format of its invoice over time or by geographic region. Accordingly, the system 105 may use more refined decision-making processes to select the correct template for a particular invoice.

Data is extracted 350 from the invoice based on the selected template, using OCR and/or other suitable means. In some cases the image may be processed using OCR before it is received 310, for example, by using OCR functions provided by Adobe and other tools by other companies. The information extracted in step 350 is preferably stored 360 in a database that also resides in storage system 103.

In one approach, once a template is identified for an invoice, data may be automatically extracted from the invoice (e.g., as identified by fields in the template). In another approach, invoices may be grouped together based on their similarity. Data extracted from certain locations in one invoice may be extracted from similar locations in other invoices in the group. Previously discovered data patterns may be reused on similar invoices. Data can also be manually extracted. Different pattern recognition engines, expert systems, rule-based engines and other approaches may also be used to extract data from invoices.

Processed invoices can also be used to check or refine the templates for an issuer. Differences between invoices for the same issuer or deviations from past norms can also be used to flag potential problems, as well as to request human review.

Figure 4:
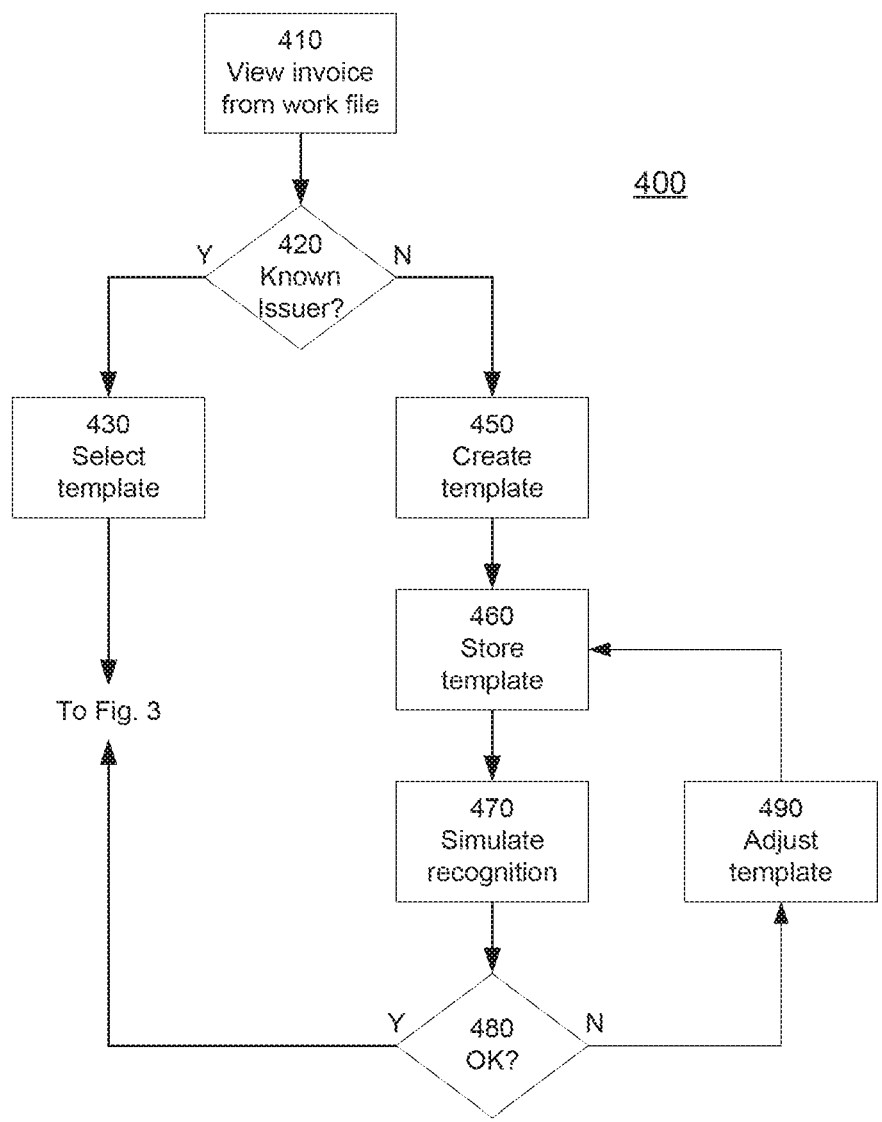
FIG. 4 is a flow diagram of an exemplary method for processing unrecognized invoices according to one embodiment of the present invention.

FIG. 4 shows an exemplary process 400 for processing unrecognized invoices that were previously stored in a work file in step 390 of FIG. 3, according to one embodiment of the present invention. An invoice is retrieved 410 from the work file, which resides in storage system 103. The invoice is presented for manual viewing 410 by a human operator. In step 420, the process branches. If the operator determines that the invoice is a document from a known issuer with known logo pattern/signature (yes branch) but, for whatever reason, the logo pattern/signature recognition has not worked (for example, a coffee stain on the logo may have made the logo unreadable to the automated recognition system), the process moves to step 430. The operator selects 430 a matching template and sends 440 the invoice back to the recognition process 300 (e.g., to data extraction step 350).

If, however, in step 420, the operator determines that the invoice cannot be matched with a known template (no branch), the operator creates 450 a new template. This new template may be created completely new or it may be created by modifying a suitable existing template. The new template, along with its issuer information and the invoice, is stored 460 in storage system 103. In step 470, a recognition simulation is performed to verify that the new template works correctly, namely that (1) the automated recognition system can properly identify the new template for the invoice and (2) data can be accurately extracted from the invoice based on the template. If, in step 480, the template simulation works correctly (yes branch), the invoice is sent 440 to the recognition process 300 as described above (e.g., to data extraction step 350). If, however, the simulation does not work correctly (no branch), the template may be manually adjusted 490. The template editor may highlight the section that created problems. For example, a field for OCR may be too narrow or too wide. If the field is too wide, for example, the system may attempt to interpret a part of the logo as a part of the address. In the case of a field that is too narrow, some characters may be cut off. The operator can adjust 490 the template accordingly to solve such problems.

Another aspect of the invention is cross-organizational learning. For example, if an invoice addressed to Customer A is identified as being from Vendor 1, and the system can then identify other signature items (image, "from" address, etc.) in the invoice. Thereafter the system may be able to use those other signature items to select the correct template for the invoice, and use that template to find the correct data in certain sections of the invoice. Additionally, if a same format invoice from this same Vendor 1 is sent to a second Customer B, then the system can recognize from the signature information that the invoice is from Vendor 1 and apply the template to the invoice to extract the correct data.

One advantage of the approach described above is that the capture of invoices can be made economical for SMEs. The number of invoices processed can be aggregated over a large number of SMEs, thus achieving economies of scale that can be shared by the businesses. In addition, although any one SME may only receive a few invoices from any particular issuer, the community of SMEs in the aggregate may receive a large number of invoices from that issuer. This then makes it cost efficient to develop templates or other processes to handle those invoices, whereas it would not be cost efficient for each SME to do so individually. The system of FIG. 1 can be implemented without significant additional investment by either the issuers or the recipients. The cost of system 105 is shared by all users and not borne entirely by one user. The recipients can send invoices to the system 105 using conventional means, such as fax and email. The invoices between issuers and recipients can be settled using conventional means such as checks, EFT, and ACH, or using advanced means such as the enhanced private interbank clearing system described in more detail below with respect to FIGS. 16A-B and 17. In addition, as described above with the example using Customers A and B, and Vendor 1, information learned from processing one recipient's invoices can be used to improve the overall process for all recipients.

In one approach, the community of recipients can themselves improve the process. For example, the system 100 can enable the community to provide input about distinguishing features of the invoices. Various recipients and/or issuers may suggest different features for recognizing invoices. There may even be a community process for determining preferred features for distinguishing invoices. A similar process can be used to determine templates, including determining fields in templates.

Another aspect of community is that different recipients can exchange their experiences of dealing with issuers. Many recipients may be in a similar situation with respect to Issuers. Another beneficial aspect of the community is that SMEs are likely to deal with "small" issuers. There will be a very large number of small issuers (approximately 25 million in the U.S.), but each one issues invoices to only a small number of customers (typically, 20-30). While it is not economical for a centralized identification process to be applied to this set of issuers, it is economical to let the recipients/issuers themselves help identify the issuers and, in the aggregate, create a comprehensive catalog of the issuers.

Therefore, the described systems and processes allow the integration of paper and/or electronic document invoices into an automated system to reduce the need of manual labor (such as manual input of invoices) in processing the transactions. In addition, the systems can be fully automated and process these transactions without human intervention.

Enhanced Invoice Payment Document Generation

FIG. 5 shows an overview of a typical payment document 500 with a check section 501 and a statement section 510, according to one embodiment of the present invention. The payment document 500 is often printed on a letter- or A4-sized bifold with three sections with the check section 501 on top and the statement section 510 occupying the lower two-thirds. The check section 501 contains information about a payor 502, a payee 503, an amount in words 504, an amount in numbers 505, additional banking information 506, and information such as the ABA routing number and check number 507. The statement section 510 shows credits and invoices and also shows a total due 511 that typically reflects the amount shown in payment amounts 504 and 505. In some cases, total 511 may differ from payment amounts 504 and 505, because the total due 511 may take into account other credits or debits.

FIG. 6 shows an enhanced payment document (also referred to as an enhanced invoice payment document) 600, according to one embodiment of the present invention. As shown, the enhanced payment document 600 contains a check section 501, a communication section 610, and a payor supplemental section 611. Elements of the check section 501 are described above in FIG. 5. The lower two-thirds of the payment document 600 includes the communication section 610, which in this example is an actual copy or image of the invoice being paid by this check, and the payor supplemental section 611. The invoice image or copy in this example contains the logo 613 of the billing party, the items billed and the billing total 612, which in this example agrees with the payment amounts 504 and 505. Payor supplemental section 611 is available for optional additional payor information, such as notes about this transaction, a mini-statement, and/or an advertisement.

Figure 7:
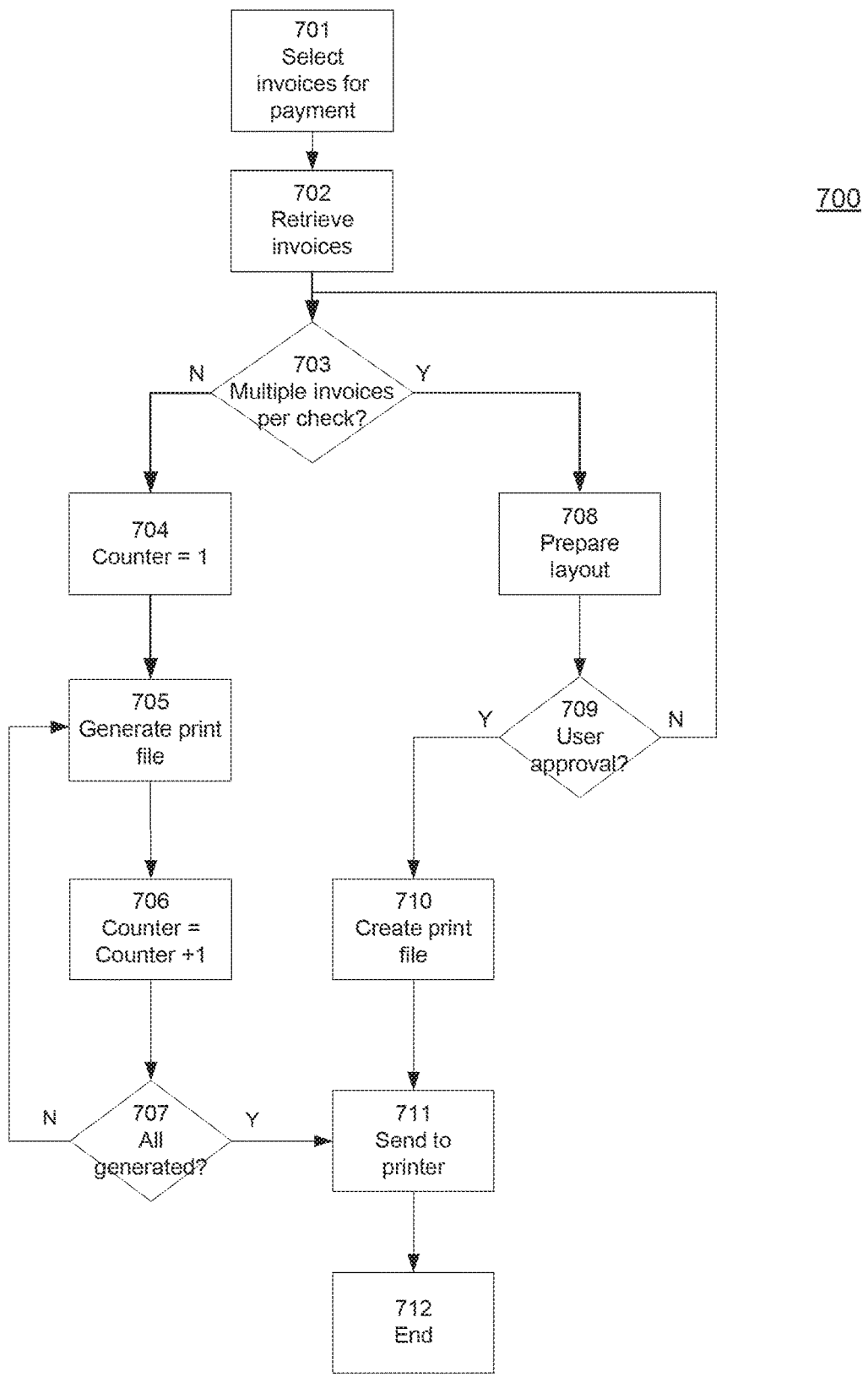
FIG. 7 is a flow diagram of an exemplary process for generating enhanced payment documents according to one embodiment of the present invention.

FIG. 7 shows an exemplary process 700 for generating the enhanced payment document 600 according to one embodiment of the present invention. The process 700 may be implemented by an electronic payment system (EPS) such as the one shown in FIG. 1. Initially, a user selects 701 invoices for payment and enters that information into the system. The system retrieves 702 the selected invoices from data repository 103.

At step 703, the system asks the user if the user wants to write one check for multiple invoices and the process branches based on the user's answer. This option may be presented to the user each time process 700 is implemented, or the user could configure the system to always select or never select this option. If a check is generated for only one invoice (no branch), the system sets 704 a counter to 1 and generates 705 a payment document print file for a first invoice. As described above for the payment document 600, the payment document contains an image of the first invoice. In step 706 the counter is advanced one increment. In step 707 the process branches, depending on whether payment documents have been generated for all the pending invoices. If all have been generated (yes branch), the process advances to step 711, where the payment document print files are printed and the payment documents are stored in data repository 103 for recording, and the process terminates at step 712. The print files may be printed locally or remotely (e.g., through the data repository 103). If payment documents have not been generated for all invoices (no branch), the process loops back from step 707 to step 705, and another payment document is generated for the next invoice, and repeats until all pending invoices are paid.

Alternatively, if, in step 703, the user elects, or the system is configured to pay multiple invoices with one check (yes branch), the system prepares 708 a layout of the payment document. The payment document may optionally be presented to the user for approval 709. If the user does not accept the layout (no branch), the process goes back to step 703, where the user may elect to print a payment document for each invoice separately. If, in step 709, the user accepts the proposed layout (yes branch), the system generates 710 a payment document print file containing multiple invoice images and whose check payment amount equals the total of all the included invoices. The invoice images may be smaller than they would be in a payment document containing only one invoice image, depending on the number of invoices being paid and the layout of the payment document. In step 711, the payment document is sent to a printer (local or remote) and data repository 103 (from which the remote printing may occur), and the process terminates at step 712.

In some cases, an image of the invoice may be printed on the same page as the check; while in other cases, multiple images may be printed. In yet other cases, one or more images may be printed on the back of the page, opening the front for classic statements or other uses, including but not limited to advertisements, promotions or campaigns.

In some cases, instead of or in addition to printing an image of the invoice on the payment document, an identifier of the invoice image may be printed on the check section of the payment document. For example, a URL (Uniform Resource Locator) of an invoice image may be printed on the face (or the back) of the check. As a result, one can correctly and easily identify the corresponding invoice for a check payment by visiting the printed URL. The identifier can also be incorporated into the payment transaction in other manners based on the nature of the payment. For example, if the payment is made through an ACH transaction, a URL of the invoice may be included in the ACH addenda field. As a result, the URL will subsequently show up on the payor and/or payee's bank's web summary and bank statement.

Therefore, the described systems and processes provide a simple, easy-to-use approach to generate enhanced invoice payment documents with features that ensure that the credits of the underlying payments are applied to the correct invoices.

Enabling Correct Check and Electronic Payment Deposit

Figure 8:
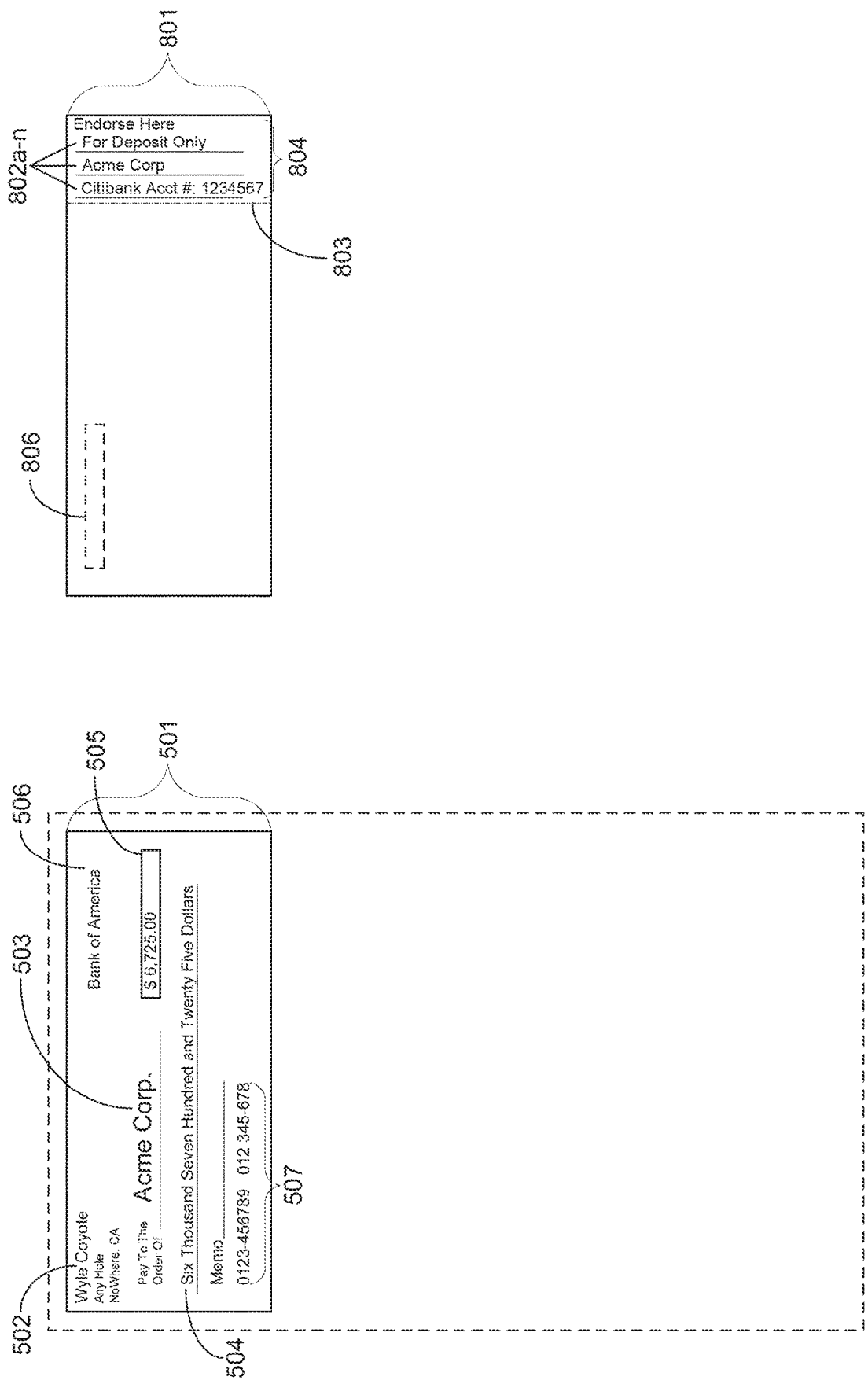
FIG. 8 shows the top part of a payment document shown in FIG. 6 according to one embodiment of the present invention.

FIG. 8 shows the top part (check section 501) of the payment document 600 shown in FIG. 6. Section 801 shows the back side of the check section 501 according to one embodiment of the present invention. Banking information 506 on the front side is shown on the back side as a dotted box 806. Also shown is the dotted line 803 that separates the endorsement section 804 from the rest of check back side 801. Also shown is a section 802a-n where endorsement information is preprinted on the back of the check in high-quality black ink. This endorsement information is solicited from the payee of the check before the payor mails out the check.

Having the endorsement information thus clearly printed is advantageous compared to using a standard institution endorsement stamp, because the latter can be smudged, faint, or otherwise difficult to read. Having the endorsement information clearly printed also reduces the risk of the check being erroneously or fraudulently deposited in a wrong account. Also, since the check is eventually cleared by a depositing bank, it is reasonable that the depositing bank verified the endorsement information. In addition, the deposit information may be captured from the depositing bank and transferred to the drafting bank or an electronic payment system (EPS) such as the one shown in FIG. 1 to verify payee information. As the real time processing of checks is done, all the payee information and deposit information is available to the involved banks. The payor of the check and EPS may obtain such information from the banks. In addition, as described in further detail below, the deposit information can also be used to ensure correct deposit of electronic payments.

Figure 9:
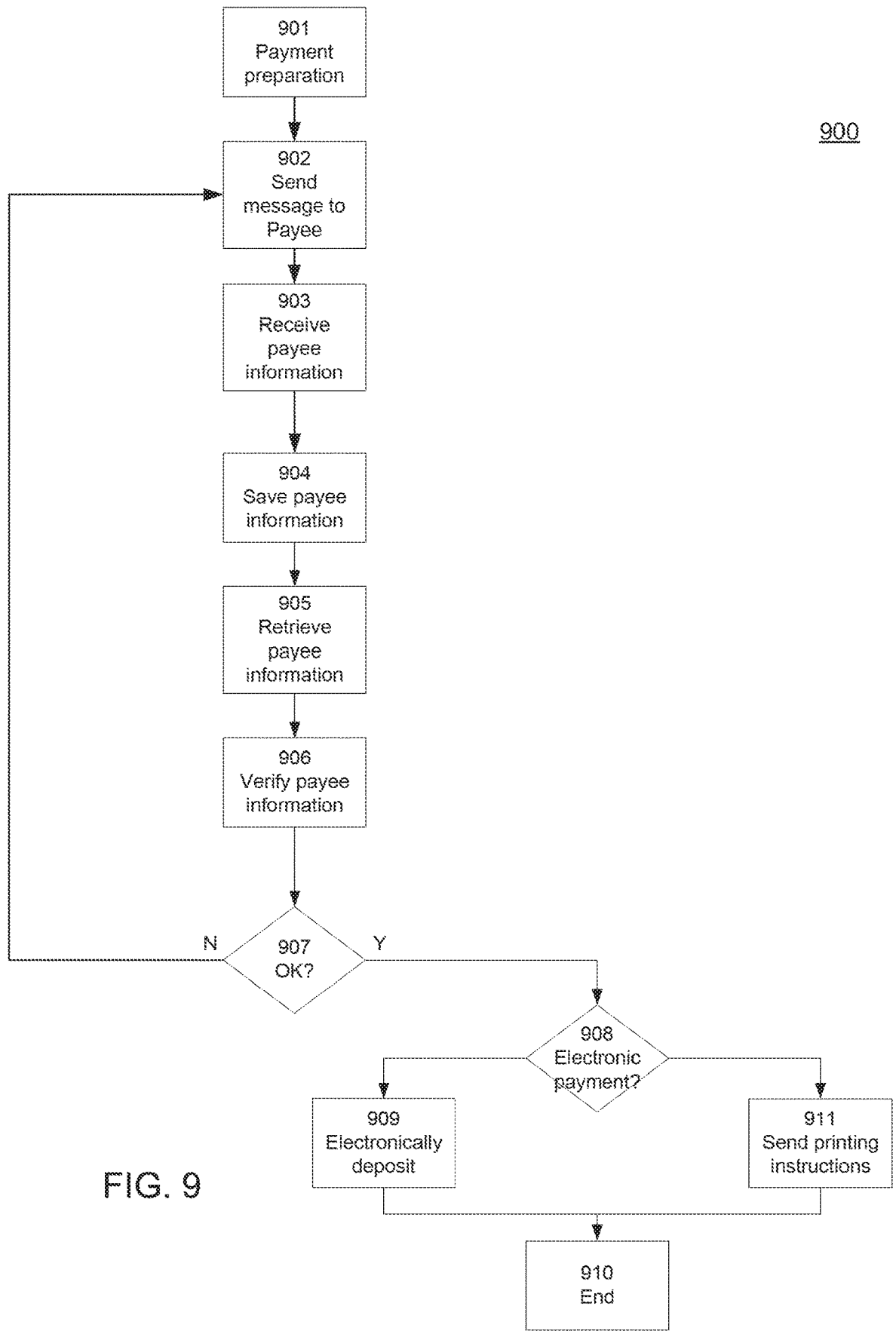
FIG. 9 is a flow diagram of an exemplary process for verifying that checks are correctly deposited according to one embodiment of the present invention.

FIG. 9 shows an exemplary process 900 for ensuring correct payment deposit according to one embodiment of the present invention. The process 900 may be implemented by an electronic payment system (EPS) such as the one shown in FIG. 1. In step 901 the system pulls payee data (e.g., payee identity, payment amount) from data repository 103 for payment preparation. In step 902 the system sends a message to a payee who has not previously participated in the service provided by the system. These messages may be sent by email, SMS (Short Message Service), facsimile, or other similar messaging systems. Such a message may, for example, contain a URL (Uniform Resource Locator) that opens a web user interface upon user selection. A user can confirm the user's payee identity and enter data such as, for example, banking information in the web user interface. In other cases, instead of a URL, a callback number may be offered, where a caller can leave payee information with a call center agent or IVR (Interactive Voice Response). In yet other cases, an email or SMS address may be included in the message, for the user to respond and provide payee information. Additional information may be provided to the payee (e.g., in the message or the web user interface) to assure the payee that, for example, the provided user information will not be passed on to the payor, or to show legitimacy of the user data solicitation (e.g., showing billing information).

The system receives 903 the solicited payee information (e.g., deposit information) from the payees and stores 904 the payee information in data repository 103. The user may respond to the soliciting message and sets up a payee account with all the required deposit information, thus helping the system to obtain new customers. In step 905 the system retrieves payee information from data repository 103. In step 906 the system may additionally verify the received payee information by executing a mock transaction. As described in detail below, the mock transaction verifies payee information through approaches such as the random deposit approach.

In step 907, the process branches. If the data is not satisfactorily verified (no branch), the process returns to step 902 and the system sends a new message to the payee soliciting information. If the data is satisfactorily verified (yes branch), the process branches again in step 908 based on whether the payment is an electronic payment. If the payment is an electronic payment (yes branch), in step 909 the system deposits the electronic payment to an account (e.g., through an ACH transaction, an EFT payment, or a wire transfer) specified by the verified payee information (e.g., account name, routing number, account number). The process ends in step 910. If the payment is a paper check payment (no branch), in step 911 the system sends print instructions to a check printer, including instructions for printing information such as the payee name, account number, ABA (American Bankers Association) number, and other similar information on the endorsement section of the check. The process ends in step 910.

If the system receives no response to its message from the payee through the web interface within an allotted time period, such as, for example, two business days, the system sends out a check to the payee without printing information on the endorsement section.

The mock transaction utilized by the system to verify 906 payee information may involve one or more transactions designated to verify various aspects of the payee information. For example, the system may create a check used to verify the deposit information provided by the payee and send the check to the payee. The check may include a partial payment of an outstanding invoice. If the check is subsequently successfully deposited, the system can assume that the depositing bank has verified the deposit information, consider such information verified, and make payment for the remaining portion of the invoice. Thus, the process allows such verification before starting electronic transfers at all, thus helping to add a layer of security to avoid payments from being misrouted.

As another example, a partial payment of an outstanding invoice may be made via electronic payment (e.g., ACH) according to the deposit information provided by the payee, and the remaining balance of the invoice may be paid via a check. Once the customer has confirmed that the electronic payment was successfully posted, the system considers the provided deposit information successfully verified and makes subsequent payments electronically according to the verified deposit information. The payee may specify a preference of electronic payment, check payment, or a combination of both. The system can make the payments according to the user preference.

As a third example, the mock transaction may conduct a random deposit that involves crediting or debiting a random small amount (typically two small transactions) and then request the payee to verify either the transaction ID or the cent amounts. The random deposit approach helps to identify inaccurate account numbers (e.g., typos) and verify that the person providing the information has legal access to the account being set up.

In another aspect, the system reconciles the payee information with additional data in addition to or instead of the random deposit approach to prevent check fraud (e.g., illegitimate account). For example, the system may populate the bank information of the payees from the endorsement from the primary bank shown on previously cleared checks, and use such information to verify against the provided payee information. If the information matches, the payee information is deemed to be verified. If there is a partial match, a judgment call is made by a risk underwriter. If there is no match, the payee fails the verification 906. Such bank information may be solicited from the depositing bank by separate transmission or from other service providers such as SafeChecks (see http://www.positivepay.net/). The information retrieved from previously cleared checks can also be used to reconcile payee identity (e.g., name) on the record to detect fraud.

In yet another aspect, the system considers certain users (e.g., administrators of working accounts) trustworthy, and either does not verify 906 or verifies 906 their payee information with less scrutiny. In addition, trusted administrators of working accounts can extend their trust or infer trust onto others by being involved with setting up accounts, for example, of key vendors or clients, thus implicitly extending their trust. A composite trust rating considers items such as how often, how much, for how long and how recently successful transactions have been completed in conjunction with a particular administrator. In some cases, a single composite score includes weighted aspects. In other cases, two or more scores may be used to represent different aspects, individually or in combination.

A trusted administrator can confer some of his or her composite trust rating by inviting and confirming new applicants. Typically, only a certain percentage of influence by the trusted administrators will be allowed to be inferred. The rest can be earned, or determined by providing multiple references. Certain events as well as non-events may reduce the trust of an administrator. Others may increase it. Typically, a separate, but related value may be used for the company of the trusted administrator, creating a network of trust relationships. This can also be used to help other things, such as the company's credit worthiness.

Therefore, the described systems and processes generate enhanced payment documents with features that ensure that the payment will be deposited in the correct account, and thus prevents mistakes and frauds. The described systems and processes also reconcile cleared checks with records and name identification data.

Correct Invoice Payment Deposit

Figures 10, 11:
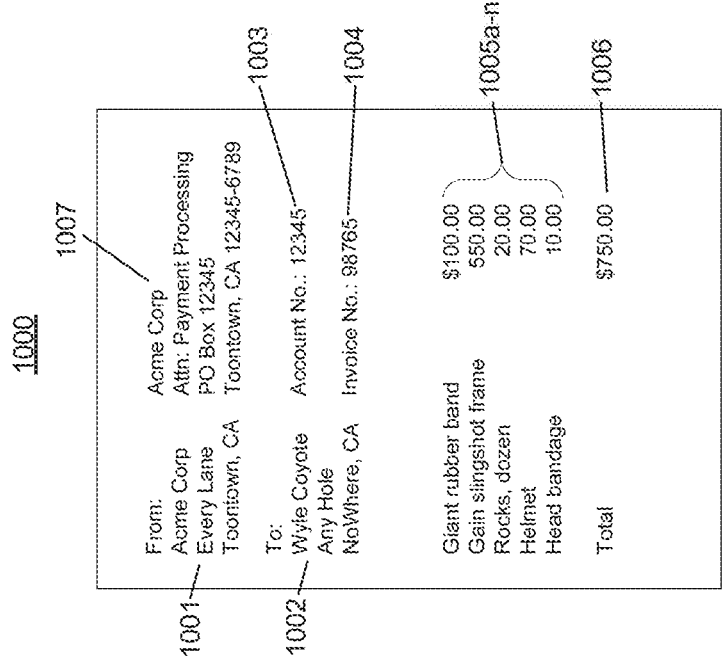
FIG. 10 is a diagram of an exemplary invoice according to one embodiment of the present invention.
FIG. 11 is a diagram of an exemplary check according to one embodiment of the present invention.

FIG. 10 shows an invoice 1000 according to one embodiment of the present invention. It has, for example, the address 1001 of the issuer or sender, recipient's address 1002, items billed 1005a-n, payor account number 1003, invoice number 1004, bill total 1006, and an address 1007 to which to send payment. Address 1007 may contain postal address and/or electronic payment address information.

FIG. 11 shows a typical check 1100, such as a payor might return in response to invoice 1000, according to one embodiment of the present invention. Check 1100 has, for example, a payor address 1101, a payee identity 1102, an amount field 1106 stating the check amount in both words and number, some bank information 1103, an invoice number 1110, an account number 1111, signature confirmation or other accreditation information 1108, and bank routing information 1109.

Figure 12:
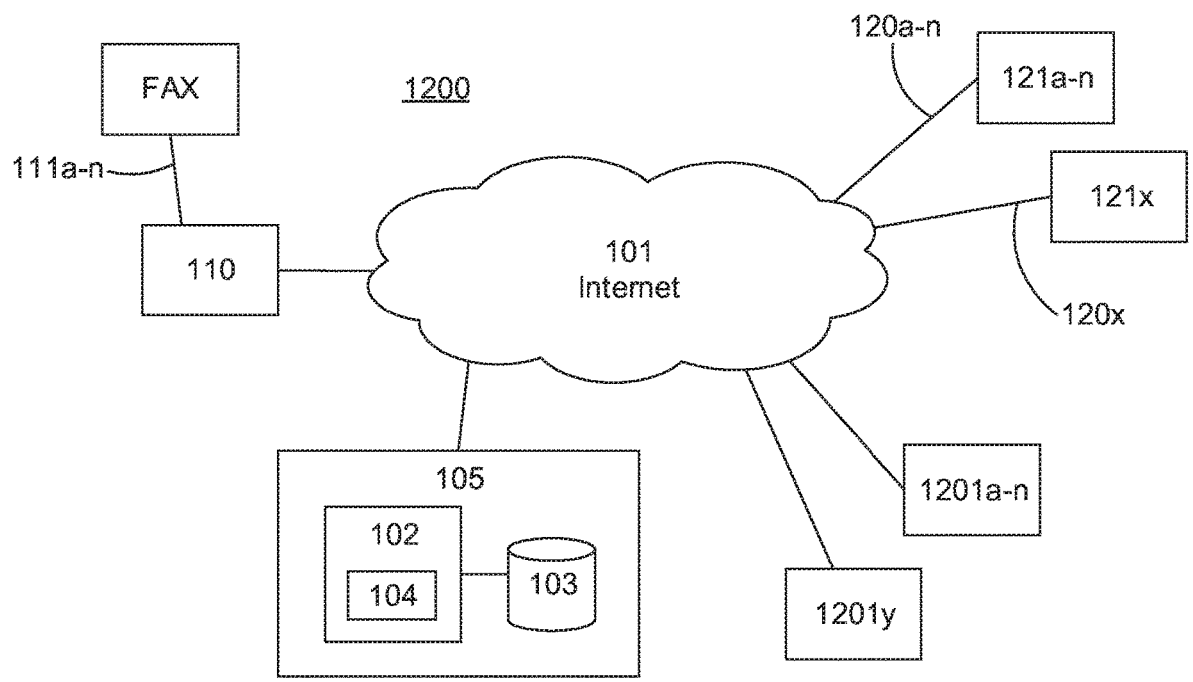
FIG. 12 is a block diagram of an exemplary system according to one embodiment of the present invention.

FIG. 12 shows an overview of an exemplary system 1200 according to one embodiment of the present invention. Similar to system 100 shown in FIG. 1, system 1200 includes an electronic service provider 110 and a corporate site 105 both connected to the Internet 101. In addition, the exemplary system 1200 provides a lockbox service at the corporate site 105, using server 102, data repository 103, and software set 104. Additional software modules may be present (not shown) at site 105. FIG. 12 also shows connections 120a-n for lockbox service customer sites (only 121x is shown) and connections 1201a-n for payor sites (only 1201y is shown). The payors are the end customers of the lockbox service customers.

Figure 13:
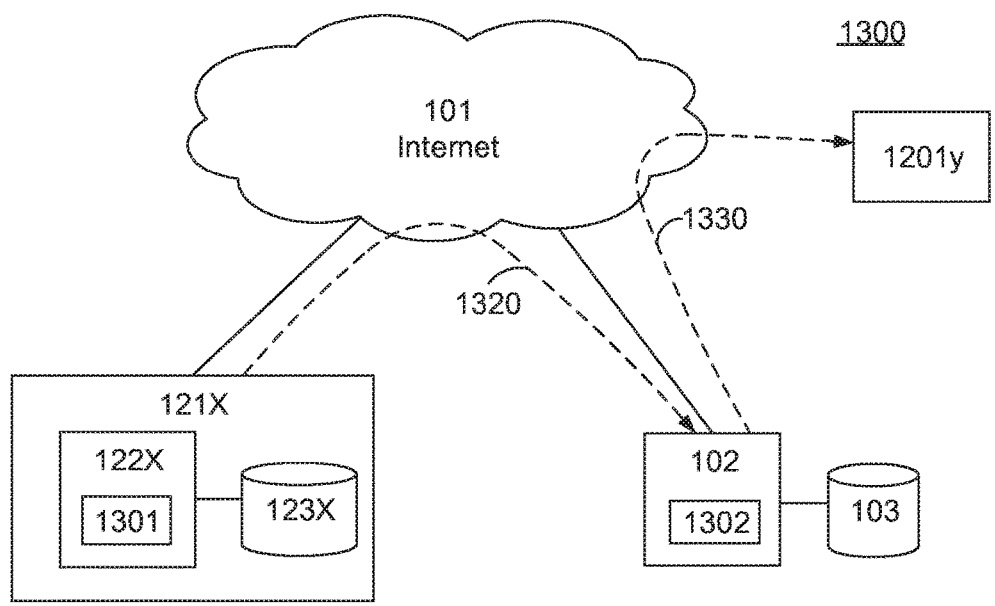
FIG. 13 is a block diagram of an exemplary billing system according to one embodiment of the present invention.

FIG. 13 shows an overview of an exemplary billing system 1300 according to one embodiment of the present invention. The lockbox customer at site 121x issues an invoice from system 122x, which has data repository 123x and an exemplary instance of billing software 1301. In some cases, software 1301 may be standard billing software, of any of the types that are commonly used. In other cases, software 1301 may be a web-based billing software or some other type of software. In some cases, the invoice may be issued directly from the customer's system 121x to the payor's system 1201y, transmitted by postal mailing of a printed copy or by emailing an electronic copy. In other cases, the billing information may be passed to the lockbox system 102, where it is processed and sent to the payor 1201y as an invoice. As shown by the dotted lines 1320, 1330, the billing information and the invoice may be transmitted electronically through the Internet 101.

In both cases, the payor number and the invoice number are made unique among the payors, the invoices, and/or payor/invoice combinations. For example, if two lockbox customers issue invoices to a same payor, the payor numbers on the two invoices may be different from each other. In some cases a unique number may be generated by lockbox operator system 102, in conjunction with data repository 103 and software 1302. Generating a unique number may be implemented as appending a unique prefix to a standard payor number and invoice number issued by customer software 1301. In some cases, the system 1300 provides a plug-in for software 1301 that can communicate with lockbox operator system 102 to download for each transaction the required information to generate unique numbers.

Figure 14:
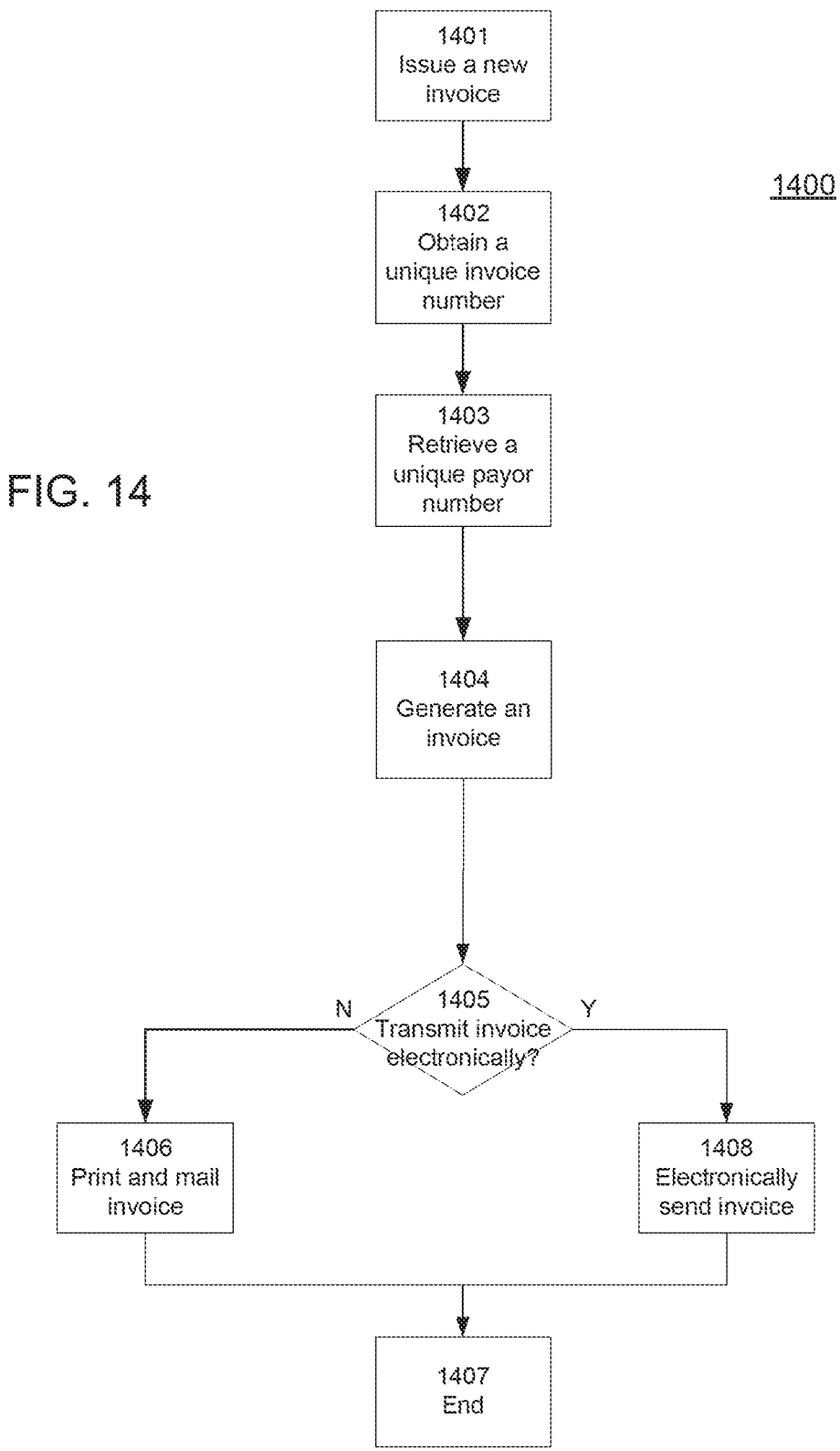
FIG. 14 is a flow diagram of an exemplary process for preparing a billing transaction according to one embodiment of the present invention.

FIG. 14 shows an exemplary process 1400 for preparing a billing transaction according to one embodiment of the present invention. In step 1401 a lockbox customer issues a new invoice to the system 1300. In step 1402 the system 1300 obtains a unique invoice number for the invoice, either from the local system 122x or from the main system 102 and data repository 103. In step 1403 the system retrieves a unique payor number. If necessary, the system generates a new unique payor number for a new payor or for existing payors that do not yet have a unique payor number (e.g., for a new lockbox customer). Alternatively or additionally, the system could create a unique identifier for each payee, payor, or payee/payor combination. This unique identifier can be a combination of a generic post office box plus a code or mail stop that is unique to the payee, payor, or payee/payor combination. In step 1404 the system 1300 generates an invoice, e.g., using process 700 as shown in FIG. 7. In step 1405 the process branches. If the invoice is not transmitted to the payor electronically (no branch), in step 1406 the system prints the invoice for postal mailing and the process terminates at step 1407. If the invoice is transmitted to the payor electronically (yes branch), in step 1408 the system transmits the invoice to the payor in a suitable electronic document file (EDF) format (e.g., PDF) and then the process ends at step 1407.

Figure 15:
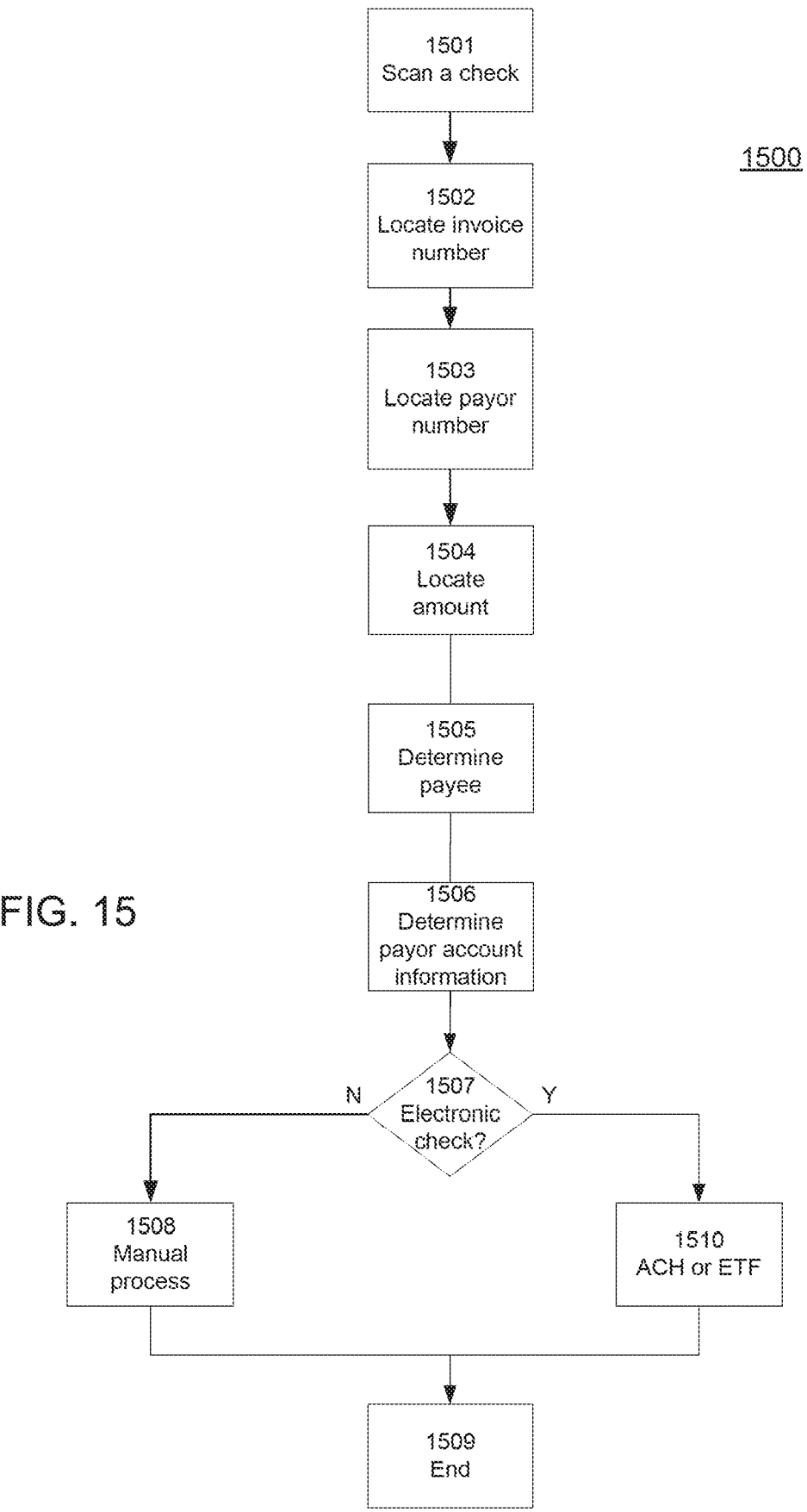
FIG. 15 is a flow diagram of an exemplary process for processing checks received from payors according to one embodiment of the present invention.

FIG. 15 shows an exemplary process 1500 for processing checks received from payors according to one embodiment of the present invention. In step 1501 a received check is scanned. In step 1502 the system locates the unique invoice number on the scanned check. In some cases, this process can be aided by having a unique signature (for example, a prefix "555" or similar) that allows the system to identify the unique invoice number more readily. In some cases the system utilizes a process similar to the one described above in FIGS. 3 and 4 to locate data in the scanned check. In step 1503 the system likewise locates the unique payor number on the scanned check. In most cases, the system needs only one of these two numbers to identify the correct lockbox customer account to deposit the check and/or to credit the correct payor account for the payment. For example, even if two lockbox customers are both depositing payments from the same payor, the system has assigned two different unique payor numbers to the payor for the two invoice payments. Therefore, the system 1300 can correctly deposit the two checks to the two lockbox customers' accounts respectively and credit the payor's two accounts for the two payments accordingly. In step 1504 the system finds the paid amount on the scanned check. Based on the information obtained from the scanned check, in step 1505 the system accesses data in data repository 103 to determine which lockbox customer is the payee. In step 1506 the system finds the lockbox customer's account information and access codes. In step 1507 the process branches based on whether the check is an electronic check. If the check is not an electronic check (no branch), in step 1508 the paper check is sent to a lockbox staff to manually processes the check, and the process terminates at step 1509. If the check is an electronic check (yes branch), the process moves to step 1510, where the system executes an ACH or EFT transaction to deposit the electronic check, and the process terminates at step 1509.

If neither the invoice number nor the payor number is available when the payment is being processed, the system could use one or more of the following approaches to resolving the payment. For example, the system could provide an exception handling user interface (UI). In this UI, a user (e.g., the payor, the payee, a lockbox staff) could look up all outstanding invoices across all companies using the lockbox service. This lookup would allow searching on any of the fields on the check, including the payor, the amount, or the payee. Another option would be for the system to credit the payment to the payee, but provide an interface for the payor/payee to select the invoice it should be applied to. Alternatively, the system could email the payor/payee to ask which invoice the payment was meant for. And, as another option, an agent could call the payor/payee to determine which invoice the payment was meant for.

Therefore, the described systems and processes efficiently and correctly deposit incoming checks to the correct lockbox clients' accounts, independent of the payor identity and of the accounting software used for issuing invoices.

Enhanced Private Interbank Clearing System

Figure 16A:
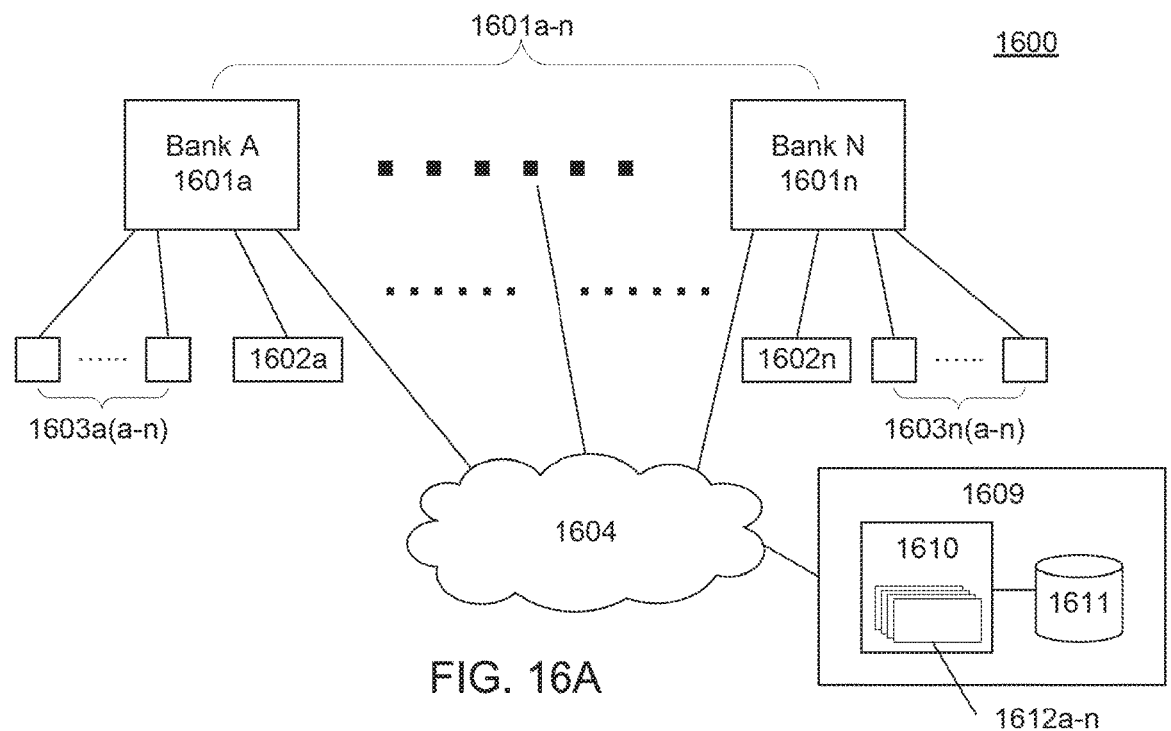
FIGS. 16A and 16B are block diagrams of a system view and an account view of an exemplary system according to one embodiment of the present invention.

FIG. 16A shows an overview of an exemplary system 1600 according to one embodiment of the present invention. System 1600 includes multiple banks 1601$a$-$n$ and an interbank clearing system 1609, which has a server 1610, a data repository 1611, and multiple software instances 1612$a$-$n$. In some cases the clearing system 1609 is implemented in an electronic payment system (EPS) such as the one shown in FIG. 1. Banks 1601$a$-$n$ and the clearing system 1609 connect through a network 1604. Network 1604 typically could be the Internet with added security or Virtual Private Networks (VPNs). In other cases network 1604 may be a private network, a wireless network, or a hard-wired network, or any combination thereof. Also shown are exemplary customer and partner accounts 1603$a$($a$-$n$) of related parties and a clearing entity master account 1602$a$ at the bank 1601$a$ and reciprocal clearing entity master account 1602$n$ and additional customer and partner accounts 1603$n$($a$-$n$) at bank 1601$n$.

System 1600 thus permits the making and receiving of payments on the intra-bank host (within a specific bank 1601). Examples of intra-bank transactions include transactions between accounts 1603$a$($a$-$n$) and 1602$a$ in bank 1601$a$ and, respectively, transactions between accounts 1602$n$ and 1603$n$($a$-$n$) within bank 1601$n$. The combination of these two intra-bank host-based transfers enables a transfer from a customer 1603$a$($a$-$n$) at Bank 1601$a$ to a vendor 1603$n$($a$-$n$) at bank 1601$n$ to be completed within bank clearing system 1609. Therefore, if a total of all the balances of the master account 1602$x$ and customer and partner accounts 1603$x$($a$-$n$) in a single bank 1601$x$ is calculated, then to clear the transactions all that needs to be done is to effect a transfer between clearing entity master accounts 1602$a$-1602$n$ at each of the respective banks 1601$a$-1601$n$, in this example, to keep the clearing entity master accounts 1602$a$-$n$ balanced (within preset boundaries). The transfer needs not be the exactly accurate amount of the difference of the transfers effected at each end, because there may be a base balance, which, in this example, is a base amount in each of the master accounts 1602$a$-$n$, that is allowed to vary within a certain range.

This approach can be extended not just to two banks, but to dozens, hundreds, or all of the banks in a country or in the world. With a few strategically selected banks, in many cases a vast majority of the transactions can be effected in this way immediately. The balancing transaction between account 1602$a$ and another account 1602$x$ (x within b-n) to keep all the floats in the master accounts 1602$a$-$n$ in range could be done, for example, just before the end of the day using a wire transfer, to effect immediate transfers between banks. Other similar money transfer mechanisms (e.g., ACH, EFT) may also be used.

Figure 16B:
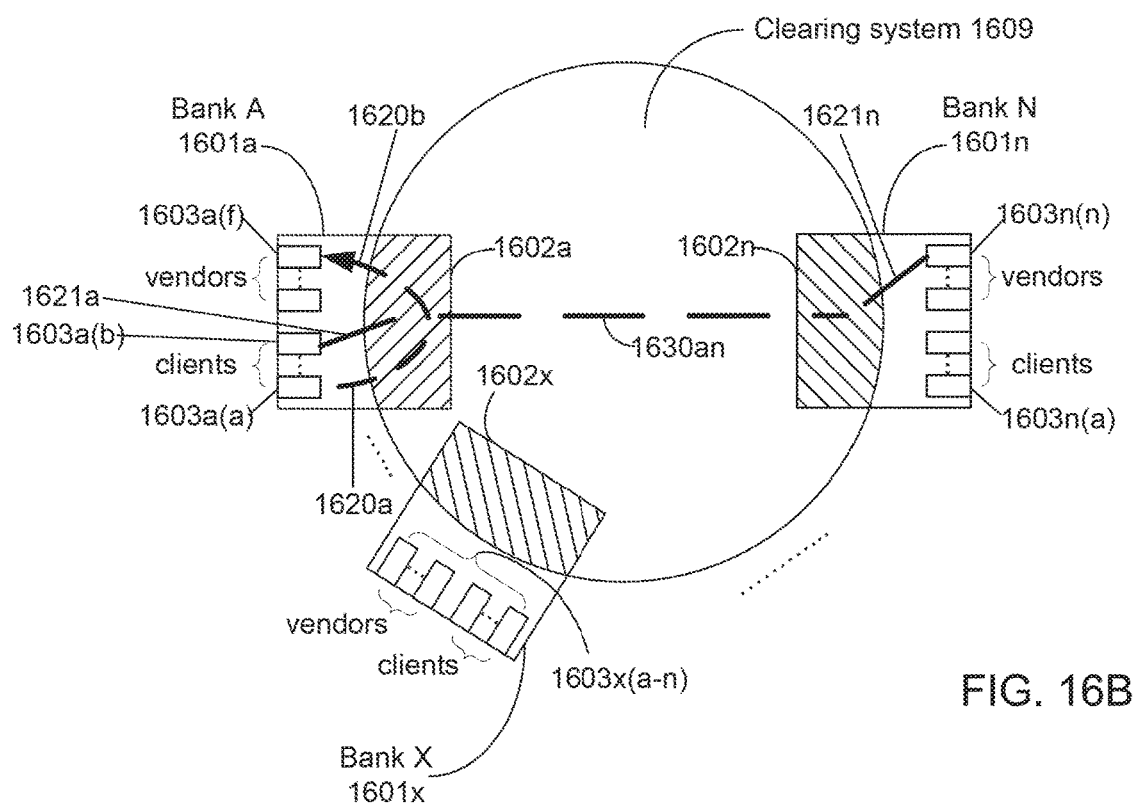

FIG. 16B shows a different view of the same systems, as a view focused on accounts and not a system view. As shown, the clearing system 1609 is represented by a circle and the participating banks are represented by blocks overlapping with the circle. The overlapped portion represents the corresponding clearing entity master accounts 1602$a$-$n$. The other bank accounts 1603$a$-$n$($a$-$n$) are represented by blocks within the corresponding banks outside the circle.

Making and receiving intra-bank payments directly on a bank's host system enable the transfers to clear immediately (or return a message immediately if funds are not available). Therefore, such intra-bank transactions eliminate the risk to the third-party system for managing payments. In addition, when access to the bank's host is not available, the bank may provide accelerated messages for returns, allowing the ACH transactions to clear in one day rather than the customary two-day period.

In FIG. 16B, for example, a transfer from customer 1603$a$($a$) to vendor 1603$a$($n$) is executed on the intra-bank host of Bank A, from account 1603$a$($a$) to clearing entity master account 1602$a$ as transfer 1620$a$ and then on to vendor account 1603$a$($n$) as transfer 1620$b$. However, a transfer from customer 1603$a$($b$) (at Bank A) to vendor 1603$n$($n$) (at Bank N) is made as transfer 1621$a$ from account 1603$a$($b$) to master account 1602$a$ (at Bank A) and then as transfer 1621$n$ from master account 1602$n$ to account 1603$n$($n$) (at Bank N). Also shown symbolically is a transfer 1630$an$, symbolizing the clearing transactions between different master accounts 1602$a$, 1602$n$ as needed to rebalance the system.

Figure 17:
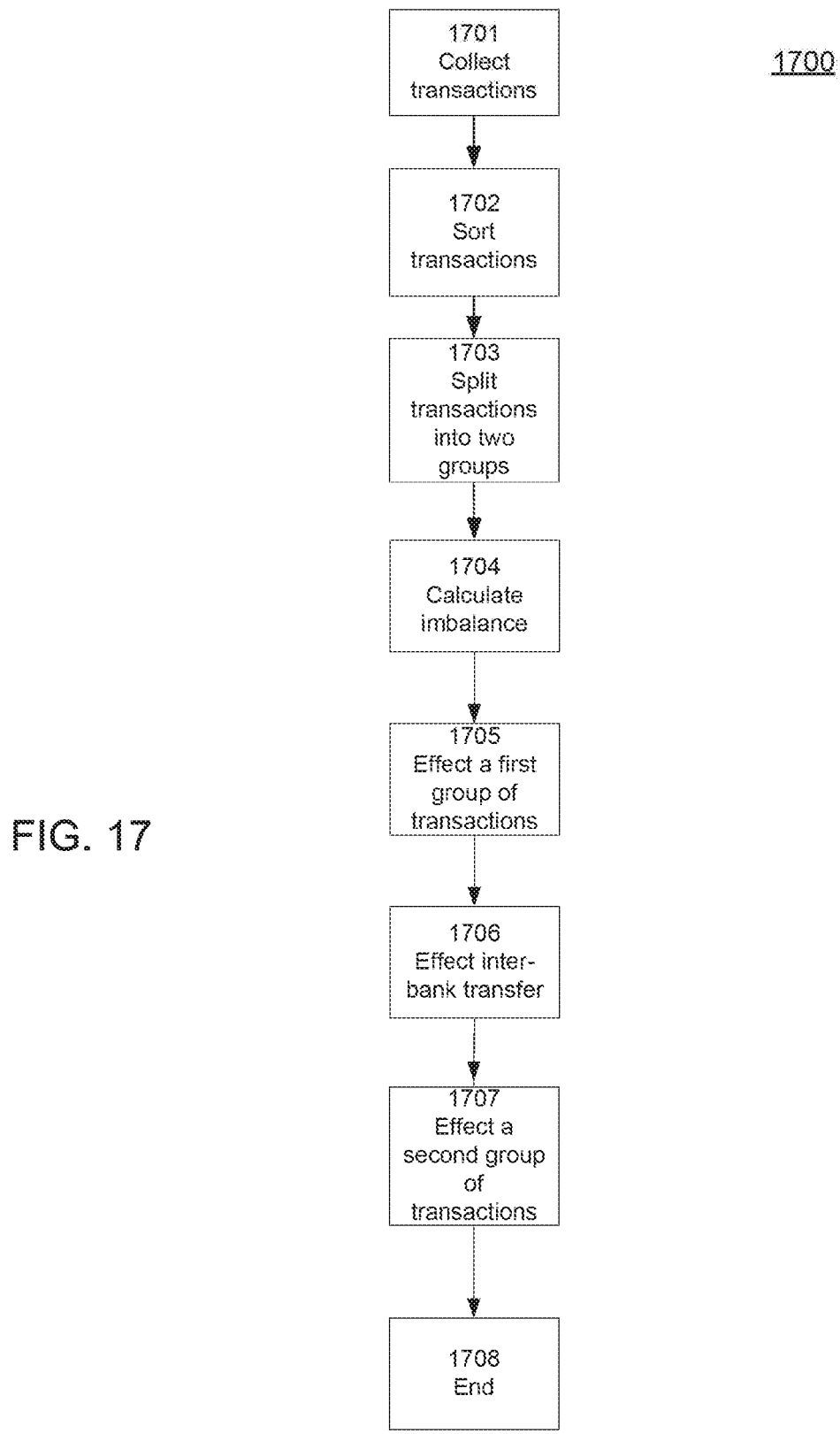
FIG. 17 is a flow diagram of an exemplary process for implementing the system shown in FIGS. 16A-B according to one embodiment of the present invention.

FIG. 17 shows an overview of an exemplary process 1700 for implementing the system shown in FIGS. 16A-B according to one embodiment of the present invention. In step 1701 all the transactions to be effected are collected from data repository 1611. In step 1702 the transactions are sorted according to their origin and destination ends. Thus, for example, a transaction from one customer account to another partner account (between accounts 103$a$($a$-$n$)) within the same bank do not have to be taken into account in calculating the clearance between master accounts 1602$a$-$n$.

In step 1703 the system splits the sorted transactions into, in this example, intra-bank transaction groups A and B, for each of the banks 1601$a$-$n$ having pending transactions. Group A contains transactions of money from the respective customer accounts 1603$x$($x$) into the master account 1602$x$; and group B from the master account 1602$y$ into the receiving partner account 1603$y$($y$). By splitting the transactions into two groups, the transactions transferring money to the master accounts can be effected first. In some cases, for all transactions where the initial transfer from customer accounts 1603$x$($x$) to master account 1602$x$ was successful, and where the master account balance 1602$y$ supports it, the funds can be transferred immediately to customer accounts 1603$y$($y$).

In step 1704 the imbalance among the master accounts at all the participating banks can be calculated. In step 1705 the transactions in group A are effected, and in step 1706 the interbank wire is effected. In step 1707, after verifying that the interbank wire has been received, a transaction for group B (those accounts where the master account balance 1602$y$ did not support the second transfer in step 1703) is effected. Depending on the timing of the interbank wire, transaction group B may be executed on the next business day. Intrabank (host) transactions such as those of groups A and B may be done after close of business. However, the interbank wire used in step 1706 is only available at a specific hour. The process ends at step 1708.

It is clear that many modifications and variations of this embodiment may be made by one skilled in the art without departing from the spirit of the novel art of this disclosure. For example, instead of having two transaction groups, more groups or just a single group can be defined, with the latter option of one group especially suitable in cases where the balance is sufficient. Additionally, the system could analyze the money flow among banks, based on a daily, weekly, and quarterly pattern, and other suitable factors, including but not limited to holidays, weather, economic indicators, stock market indicators, and hence calculate which amounts must be exchanged and which amounts can be taken out of balances, knowing that there is a high likelihood of the balances being replenished in the next few days. Thus this technique can reduce the amount of wire transactions. Also, in another case, a super-master account may be established as a single hub to clear multiple master accounts, or, in other situations, a master account may be established with banks that have their own real-time links to other banks, therefore allowing non-wire transfers among those linked banks in real time. These modifications and variations do not depart from the broader spirit and scope of the invention, and the examples cited here are to be regarded in an illustrative rather than in a restrictive sense.

Therefore, comparing to the conventional approaches, the described systems and processes transfer money between accounts at different banks faster and more cost-effectively.

Enhanced Electronic Anonymized Payment System

Figure 18:
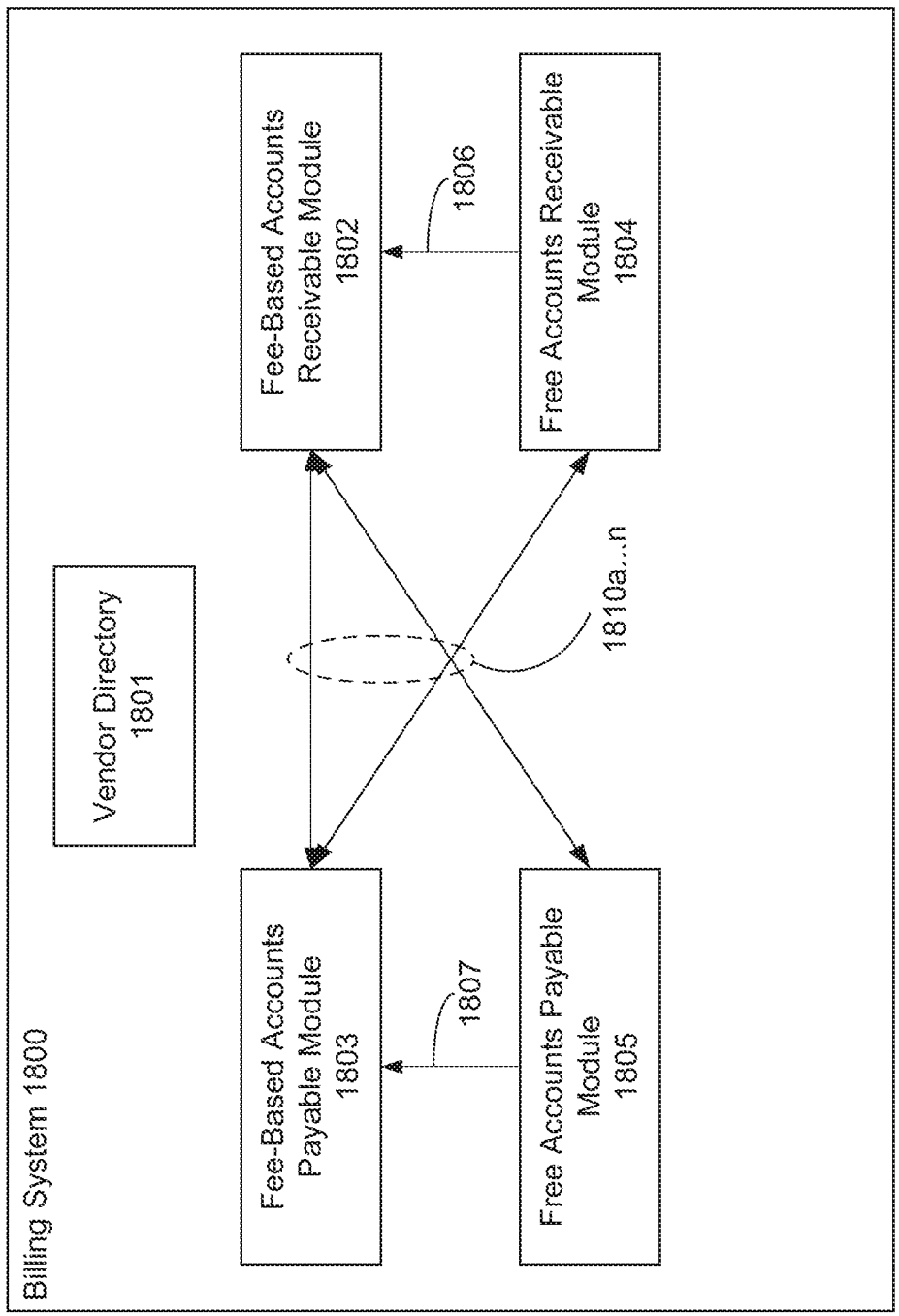
FIG. 18 is a block diagram of a billing and payment system according to one embodiment of the present invention.

FIG. 18 shows an overview of an exemplary electronic billing and payment system 1800 according to one embodiment of the present invention. As shown, the billing and payment system 1800 includes a vendor directory 1801, a fee-based accounts receivable module 1802, a free accounts receivable module 1804, a fee-based accounts payable module 1803, and a free accounts payable module 1805. The fee-based accounts receivable module 1802 provides functions such as synchronizing invoices and payments, sending invoices, inviting customers to the system 1800, web lockbox service, and collaborate. The free accounts receivable module 1804 provides functions such as sign up usability, create/upload invoices, track payments, collaborate, and upgrade to fee-based account receivable accounts. The fee-based accounts payable module 1803 provides functions such as collaborate, accelerate, ePayment, adoption, and mass invite. The free accounts payable module 1805 provides functions such as pay bills, collaborate, and upgrade to fee-based account payable accounts. In general, the services/functions provided by the free modules 1804, 1805 are a limited subset of services/functions provided by the fee-based modules 1802, 1803, accordingly.

Both the fee-based modules 1802, 1803 provide fee-based services to users (e.g., customers and/or vendors) with fee-based accounts. In addition, the system 1800 invites certain customers (e.g., accounts payable) and vendors (e.g., accounts receivables) to use system functions of the free modules 1804, 1805 for free. Also, customers who have a fee-based accounts payable account may have a free private vendor. For clarity, a customer with a fee-based accounts payable account 1803 is called a "paid customer"; a customer with a free accounts payable account 1805 is called a "free customer"; a vendor with a paid accounts receivable account 1802 is called a "paid vendor", and a vendor with a free accounts receivable account 1804 is called a "free vendor".

The vendor directory 1801 allows the system to identify a vendor and thus transfer payments without requiring any specific financial information about this company. The vendor directory 1801 supports additional biller networks and EDI (Electronic Data Interchange) vendors, promotes vendors (e.g., account receivables) to directory, and provides pay to console. In one embodiment, the vendor directory 1801 comprises a database that stores information about vendors and some of the information (e.g., full business name such as "AT&T Wireless" and "AT&T Small Business Services", postal address) is searchable by users. The database may also include information about the customers (e.g., customer's name and mailing address), some of which may be searchable by users. Each of the users (vendors, customers) has a unique ID (also called the network ID) that can be assigned or generated (e.g., by applying cryptographic hash function to information about the user).

A paid customer may pay to its accounts-receivable vendors, using one of the transactions 1810a-n, either to paid vendors or to free vendors, which the customer may invite its vendor to become, to simplify the process of paying bills. The free vendor gets a free, no-hassle account that allows him to receive payments from existing paid customers. The goal is eventually to encourage the free vendors to become a paid vendor, as indicated by arrow 1806, so the vendor would have the ability to also invoice other parties. When a vendor (also called an account receivable user or AR user) receives a payment through the system 1800, the payment is automatically matched to the appropriate customer and invoice in the vendor's accounting system. Paid vendors can likewise invite new customers to free accounts payable accounts 1805 or work with existing paid customer and receive payments using the system 1800. Similarly, the goal here is to eventually let the free customers become paid customers, as indicated by arrow 1807. In some cases, the electronic billing and payment system 1800 may provide promotions to encourage users to invite not-yet-linked customers or vendors. Unlike typically offered trial accounts, the system 1800 may set no time limit for the limited functionality provided by the free modules 1804, 1805.

By offering enhanced funds flow management, migration into the system 1800 becomes easy. Further, the system 1800 offers plug-ins into popular accounting systems thereby allowing easy integration into a company's operation without disrupting or complicating internal processes. In fact, each user can update its accounting system without even knowing what the other user's accounting system is via the network synchronization. Thus a vendor can easily achieve single site billing, and customers can have the same convenience. Rather than having to log into a myriad of web sites operated by different entities (e.g., vendors, banks, service providers, etc.), all the invoices arrive at one central location and flow from there directly into the company's accounts payable, thus reducing the overhead and time wasted. Also, statements and reconciliations maybe transmitted among the accounts, and on the return path adjustments, credits, discounts, etc., all with much clearer and simpler communication than today's scribble on a copy of an invoice, etc.

Additional system functions may include managed visibility of the payment process. For example, a customer could let a vendor know that he has received a bill, that the bill has been approved, and when it is scheduled for payment, thus offering better transparency of the process. In some cases queries and or complaints may also be routed over the system. However, the customer has control over these transparency features and can decide what features are to become visible to the vendor. Additionally, the system may offer a mutual rating system that could, for example, rate a customer on such characteristics as timeliness of payment, accuracy of disclosed information, follow-through, etc. Because all the data is available, such as billing date, payment terms, and actual payment, as well as whether there were complaints or other issues, a very accurate payment quality can be derived, much more accurate than typical rating agencies can obtain on small or medium enterprises.

It is clear that many modifications and variations of the above-described embodiments may be made by one skilled in the art without departing from the spirit of the novel art of this disclosure. For example, instead of having two transaction groups, more groups or just a single group can be defined, with the latter option of one group especially suitable in cases where the balance is sufficient. Additionally, the system 1800 could analyze the money flow among banks, based on a daily, weekly, and quarterly pattern, and other suitable factors, including but not limited to holidays, weather, economic indicators, stock market indicators, etc. and hence calculate which amounts must be exchanged and which amounts can be taken out of balances, knowing that there is a high likelihood of the balances being replenished in the next few days. Thus this technique can reduce the amount of wire transactions. Also, in another case, a super-master account may be established as a single hub to clear multiple master accounts, or, in other situations, a master account may be established with banks that have their own real-time link to other banks, therefore allowing non-wire transfers among those linked banks in real time. These modifications and variations do not depart from the broader spirit and scope of the invention, and the examples cited here are to be regarded in an illustrative rather than in a restrictive sense.

Accordingly, in one aspect, the described embodiments provide a system and method that allows two companies to abstract their bank accounts and still exchange money. In another aspect, the described embodiments provide a system and method that allows a vendor or customer to populate and update the data in their customer's or vendor's accounting system from their own accounting system EDI-style. This approach eliminates the need to re-enter data manually, which typically can also increase risks for transcription errors. The vendor/customer may define a permissions mask controlling when and how information is shared during the billing/invoice payment process (e.g., upon the completion of a workflow). For example, one company may choose to propagate data to its vendors informing them that an invoice has been received, that the invoice has been approved for payment, and that the invoice has been paid. A second company may choose, through its permissions mask, to only share the fact that the invoice has been paid, not the interim steps leading to that bill being paid.

In another aspect, the described embodiments provide a system and method that allows synchronization of invoices and payments from vendor to customer, and back (e.g., both ways). In another aspect, the described embodiments provide a system and method that allows vendors and customers to define a permission mask controlling when/how information is shared during the billing/invoice payment process. In another aspect, the described embodiments provide a system and method that allows both vendors and customers to have a unique network ID in a master directory independent of regular items, including but not limited to tax ID, email address, corporation number, etc., thus enabling them to link to other companies, and also allowing companies to invite their vendors and customers to create an account which links them to the their customer/vendor in a single step. In another aspect, the described embodiments provide a system and method that allows companies to manage the flow of funds into and out of a single bank account for purposes of making bill payments and collecting on receivables. In another aspect, the described embodiments provide a system and method that allows a company to accept invitations to connect from multiple vendors or customers from within a single system, and also allows users to invite groups of vendors or customers from a database of vendors/customers in a company's accounting system.

Advanced Invitation Process

Figure 19:
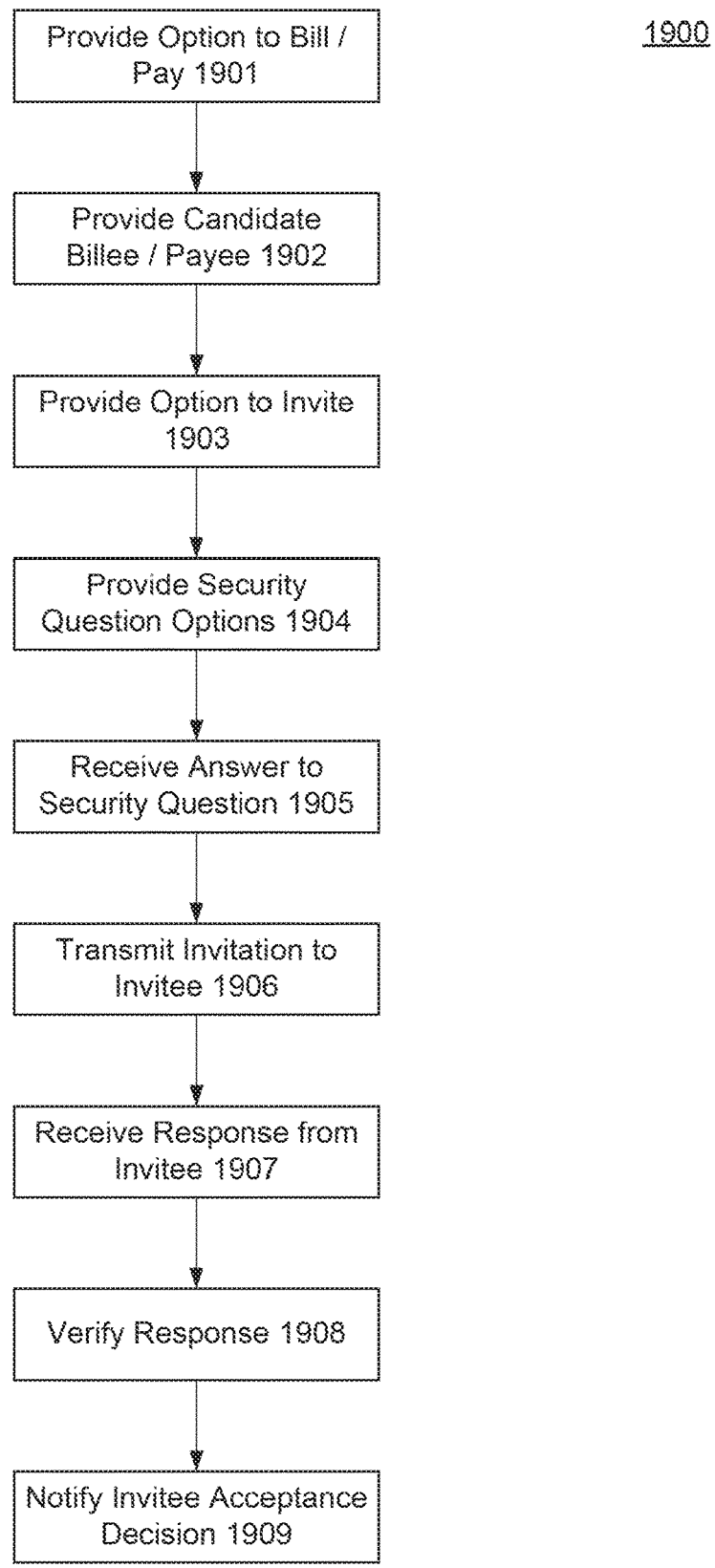
FIG. 19 is a flow diagram of an exemplary process for inviting entities to open accounts at an electronic billing and payment system according to one embodiment of the present invention.

FIG. 19 shows an exemplary process 1900 for inviting entities to open accounts at an electronic billing and payment system, according to one embodiment of the present invention. The process 1900 may be implemented by an electronic billing and payment system such as the ones showed in the accompanying figures. Each step in the process 1900 may involve retrieving and/or recording information in a data repository such as the data repository 1611 in FIG. 16 and the data repository 103 in FIG. 1.

In step 1901, the system provides a user (hereinafter called an "invitor") multiple various system options including an option to bill (if the invitor is a vendor/accounts receivable) and/or an option to pay (if the invitor is a customer/accounts payable). In step 1902, the system receives from the invitor a user selection of the option to bill/pay, and provides the invitor with a list of candidate billees/payees and/or an option to input a billee/payee. In step 1903, the system receives from the invitor a user selection (or input) of the respective billee or payee, and provides the invitor with various applicable system options including sending the billee/payee an invitation for a free account with the system. In step 1904 the system receives from the invitor a user selection of sending an invitation for a free account to the selected/inputted billee/payee (hereinafter called the "invitee"), and provides the invitor with security question options that the invitee must answer in order to accept the invitation. For an invitee that the invitor knows well, he may draw from a set of standard security questions provided by the system or create a security question about personal information, such as city of birth, name of first pet, name of grammar school, etc. Alternatively, the invitor may draw from a set of standard security questions provided by the system or create a security question about company-related information that only the correct invitee would know, such as, for example, name of manager, last four digits of business telephone number, etc. In step 1905, the system receives from the invitor a user selection (or input) of a security question, along with the "correct" answer that he anticipates from the invitee. The system may then receive from the invitor inputs regarding other billing and/or payment transactions, or repeat steps 1901 through 1905 to invite other entities.

The completion of step 1905 triggers the system to perform step 1906, in which the system creates and transmits an invitation (e.g., an email message) to the invitee. In step 1907, the system receives a response to the invitation (e.g., email or other type of message) including an answer to the selected security question. In step 1908, the system verifies the response by comparing the answer from the invitee against the "correct" answer entered by the invitor. The system can be configured to, either as default or in case of a non-matching response, present the invitee's response to the invitor for further verification. In step 1909, once the response is verified (either by the system or by the invitee), the system notifies the invitee of acceptance (or not) into a free part of the system extended to partners of paying users and the system creates a link between the account of the invitor and the new account of the invitee for the purposes of sharing invoice information, making electronic payments, transmitting remittance information, and maintaining basic information about the invitor and invitee (e.g. the invitee's company name, address, and other contact info). In some cases, the processes of steps 1906 through 1909 may all be carried out via email. In other cases, the initial invitation prepared in step 1906 may contain a link to a secure web site where the system and invitee execute the remaining steps. In some cases, after an invitor has instructed the system to send an invitation, the system may detect that the named invitee has already been activated for service by another customer of the service (or otherwise has an account with the system). In such a case, rather than sending out an invitation, the system asks the invitor to verify the identity of the proposed invitee to ensure that the invitee is indeed the same entity. If so, the invitee is then linked automatically to the invitor for services such as receiving electronic invoices and payment services, or receiving electronic transactions at no cost, etc. During the matching process, in some cases there may be a near match, which then can be confirmed by the user; or the system may ask the user to select from a list of existing active users.

Additional Embodiments for Pre-Populated Check Endorsement Section

Figures 20A, 20B:
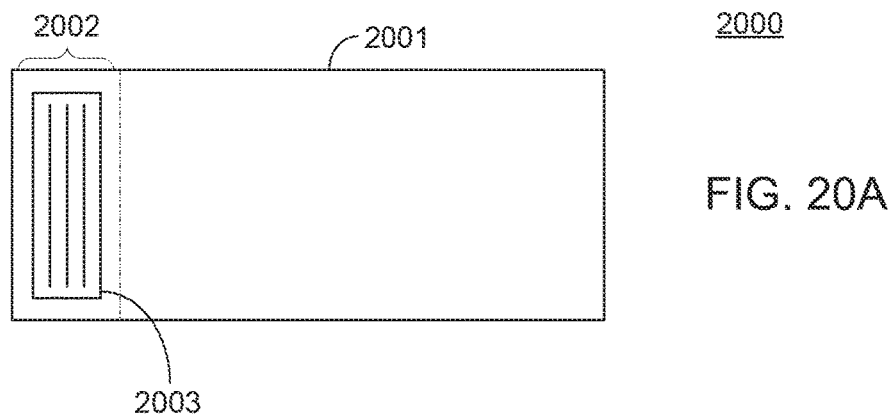
FIGS. 20A and 20B are diagrams of a backside of an exemplary check and an endorsement section of the check according to one embodiment of the present invention.

FIGS. 20A-20B shows another embodiment for pre-populating the check endorsement section in addition to the embodiments described in the section titled "Enabling Correct Check and Electronic Payment Deposit", according to one embodiment of the present invention. FIG. 20A shows an overview of the back side 2001 of a check 2000. Endorsement section 2002 contains a boxed area 2003. FIG. 20B shows exemplary details of boxed area 2003, according to one embodiment of the present invention. Details include a checkbox 2004, which the recipient of the check may check to accept a free service agreement; an ABA number line 2005; an account number line 2006; an email address line 2007; and a printed information line 2008, which may be a reference to a URL (in this example, www.**.com/tc) at which location the user may see the terms and conditions that he accepts when he checks the box 2004**. In some cases, a signature may also be requested next to the box, giving permission from the invitee to open an account in his or his company's name.

A billing and payment system creates a check for a user of the system to make a payment to a non-user, and pre-populates the endorsement section as illustrated in FIGS. 20A-20B and described above. Once the non-user cashes the check, the system receives an image of the cashed check and analyzes the filled boxed area 2003 to determine whether the non-user accepted the free service agreement (i.e., checked the checkbox 2004). If the non-user accepted the agreement, the system enrolls the non-user to the free service and sends an email to the non-user to the address the non-user provided in the boxed area 2003.

Map of Trust and Familiarity

Figure 21:
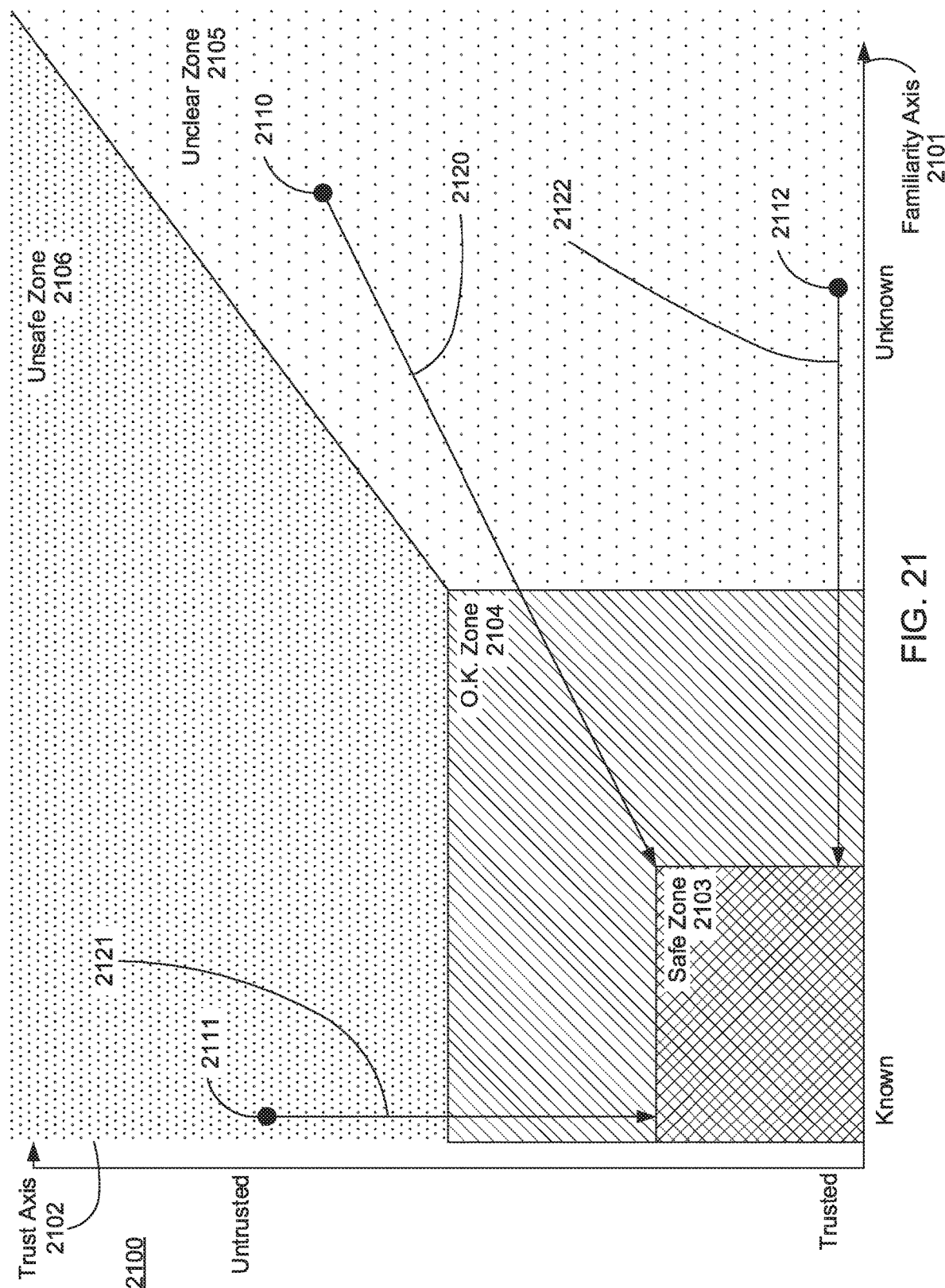
FIG. 21 is a diagram of a map of trust and familiarity for an electronic billing and payment system according to one embodiment of the present invention.

FIG. 21 shows an exemplary overview of a map 2100 of trust and familiarity for an electronic billing and payment system, according to one embodiment of the present invention. The map 2100 has a familiarity axis 2101 and a trust axis 2102. The axis 2101 shows the range of familiarity (i.e., how much experience the system has with an entity), from known to unknown. The axis 2102 shows the range of trustworthiness, from trusted to untrusted. The familiarity and trustworthiness of an entity (or user) can be determined based on information the entity has provided, and/or the length of time the entity has been making transactions in the system without problems, such as, for example, cancelled checks to provide proof of actual business, uncovered checks providing information about lack of funds or lack of planning, etc. For example, the more positive transactions are recorded for an entity, the more the entity is trusted.

The system has essentially four zones of entity qualifications as illustrated in the map 2100. There is a safe zone 2103, which comprises known and trusted entities. Entities that are less well known and/or less well trusted are in an O.K. zone 2104. Entities whose qualities are unknown, usually because they are new to the system, are in an unclear zone 2105. Everything else beyond those three zones is an unsafe zone 2106. Depending on how the system is configured, new accounts may start in different locations in the map 2100, such as points 2110, 2111, and 2112. As the entities establishes itself to the system, their trustworthiness/familiarity to the system move in the map 2100 along trajectories such as, respectively, 2120, 2121, and 2122, which trajectories may be linear or not, depending on such variables as types of transactions, time periods between transactions, amounts transacted, and hopefully eventually, ending up in the safe zone 2103. For example, if any entity transacts only one or a few transactions of very small amounts, it may not progress beyond the OK zone 2104, because the system does not know if these transactions are only for the purpose of gaining a trusted rating from the system.

In some cases, these trust ratings may be available to customers; in other cases, this data may be available internally only, for internal assessment of transactions. In yet other cases, the data can be made publicly available; thus the system can act as infrastructure or basis for a rating agency. Also, additional information such as timeliness of payment, etc., may be separately rated or considered in the map 2100. Further, based on the receivables side, a company may be rated on the timeliness of payments received from it relative to the due date. Accordingly, a lot of information may be mined from the information derived from behavior of both customers and their partners, but not necessarily all information may be made public (as in available to customers or to the public in general, for example, for a fee), nor is it desirable to make all the information public. Additionally, the system may take into account the referral or recommendation of a particularly trusted party, such as a CPA firm or an accredited bookkeeping firm. Further, these trusted parties themselves may have their ratings going up or down based on their behavior and the behavior of the companies they have recommended.

Secured Document Lockbox System

Figure 22:
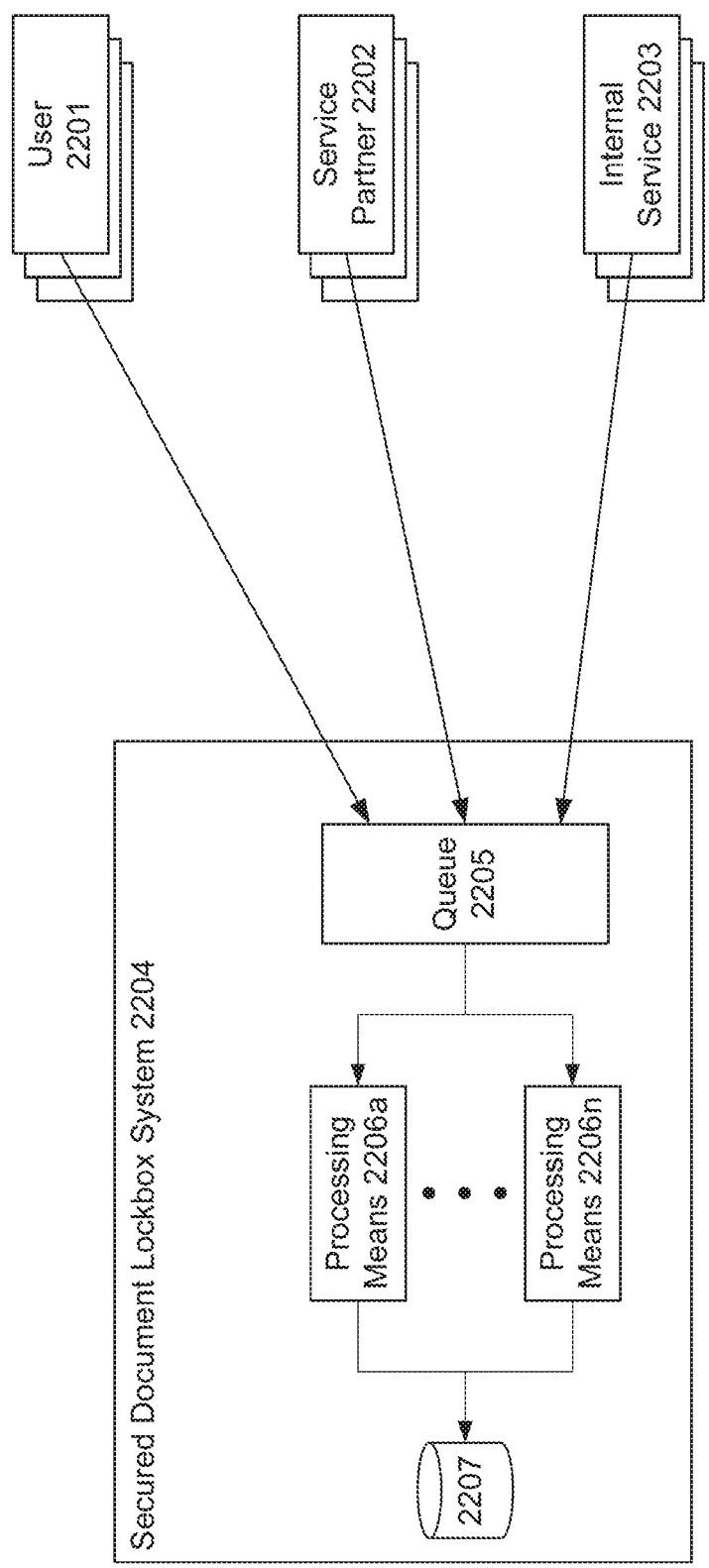
FIG. 22 is a block diagram of a secured document lockbox system according to one embodiment of the present invention.

FIG. 22 shows a secured document lockbox system 2204 for invoices and other accounting-related documents, according to one embodiment of the present invention. The system 2204 receives documents from sources such as system users 2201 (e.g., customers, vendors), service partners 2202 (e.g., CPAs, accountants, etc.), and internal system services 2203 (e.g., of a billing and payment system). These documents may be scanned and emailed to the system 2204, faxed to the system 2204, or sent as physical paper documents to the system 2204. In some cases, for example, customers 2201 may ask partners 2202 to send their invoices and/or other accounting-related documents to a post office box address of the system 2204.

All received documents are placed in a queue 2205, out of which they are processed by one or more of various means 2206*a-n*. The queue 2205 allows for efficient and secure document processing by a third party. The system 2204 restricts documents/information made available to processing means 2206 to only those necessary for the processing (and not any other potentially sensitive data in the customer's account), and thereby enables a much more secure process. By allowing the processing to be routed to a single queue, the system 2204 becomes a central resource for working through documents across a number of unique accounts belonging to different companies or organizations. Examples of the processing means 2206 include manual input of printed data by data entry personnel, OCR scanning, and any other similar suitable processing means.

In one embodiment, every document is processed by at least two separate processing means 2206, as an accuracy check. If the two processing results do not match, the document is processed further (e.g., by another processing means 2206) to obtain at least two matching results. When the document is satisfactorily processed, it is stored in a data repository 2207, from which it is then passed back to the corresponding document source, and/or entities needing it. To pass back the processed document, the system 2204 may send a message with the document attached as a secure importable file that could be imported directly into the accounting system of the receiving entity. In some cases, the system 2204 may send the document directly to an online accounting system (not shown), subject to the online accounting system providing the right credentials; while in other cases the system 2204 sends only a notification, telling the entity to go to a secure web site and download the file, in a manner similar to services currently available to banking customers.

Enhanced Interoperability for Heterogeneous Accounting Systems

In some cases, a SAAS-based system for sending bills and payments in conjunction with a third-party accounting system may deploy a downloadable program interface to configure the third-party accounting system and then send and receive data between the two systems. Alternatively, a communication module between SAAS units (CSU) may be deployed to configure the third-party accounting system and then send and receive data between the two systems. Further, the transmitted bills may contain an electronic signature, a line item billing, and/or other transaction-specific meta data, and, based on cash flow needs and outstanding bills, some or all customers may be offered a very substantial time-limited discount for immediate payment. Also, customers may use the line-item billing feature to withhold partial payments for specific issues attributed to specific items.

Figure 23:
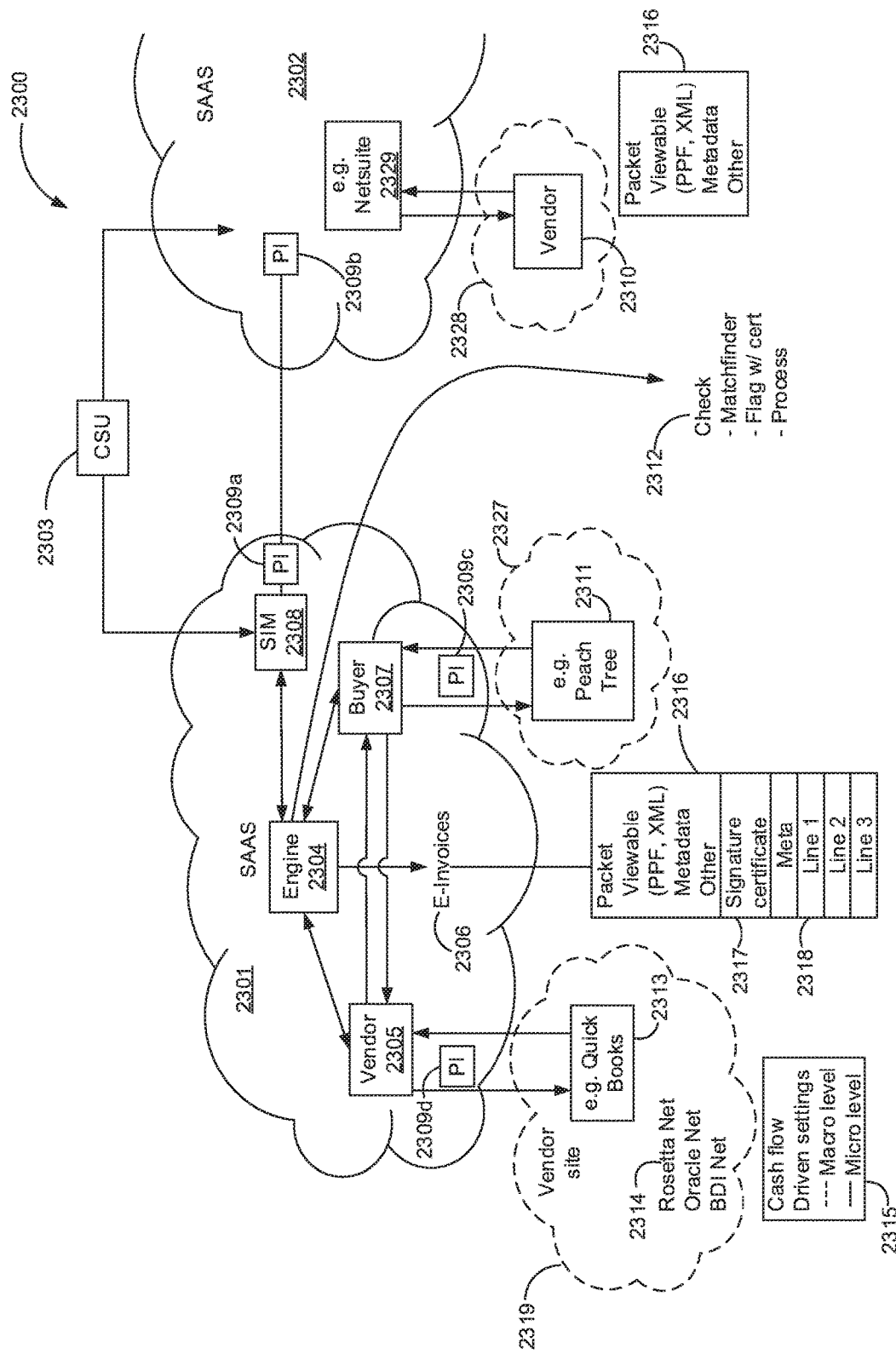
FIG. 23 is a diagram of a cloud implementation of an accounting and payment system according to one aspect of the system and method disclosed herein.

FIG. 23 shows an overview of an exemplary cloud implementation 2300 of an accounting and payment system, according to one aspect of the system and method disclosed herein. SAAS cloud 2301 for payment service contains a SAAS engine 2304, a vendor module 2305 and buyer module 2307. These two modules interact with each other through the SAAS engine. At vendor site 2319 an accounting program, such as, for example, Quick Books 2313, is running, as well as an instance of a programming interface PI 2309d. PI 2309d can automate certain processes and enable direct interface between the local software 2313 and SAAS-based vendor module 2305. PI 2309d may be, in some cases, a separate application that requires installation, or in other cases it may be simply a Java-style or Java Script type application that is downloaded by the browser as part of a portal page and can interact with the software on a local machine. In addition to Quick Books, other software that can be supported in a similar manner may include Rosetta Net, Oracle Net, BDI Net, etc. Further, upon integration of the accounting system 2313 with the SAAS-based billing and payment system 2301, a vendor can better manage his billing space, not only for actual orders, but also, for example, cash-flow-based decisions and settings 2315, as discussed later. The cash flow can be driven both on the macro level, for all pending orders, as well as on the micro level, for particular items or customers. These features enable a vendor to send a message, for example, saying that if payment is received in the next 24 hours the buyer will receive a discount, enabling a yield management for cash flow.

The vendor module 2305 interacts with payment and billing engine 2304 to send out e-invoices 2306. The invoice contains three main sections (2316, 2317 and 2318). The first section 2316 comprises a packet with a viewable portion and a metadata portion. The metadata portion interfaces with other accounting systems, etc., for example, descriptive of the type of expense, thus facilitating automatic booking after an initial learning. The viewable portion enables users to view and manipulate data, as well as providing more information, in case the metadata is not directly useable for processing. Additional information may also be included in the invoice format, such as, for example, items about payment terms, etc. Further, in some cases, as a second section, an electronic signature 2317 and/or other suitable certificates may be included, to verify the source of and/or the authenticity of the invoice, and a more organized line item metadata set 2318 (third section) also may be included, with more detailed information, including but not limited to type of expense information, item, and even manufacturer's model numbers, etc. This organized metadata form can be used on the receiving side, in this example by the buyer, to set up a format for transfer of data. The first time data is entered, the user sees a prompt from the system on his screen. Once the system learns the data format, the system is set up, and on future invoices it can then automatically transfer information and place it in the correct field in the local accounting software 2311, in this example Peach Tree.

The buyer module 2307 of the SAAS based billing and payment system 2301 interacts with an instance of Peach Tree software 2311 in buyer site 2327 with the help of a programming interface PI 2309c, similar to the one discussed above. In some cases, one PI 2309x may be used for many different local software packages; in other cases, the system may guide the customer to configure or detect his setup, then store the setup parameters in an appropriate location, either locally or in the SAAS-based billing and payment system 2301, and accordingly download the correct setup on the fly. Caching in the browser may also be allowed. The engine 2304 creates all necessary interactions and issues not just invoices, but also checks 2312. The checks may be matched and converted into electronic checks, which e-checks may be flagged if they have a certificate and then processed automatically.

SAAS interaction module SIM 2308 has its own programming interface PI 2309a, which can be based either in the SAAS cloud 2301, as PI 2309a, or, as PI 2309b, in the other third-party vendor SAAS cloud 2302, or even on the computer and or browser of the client, in this example vendor 2310, using a SAAS accounting solution from, for example, Netsuite 2329, with, potentially and in some cases, an additional PI 2309b. If a vendor of SAAS accounting services offers appropriate published APIs, CSU 2303, a communication module between SAAS units, may be deployed for direct access, thus not involving the user directly. In such cases, appropriate credentials must then be stored and accessible to CSU for transactions.

SAAS cloud 2302 contains a Netsuite instance 2329. The Netsuite customer, in this case the vendor on vendor site 2328, uses a web browser 2310 to interact with the SAAS cloud 2302, and the PI may be installed either on the SAAS-based billing and payment system 2301 side or on the third-party SAAS side (in this example Netsuite; other, similar cloud-based services would function in a similar way). Module SIM 2308 then interfaces directly as described above with a programming interface. In other cases, a complete system exchange interface CSU 2303 can be built and can interface directly with published API interfaces of a third-party vendor. Rather than emulating manual functions of creating and sending out invoices and payments, CSU 2303 would enable a full integration of functionality, thus reducing required steps, with attendant time-and-cost savings.

Figure 24:
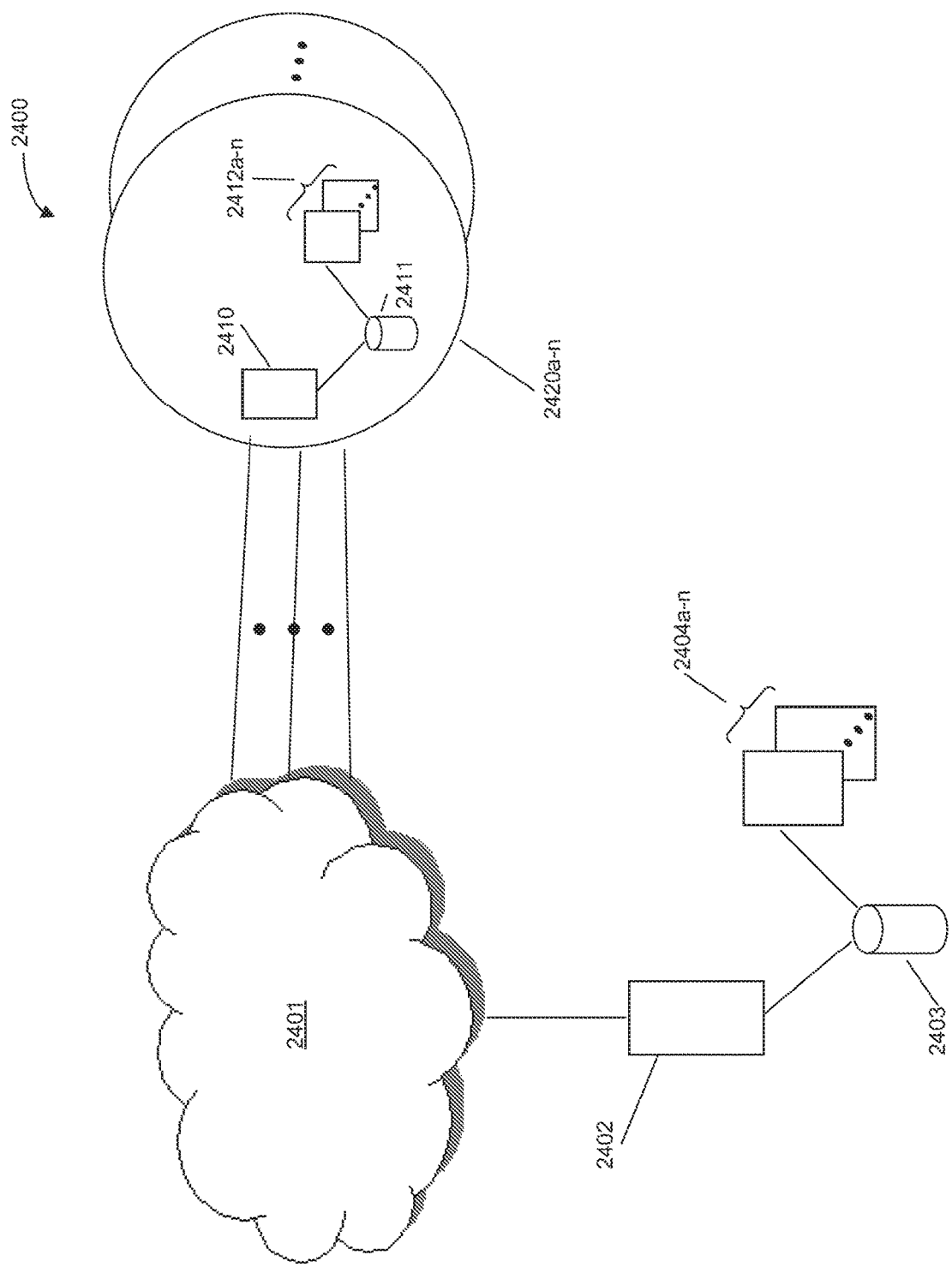
FIG. 24 is a diagram of a system for checking the background of applicants, according to one aspect of the system and method disclosed herein.

FIG. 24 show an overview of an exemplary system 2400, according to one aspect of the system and method disclosed herein. Internet 2401 connects to server 2402, on which resides data store 2403, which store may be a disk drive or any of various types of data storage means currently in use. Data store 2403 contains data 2404*a-n*, which may include, but are not limited to, data objects, data bases, executable programs and drivers, operating system, etc. Also connected to Internet 2401 are customer sites 2420*a-n*. Each site (not all sites shown) contains at least one computer 2410, with at least one available data store 2411, which data store holds data objects 2412*a-n*. Each computer 2410 may also have several standard devices and peripherals, including, but not limited to, a keyboard, pointing device, monitor, audio input and output devices, etc., all not shown here for clarity.

Figure 25:
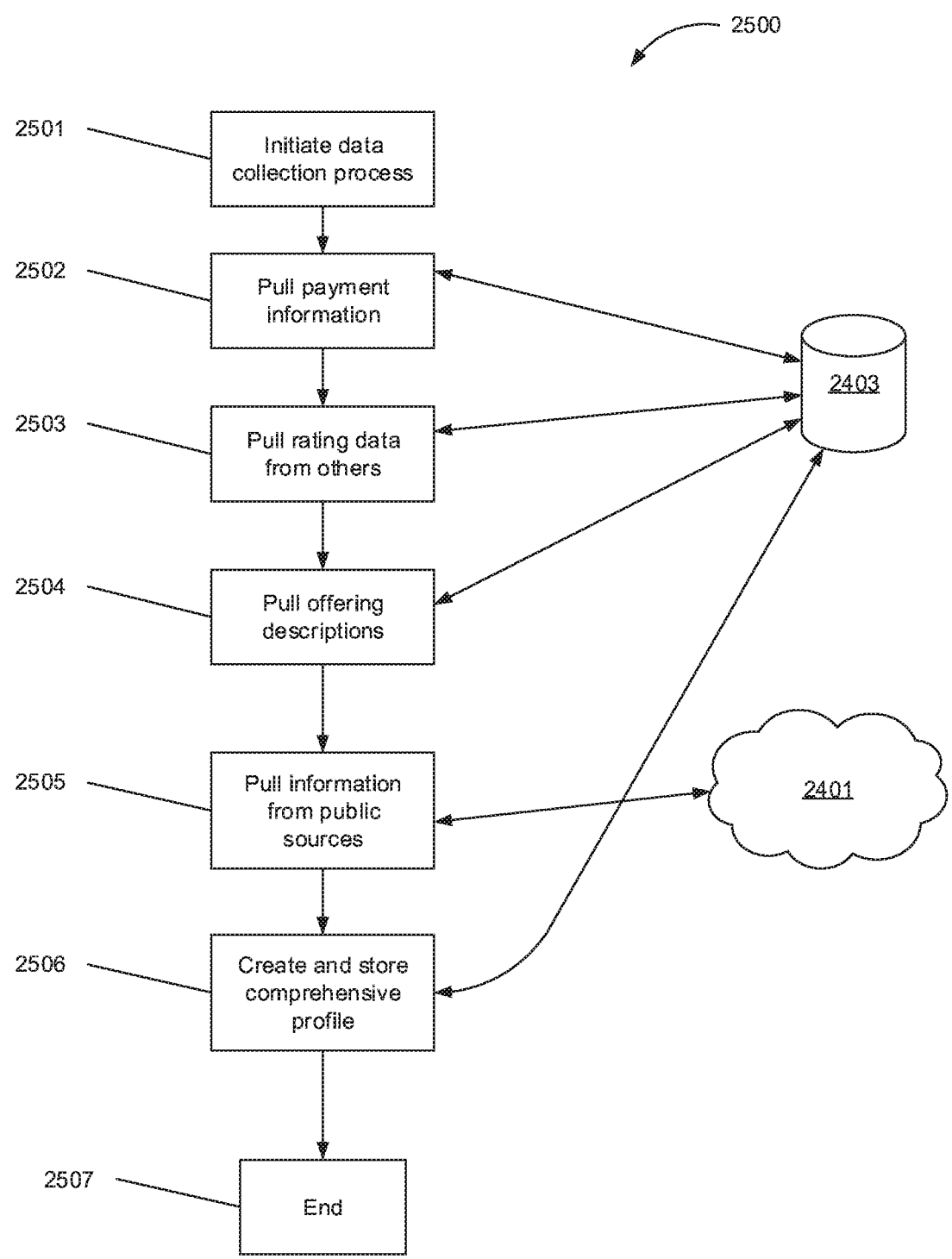
FIG. 25 is a flow diagram of a process for collecting and preparing information about applicants, according to one aspect of the system and method disclosed herein.

FIG. 25 shows an exemplary process 2500 for collecting and preparing information, according to one aspect of the system and method disclosed herein. In step 2501, the system initiates the process. In step 2502, the system pulls payment information from data store 2403. In step 2503, the system extracts credit and or other business transaction rating information, including but not limited to timeliness, quality, courtesy etc., from other participants that have worked with this company. In step 2504 the system pulls offering descriptions from the company, based on what they have offered. In step 2505, the system extracts additional public information, for example, the company's web site, from third-party information or review services, and from other, similar information sources, all of which information is available via public access as represented by Internet cloud 2401. In some cases, the system may use screen scraping techniques to collect such information. From all these sources, the system considers such factors as behavior patterns over time; for example, is the company consistently late, or is it late on just one or two occasions. Another factor to consider might be the credit-worthiness of the people that owe the company money, which could indicate how likely the company is to be able to pay on time. Similarly, the system could look at the history and current trends of the ratio of the company's receivables and receipts to their payables. If, historically, the company has had higher receivables to payables and they begin to trend to higher payables, it could be a sign that their credit is deteriorating. In step 2506 the system generates a comprehensive profile based on the collected information, which profile the system stores in data store 2403, and in step 2507 the process ends.

Figure 26:
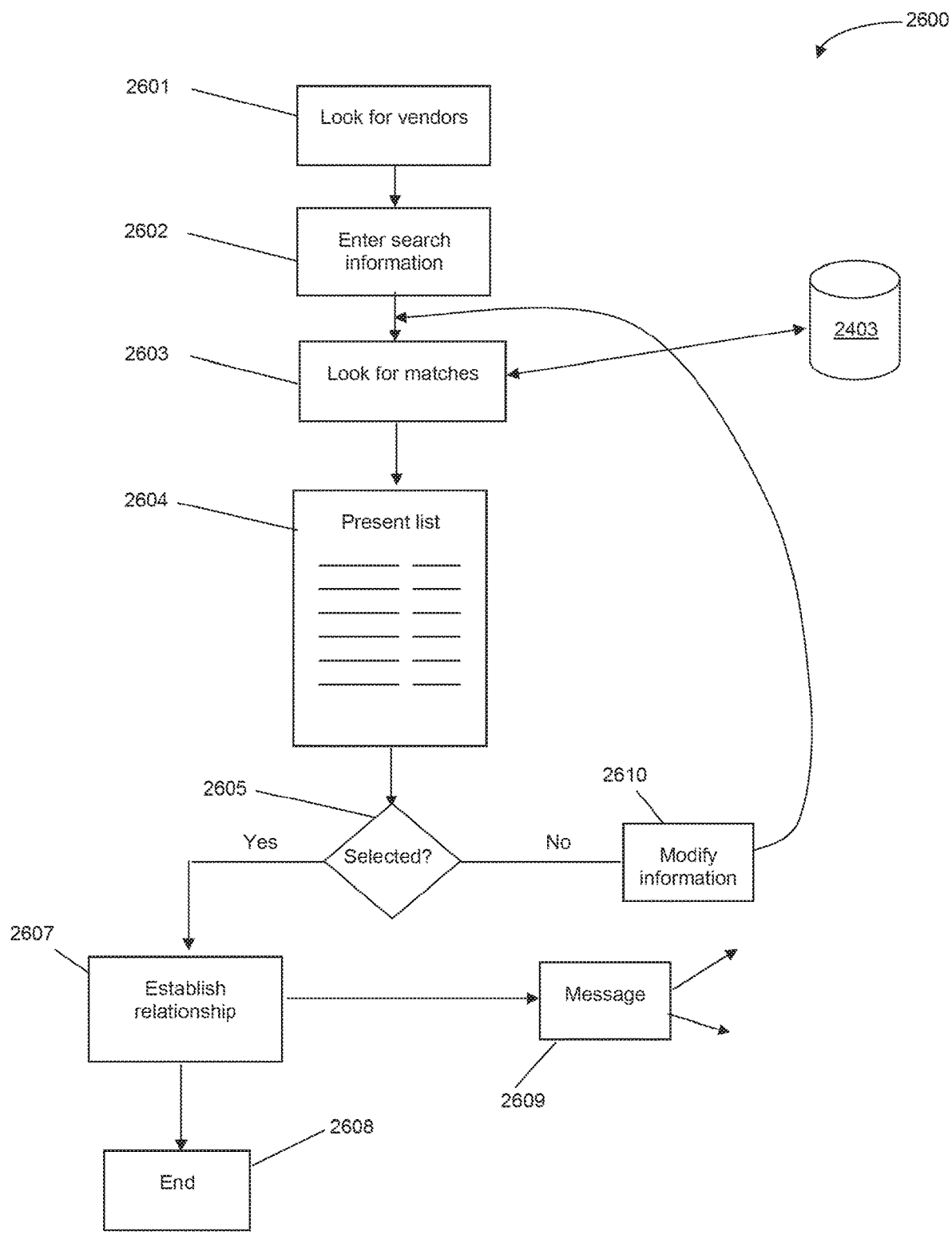
FIG. 26 is a flow diagram of a process by which a user may find suitable partners and go for a bid, according to one aspect of the system and method disclosed herein.

FIG. 26 shows an exemplary process 2600 by which a user may find suitable partners and go for a bid, according to one aspect of the system and method disclosed herein. But in other cases, in an analogous manner, other aspects or types of matches could be made, including, but not limited to, finding possibilities to link up financially with existing trade partners. Such a link could be established, for example, to arrange different than standard payment terms. In some cases, said link may include a third party, such as a partner bank or other financial institutions, etc. In step 2601, the user indicates he is looking for a vendor and starts the process. In step 2602, the user enters the information to be used as a basis for the search. In step 2603, the system searches the previously prepared results in data store 2403 for available matches. In step 2604, the system presents a list of results. The results may be grouped various ways, such as, for example, by companies with which the user's entity has an existing relationship and then by companies that are new to the user's entity. Such groupings enable the user to compare and contrast existing and new vendors, and also to compare credit rating information from other sources to help in the process of deciding whether to use one or more vendors from the list or search again. In step 2605, the user can decide whether make selection(s) from the list or search again. If one or more vendors are selected (Yes), in step 2607 the user begins to establish a relationship by any of various means, such as email, etc., as indicated in step 2609. In step 2608 the process. If, however, in step 2605, the user does not select any of the vendors in the list presented in step 2604 (No), the user can, in step 2610, modify the search information and the process begins again at step 2603. The user can also terminate the process at any step.

Verification Through Social Networks

What is needed is an enhanced approach to identity verification. Although many approaches exist, so far none is fail proof. By adding additional layers, the accuracy and reliability of identity verification can be further improved.

Figure 27:
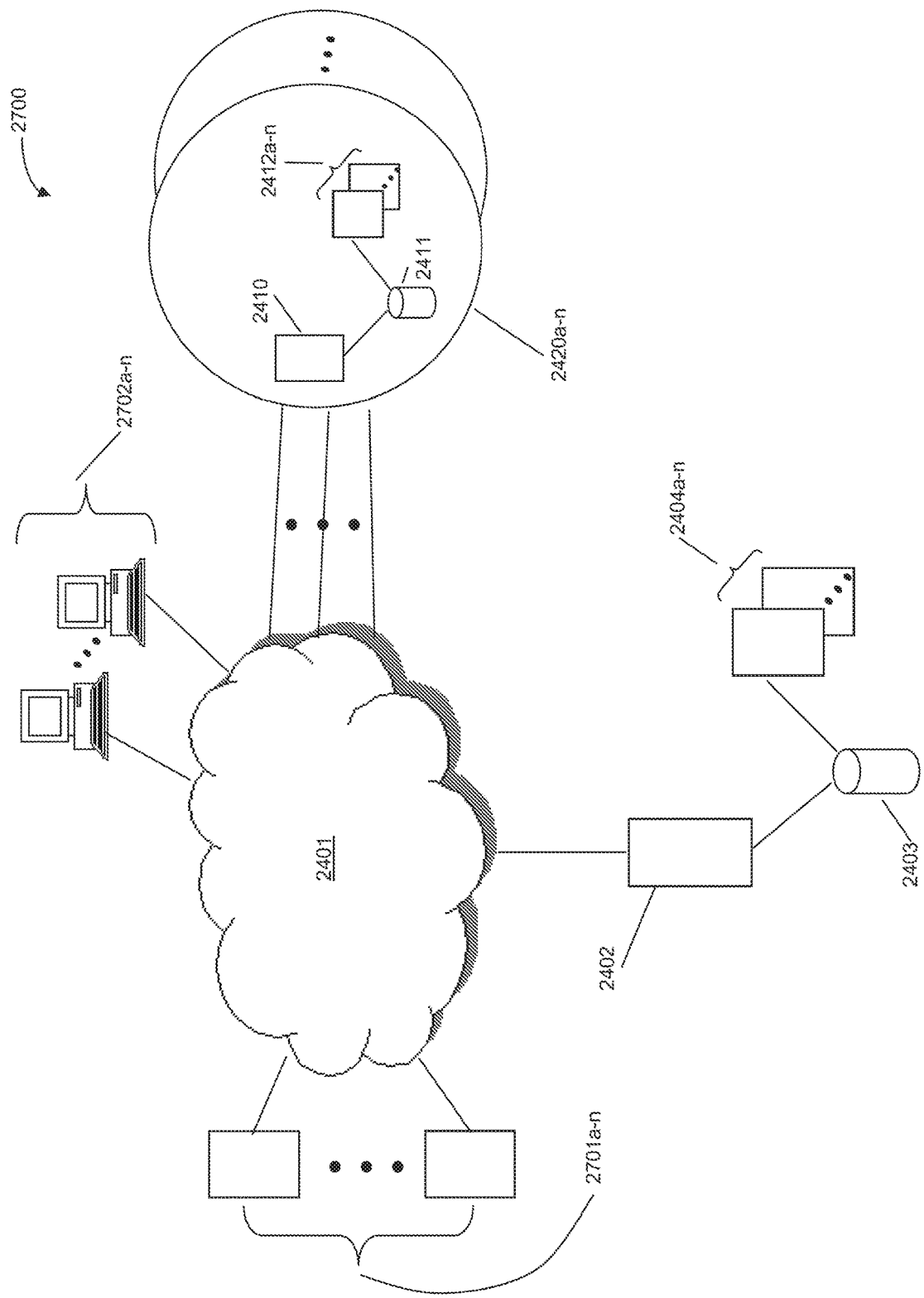
FIG. 27 is a diagram of a system for verifying that a person claiming to represent an entity is indeed representing the claimed entity, instead of being an impostor, according to one aspect of the system and method disclosed herein.

FIG. 27 shows an overview of an exemplary system 2700, according to one aspect of the system and method disclosed herein, which system is similar to system 2400, described above, and incorporates all the elements of system 2400. In addition, system 2700 contains Social Networking sites 2701*a-n*, which sites may include, but are not limited to, LinkedIn, Facebook, Xing.com, etc. Also shown are user computers 2702*a-n*, which for purposes of application to this description may be considered as generic computing devices, such as, for example, standard personal computers with a display, a keyboard, a pointing devices, and other commonly included peripheral and integrated devices. Computers 2702*a-n* may also be any of various current or future personal computing devices with communication capabilities, such as tablets, smart phones, etc. Computers 2702*a-n* are connected through Internet 2401 to server 2402, on which resides data store 2403, which store may be a disk drive or any of various types of data storage means currently in use. Data store 2403 contains data 2404*a-n*, which may include, but are not limited to, data objects, data bases, executable programs and drivers, operating system, etc. The connections among the various elements shown in FIG. 27, in particular the connections among elements 2701*a-n*, 2702*a-n*, and 2403, enable the system to discover how an entity or a person claiming to represent an entity is connected to other persons and/or entities, by tracking affiliations within Social Networks. When affiliations are tracked through multiple Social Networks, it's highly likely the system can detect certain overlaps among associations already known and associations discovered in the Social Networks, and among the subject entities or the person representing the entity, because even though a company (as example of an entity) can apply itself, in reality this application must be made by a person working for that company (or some other entity). Verifying multiple affiliations enables the system to increase the degree of certainty that an entity or a person claiming to represent an entity is indeed representing the claimed entity, instead of being an impostor.

Figure 28:
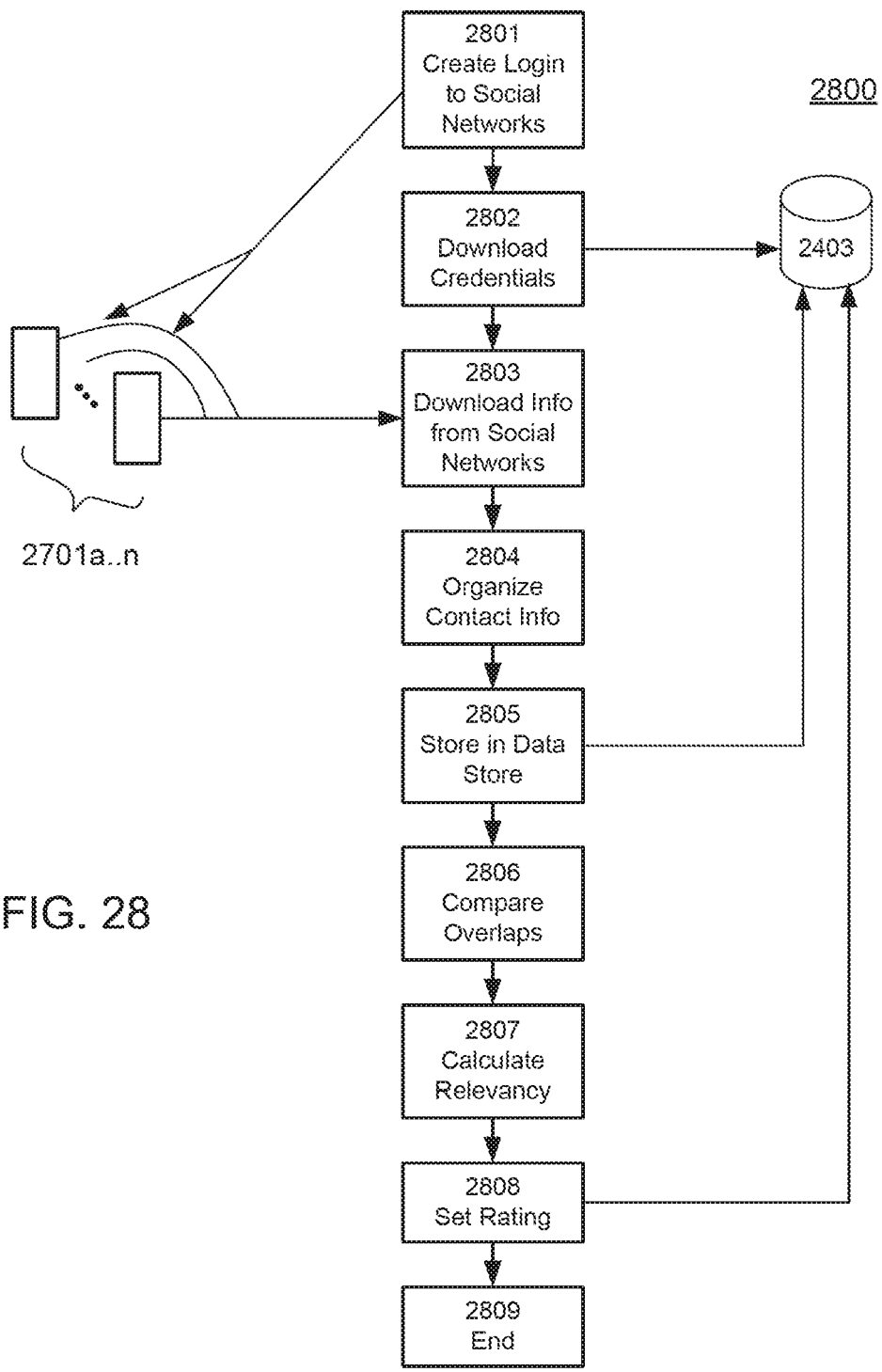
FIG. 28 is a flow diagram of a process for examining the Social Network affiliations of a person claiming to represent an entity.

FIG. 28 shows an exemplary process 2800 by which the system examines the Social Network affiliations of an entity or a person claiming to represent an entity, according to one aspect of the system and method disclosed herein. In step 2801, a user working, for example, on a computing device 2702x, creates a login identity to one or more Social Networks 2701a-n, thus enabling the system to later connect to said networks. In step 2802, the system stores the login credentials in data store 2403. Typically, these credentials would be heavily encrypted, because such login credentials are favorite targets of hackers. In some cases, the credentials may be stored in a separate data store (not shown), with data store may be protected by additional security features, including, but not limited to, requiring an offsite key for access. In step 2803, the system, using the credentials obtained in step 2801, logs in to one or more Social Networks and downloads information about the subject person or entity and its affiliations. In step 2804, the system organizes contact information from the downloaded information into a manageable format, typically, but not necessarily, into an open database connectivity (ODBC) format. In step 2805, the system stores the reformatted data in data store 2403. In step 2806, the system compares overlaps between the information obtained from the various networks and the information provided by the person or entity under scrutiny when signing up for the billing and payment system described above and throughout. In step 2807, the system calculates the relevancy, or overlap factor. When an entity exceeds a certain threshold of known good connections, who vouch for the probate's trustworthiness, which threshold might typically be only 30 or 50 percent, and accordingly, as the number of existing connections in the Social Network grows, the percentage of actually verifiable connections plummets. Thus, the threshold actually used may and typically does depend on the number of befriended entities; for example, an entity with only 3 to 5 friends would require a 100 percent relevancy factor, while an entity with more than 20,000 friends would probably not be able to reach more than a few percent relevancy factor, but all the matches, if provided, should be found in those 20,000. As a result, typically, a sliding scale for the threshold is used, and the range then changes accordingly. Also, based on experience, the scale may be adjusted from time to time to take new findings into account. In step 2808, the system sets a rating based on the level of relevancy achieved. This rating can be used to gauge the likelihood that the claimed identity of the subject person or entity is valid, and not fraudulent. And in step 2809, the process terminates. In some cases, the subject entity could link to the system as part of applying for a higher credit score or some specific features they would want, such as, for example, faster payment timing. If the subject linked to the system, said link could provide an alternate way for the system to traverse the network of the subject entity without having to store their credentials. This approach could, in some cases, be preferable. The system could then use its own credentials to navigate the network.

Rules and Constraint Engine

Figure 29:
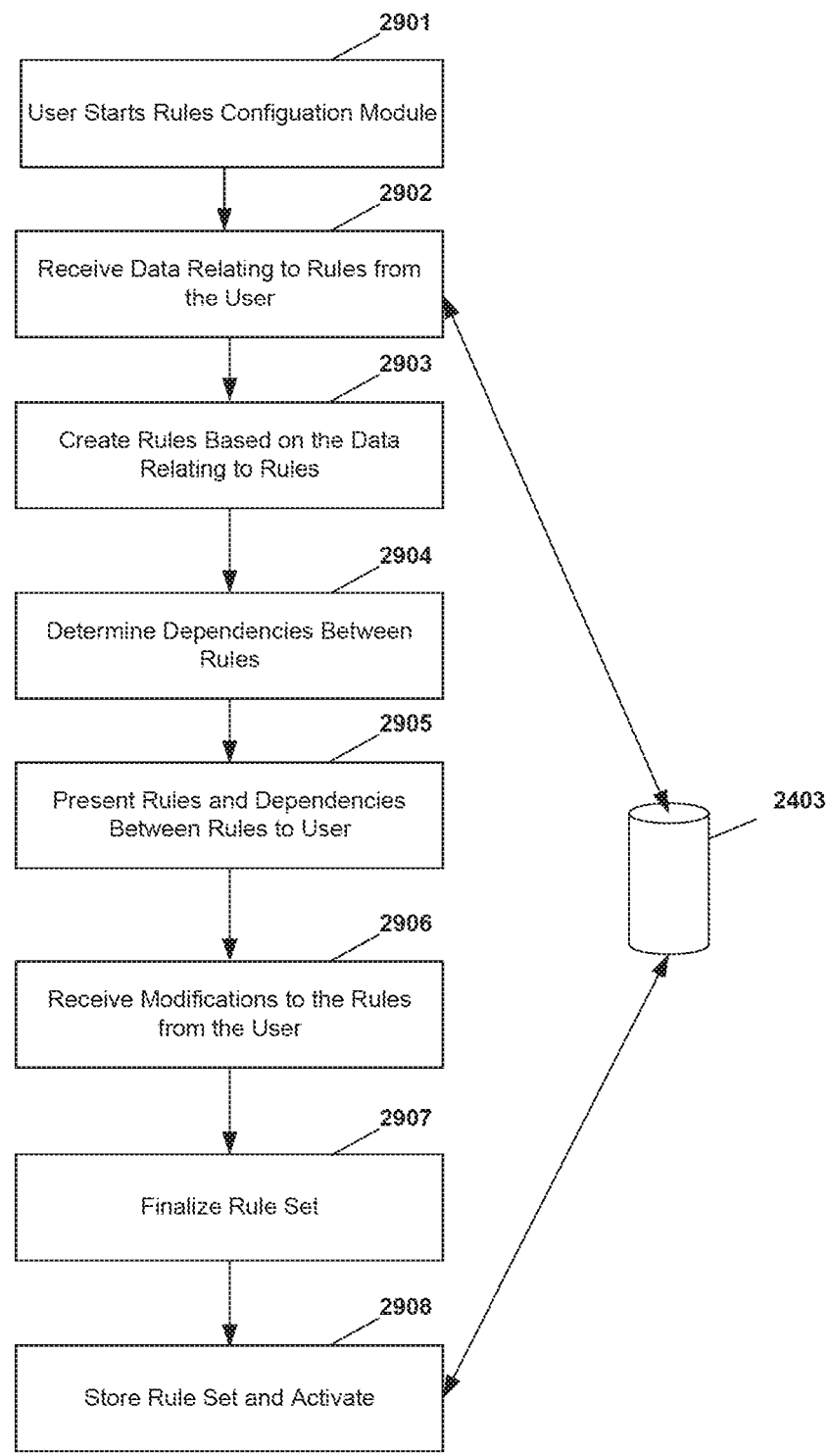
FIG. 29 is a flow diagram of a process for developing a set of rules for a rules and constraints engine, according to one aspect of the system and method disclosed herein.

FIG. 29 shows an exemplary process 2900 for developing a set of rules for a rules and constraints engine, according to one aspect of the system and method disclosed herein. In step 2901 the user starts a configuration "wizard" program for configuring the payment rules and constraints engine. In step 2902, the system requests a first data set from the user, or asks a first set of questions, and receives responses. Requested data may include identity of the bank account(s) from which payments are drawn; in some cases, the account(s) from which funds are transferred into the account(s) from which payments are drawn; the first-tier "preferred" vendors and from there, second-tier and even third-tier or below vendors; payments that should be made automatically, such as very small payments or payments to certain vendors; the minimum balance to be maintained in various bank accounts, for purposes of meeting payroll, for example; etc. In step 2903, the system stores the received data in data store 2403 and calculates dependencies. Dependencies, in this case, are circumstances in which conflicts may arise among rules set up in response to the data input by the user. The system may need additional clarification, to understand which rules should override which other rules, which rules should be amended, which rules should be added or deleted, etc. In step 2904, the system presents the dependencies and requests clarification and additional data to resolve issues. Although, for clarity and simplicity, only one set of data input, rule formulation, and dependency resolution is presented in FIG. 29, in actual practice, depending on the complexity and interdependencies of the various rules, several cycles of these activities, as shown in steps 2903 and 2904, may be necessary before all dependencies are resolved. Finally, in step 2905, the system has amended and augmented the rules so that conflicts are resolved, and it finalizes a set of rules for this account. Payment rules may, for example, identify days on which payments are made, how often payments are made, how long a payment may be allowed to age before the system sends an alert, etc. The rules may also include options, depending on the company's preferences, such as, for example, whether to pull account information from the bank never, in some cases, or always; whether and in what cases to send a payment directly to the vendor's bank; whether, in what cases, and to whom to send notifications of payment and/or nonpayment; etc. In step 2906 the system stores the set of rules in data store 2403 and activates the rule set for this account. In step 2907, the process ends.

Figure 30:
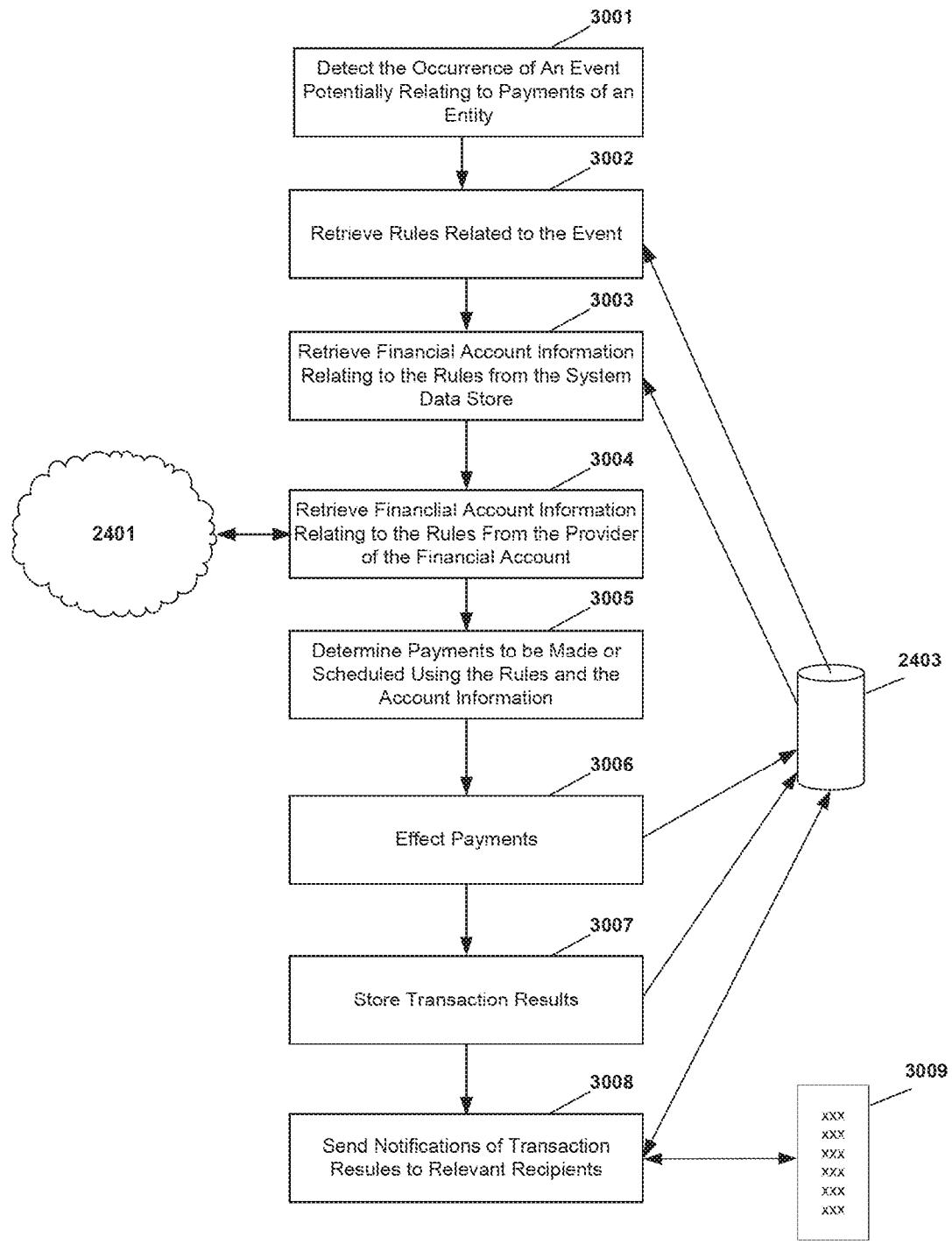
FIG. 30 is a flow diagram of a process of employing a payment rules and constraints engine, according to one aspect of the system and method disclosed herein.

FIG. 30 shows an exemplary process 3000 of employing a payment rules and constraints engine, according to one aspect of the system and method disclosed herein. In step 3001, the system starts the process of running the rules and constraints engine. For example, the system may send an alert because an overdue payment has aged to the point set in the rules and constraints engine, as described above in the discussion of FIG. 29. In step 3002, the system pulls up the rules for this type of event from data store 2403. In step 3003, the system obtains the account information from data store 2403, including bank account, values, time and date stamp of previous transactions, etc. In step 3004, depending on how old the stored information is, the system may pull fresh information directly from the bank via Internet 2401 for additional verification. In some cases, this step may be standard and may be executed for every payment to all accounts; in other cases, this step may be optional and may be executed only on an as-needed bases, due to incurring an additional charge from the bank, or to incurring additional employee time costs, etc. The ability to configure the rules engine should include the ability to make step 3004 standard or optional, and to specify for which, if not all, accounts to execute this step. In step 3005, the rules and constraints engine is run. According to its configured rules, the engine calculates which payments to make at this time, and which to schedule for a later time, using data from the database (main store 2403, for example) to calculate scheduled payments, with considerations including, but not limited to, at least one of due date, early payment discount, current account balances, cash flow projections, payroll projections, maximum latency for a vendor, preferred vendor payment ranking (a user-defined parameter to indicate vendor's relative payment priority), related vendor transactions (e.g., accelerating payments for open bills to prompt a vendor to make shipments related to new purchase orders and/or making a more timely payment based on timing receipt of related goods purchased), cyclical payment model (automatic rotating of payments so no one vendor is paid late every time), etc. In step 3006, the transactions are then effected. They could be effected to the main store 2403, from where they flow with the main stream of regular payments through the online payment system. In some cases, for urgent payments, international wires, etc., a payment may actually be sent directly to the bank. Again, sending the payment directly to the bank is a configuration option that may or may not be made available, depending on whether the company configuring the rule and constraints engine wants this option, and such a practice may in some cases incur additional charges. In step 3007 the results of the transaction are stored into the company account in data store 2403. These results would typically include the confirmation numbers and time and date stamp of the transaction. In step 3008, any notifications required are sent, such as, for example, notification of a partial payment or no payment due to insufficient funds, unsatisfactory goods or services received, etc. These notifications 3009 may be sent to a prepopulated recipient list, which list was configured into the rules and constraints engine during the process described in the discussion of FIG. 29, above. In step 3010 the process ends.

In some cases, the rules and constraints engine could take into consideration various settings and characteristics of the user and the vendor as well as related bills and invoices, including the vendor priority, that is, specifying the importance of the vendor relative to other vendors in deciding who is paid before others. Also taken into consideration could be, in some cases, previous payment activity, to account for the order of payments and alternate late payments among vendors; amount of any outstanding balance, to prioritize payments by amount (as a potential indication of the importance of the vendor) or by entire balance owed; and write-off of certain accounts, based on certain historical behaviors, factoring out possible future payments from customers who exhibit characteristics of non-payment. In other cases the system could offer a discount to a certain vendor (or on a specific bill) to maximize cash flow. For example, the system could generate an offer to entice a vendor to pay early (a form of dynamic discounting), and the system could also track the vendor's past acceptance or rejection of similar offers, to predict the likelihood of offer acceptance. Additionally, since, ideally, the user would engage with the system only periodically, the system could alert the user when a significant deviation from the forecast occurs. The system could automatically adjust itself in the event cash becomes tight and/or could allow the user to readily specify a new behavior without having to modify every customer/vendor or bill/invoice. Further, the user could change the parameters and watch how the system would forecast payments, expected invoice receipts, and discount offers. Changing parameters would update the forecast, so the user could easily adjust the model.

In yet other cases, the rules and constraints engine could be integrated with the approval flow through the company. Such an approach could be as simple as configuring the rules engine to pay bills only if they are approved. Or said integration may have more complex rules, such as paying bills prior to their being approved in some circumstances. For example, if the amount is small and the bills have been at least partially approved, the system may be configured to pay them to avoid being late. In another aspect, if the customer has sent a question about the invoice to the vendor, the system may choose to delay payment until the vendor has answered it sufficiently.

Additionally, the system may set rules either based upon an interview, i.e., a one-time configuration session, or based upon the ongoing actions of the users of the system. Such a "learn as it goes" capability would be a powerful tool to make it easier for the system to get the rules right. So in some cases, rather than a traditional rules and constraints engine, a machine learning component can be added that either enhances or replaces the rules and constraints engine.

It is clear that many modifications and variations of the system and method disclosed herein may be made by one skilled in the art without departing from the spirit of the novel art of this disclosure.

These modifications and variations do not depart from its broader spirit and scope, and the examples cited here are to be regarded in an illustrative rather than a restrictive sense.

For example, if companies are linked on a social network via recommendations (for example "likes" on FaceBook), association through groups, or other links which evolve over time, the system traverse this social graph for companies and glean valuable information on whether the company is likely to be legitimate or not, based on the quality of known associates, for example, as well as the number of such associations. Also, by navigating the social graph for a company and looking at affiliated companies and people, the system could look at many factors, including the following: how many other companies are linked, the creditworthiness of the other companies, how many people are linked, the creditworthiness of the other companies that they are linked to. For example, if either a company or person is a known bad actor, their presence in the social graph of a subject would be a big negative. Similarly, having a company or person who is known to be strong in said social graph would improve a subject's score. An additional approach might be to traverse the social graph from the company to the people associated with it through various links such as "likes", employment of said people (such as, for example, "I work here or I used to work here"), professional groups these people belong to, etc.

For example, in some cases, additional collaboration around the invoices and payments can be provided. This can be in the form of notes that are allowed to go back and forth, be associated with the bills for the long term. They may be displayed as bubbles appearing over or along the invoices and or payments. Further, it should allow a customer to formally dispute all or part of an invoice as part of the system, immediately.

Further, supporting documents etc. may be attached to invoices and or payments and or disputes, in the form of additional payload information attached as documents, pictures, and other rich information to be associated with the bills. These may be stores in the SAAS Cloud or downloaded to a local machine at the user's location.

Furthermore, stronger notion of a customer or vendor portal for receiving/paying bills or sending/collecting on bills in conjunction with the accounting integration, meta data, additional documents, etc., as well as additional notification channels.

In some cases, a SAAS-based system for sending bills and payments in conjunction with a third-party accounting system may deploy a downloadable program interface to configure the third-party accounting system and then send and receive data between the two systems. Alternatively, a communication module between SAAS units (CSU) may be deployed to configure the third-party accounting system and then send and receive data between the two systems. Further, the transmitted bills may contain an electronic signature, a line item billing, and/or other transaction-specific meta data, and, based on cash flow needs and outstanding bills, some or all customers may be offered a very substantial time-limited discount for immediate payment. Also, customers may use the line-item billing feature to withhold partial payments for specific issues attributed to specific items.

In some cases the system may implement a method and/or system for managing payments based on a set of rules and constraints, with a database configured to enable calculation of scheduled payments, with considerations of at least one of due date, early payment discount, current account balances, cash flow projections, payroll projections etc. Further, the method and/or system of the service may be a SaaS-based system. Also, the data in the database may be augmented with real-time data from a variety of sources, including but not limited to banks, financial institutions, holiday calendars, etc.

Payment Processing

Figure 31:
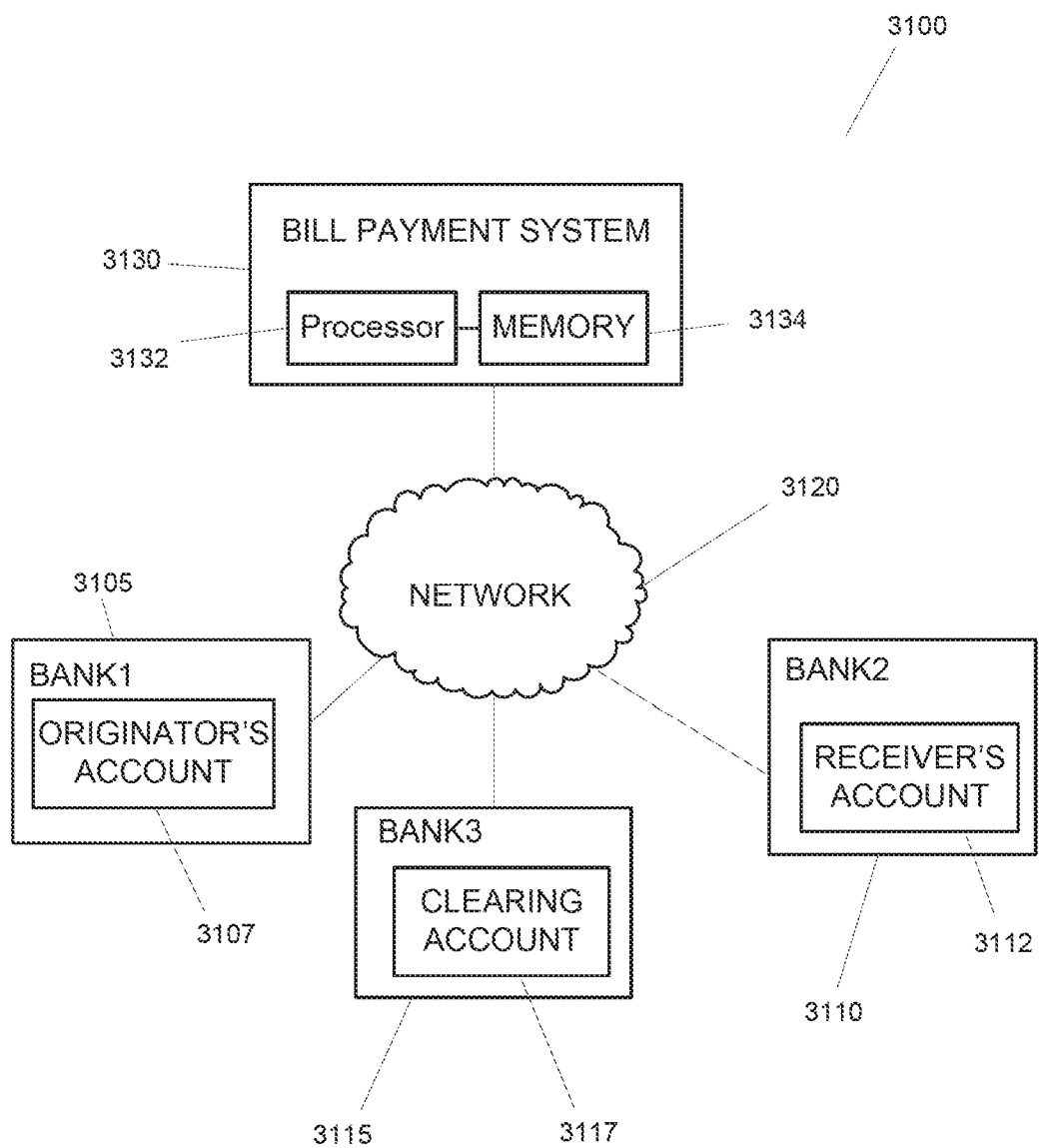
FIG. 31 is a block diagram of a system according to various aspects of the present disclosure.

FIG. 31 depicts an exemplary system for processing payments utilizing a third-party bill payment system. In this example, system 3100 includes a first bank 3105 having an account 3107 for an originator (i.e., an individual, company, or other entity) of a transaction, a second bank 3110 having an account 3112 for the receiver of the transaction, and a third bank 3115 having a clearing account 3117. A bill payment system 3130 helps facilitate the transaction between the three banks 3105, 3110, and 3115 via a network 3120.

System 3100 may be configured to process any number of different transactions. For example, a payment transaction between the originator and the receiver may involve a payment amount being transferred from the originator's account 3107 to the clearing account 3117 (also known as "funding" the clearing account 3117) and then transferring the payment amount from the clearing account 3117 to the receiver's account 3112, with the bill payment system 3130 facilitating various aspects of the transaction.

System 3100 may include any number of financial institutions (such as banks 3105, 3110, and 3115) who may interact in any desired manner to fund, process, and implement various transactions. For example, system 3100 may operate in accordance with the rules and regulations of a financial organization such as the National Automated Clearing House Association (NACHA), which defines and oversees automated clearing house (ACH) transactions.

Financial institutions 3105, 3110, and 3115 may include any number of physical locations, computing devices (such as servers), and other hardware or software components. Various components of system 3100 may communicate directly with each other or via network 3120. Network 3120 may include a wireless network such as a wireless mobile telephony network, General Packet Radio Service (GPRS) network, wireless Local Area Network (WLAN), BlueTooth®, Global System for Mobile Communications (GSM) network, Personal Communication Service (PCS) network, Advanced Mobile Phone System (AMPS) network, Infrared (IR), Near Field Communication (NFC), Wi-Fi®, IEEE 102.11 network, Worldwide Interoperability for Microwave Access (WiMax) network, microwave network, and/or a satellite communication network. Network 3120 may also include a wired local area network (LAN), a wide-area network (WAN) such as the Internet, or any other type of connection or network.

Bill payment system 3130 may implement, whether alone or in conjunction with other components or systems (such as banks 3105, 3110, and 3115), various features of the present disclosure. In the exemplary system depicted in FIG. 3100, bill payment system 3130 includes a processor 3132 coupled to a memory 3134. The processor 3132 retrieves and executes instructions stored in the memory 3134 to control the operation of the bill payment system 3130. Any number and type of different processors can be used in conjunction with various embodiments of the present disclosure, including an integrated circuit microprocessor, micro controller, and/or digital signal processor (DSP). The functionality of the bill payment system 3130 may also be implemented through various hardware components storing machine-readable instructions, such as application-specific integrated circuits (ASICs), field-programmable gate arrays (FPGAs) and/or complex programmable logic devices (CPLDs). Systems and methods according to aspects of the present disclosure may operate in conjunction with any desired combination of software and/or hardware components.

The memory 3134 stores instructions, data, and any other desired information. Memory 3134 operating in conjunction with embodiments of the present disclosure may include any combination of different memory storage devices, such as hard drives, random access memory (RAM), read only memory (ROM), FLASH memory, or any other type of volatile and/or nonvolatile memory.

Table 1 (below) illustrates an exemplary timeframe associated with a typical ACH transaction used to transfer funds from the originator's account 3107 to the receiver's account 3112 in conjunction with a payment instrument (a paper check in this example) being disbursed by the bill payment system 3130. The ACH transaction is used in this example as a low-cost method for transferring the funds between accounts 3107 and 3112. On Day 1, a payment from the originator's account 3107 to the receiver's account 2112 is submitted, the originator's account is debited, and the process for funding clearing account 3117 begins. On Day 2, the funding process is completed, and the amount of the payment is debited from the originator's account 3107 and credited to the clearing account 3117. Funding of the clearing account 3117 typically happens at the end of Day 2 or early in the morning (e.g., 2 AM) on Day 3.

The use of ACH transactions as described above may involve various delays and risks. For example, while the funding of the clearing account 3117 is effective on Day 2, the payment amount can be recalled from the clearing account 3117 and returned to the originator's account 3107 if the payer disputes the ACH debit. Additionally, the settlement period for the transaction may vary based on the type of transaction. For example, NACHA rules require that ACH debits settle within one business day, and that ACH credits settle within two business days. NACHA rules also allow for ACH transactions to be submitted using "pre-notifications," which impose a six-day waiting period before a live transaction can be submitted. The dispute period may also vary. For a business account, for example, the dispute period is two days following the date funding of the clearing account is effective, therefore in the example presented in Table 1, it is not certain that the funds for the payment would be available until Day 5. Furthermore, transaction requests that occur past a particular cut-off time (e.g., 5 PM) on Day 1 may not be funded until Day 3.

Once the clearing account 3117 has been credited the payment amount (i.e., the funding of the clearing account is effective), the bill payment system 3130 may disburse a check or other payment instrument to the receiver. In the example shown in Table 1, disbursement of the payment instrument occurs on Day 3, and the payment instrument is a paper check that is mailed via regular mail to the recipient, though alternate payment instruments are possible. In this case, the bill payment system 3130 may send out the check ahead of the final day that the funding could be returned since the bill payment system 3130 has the ability to place a stop payment on the check if the funding is returned on Day 4. In such a case, the bill payment system 3130 would rely on the assumption that delivery of the check will take at least two days to arrive in the mail. However, since the time for the postal delivery of the paper check may vary, it is risky for the operator of the bill payment system 3130 to rely on any particular time for delivery. Furthermore, while a stop payment on a check/electronic check is possible, an ACH credit cannot be recalled. If an ACH payment is made before the funds are confirmed, the operator of the bill payment system 3130 would take substantial risk of not getting reimbursed for the transaction.

TABLE 1

| Day | |
|---|---|
| Day 1 | Payment from originator to receiver submitted; clearing account funding process begins. |
| Day 2 | Clearing account funding completed. |
| Day 3 | Payment instrument disbursed. |
| Days 4-6 | Payment instrument en route to receiver. |
| Day 7 | Payment instrument is received by receiver, and presented to receiver's financial institution; receiver's account credited. |

Figure 32:
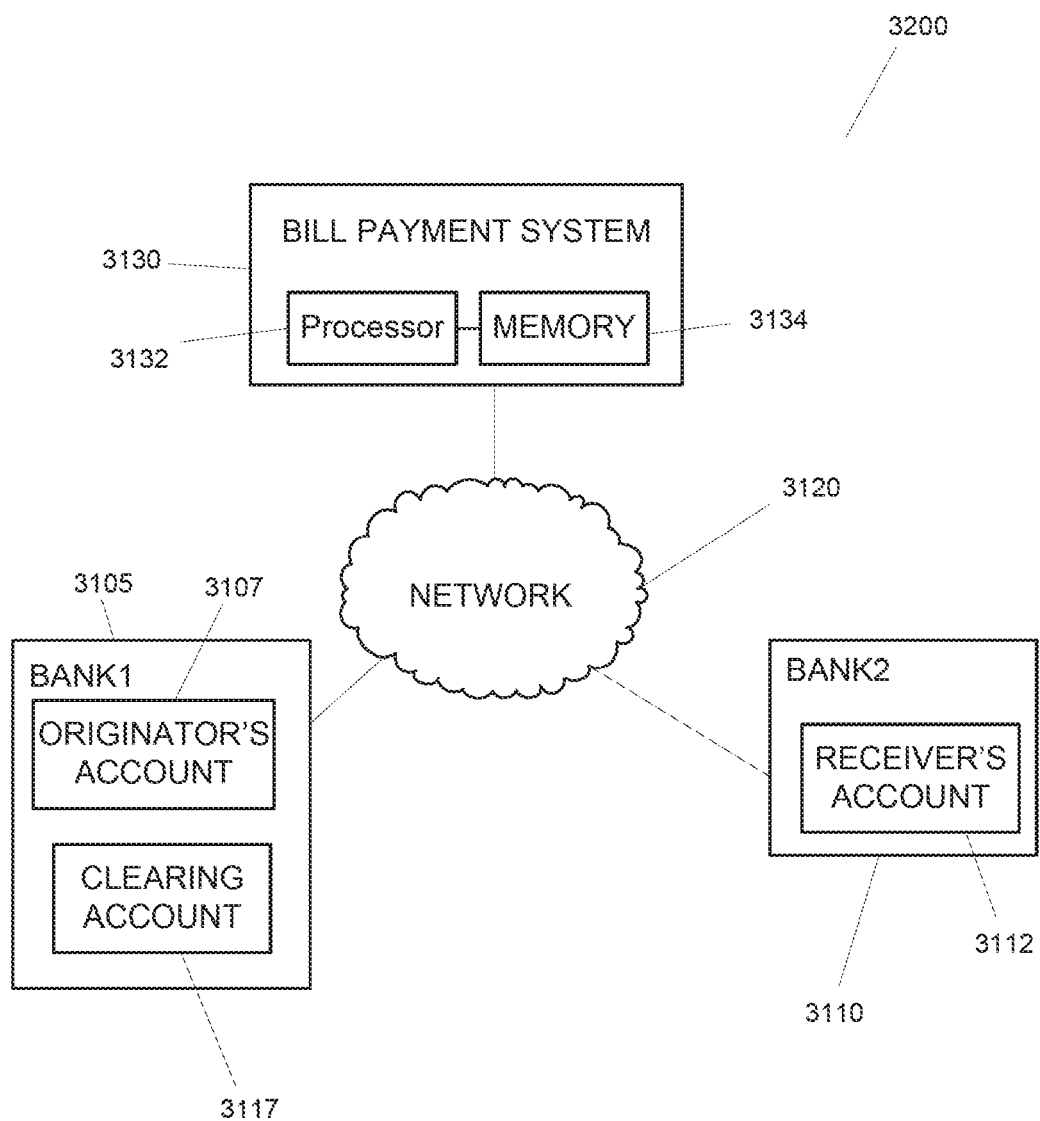
FIG. 32 is a block diagram of system according to various aspects of the present disclosure.

FIG. 32 depicts another exemplary system for processing payments utilizing a third-party bill payment system. In this example, the clearing account 3117 is at the same financial institution (i.e., Bank 1 3105) as the originator's account 3107. All other components of system 3200 are the same as described for system 3100 in FIG. 31. Among other things, having the clearing account 3117 with the same financial institution as the originator's account 3107 may help speed processing of transactions and/or to allow funds for a transaction to be held in real-time or near-real-time, thus helping to ensure the availability of those funds where they can no longer be recalled or cancelled by the originator. In alternate embodiments, the clearing account 3117 may be at any suitable institution, though it is preferable that the contractual relationship and data processing interoperability between financial institutions operating in conjunction with embodiments of the present disclosure allows transactions to processed quickly, such as by allowing the same real-time or near-real-time hold on funds associated with a payment instrument as provided by the configuration in system 3200.

Figure 33:
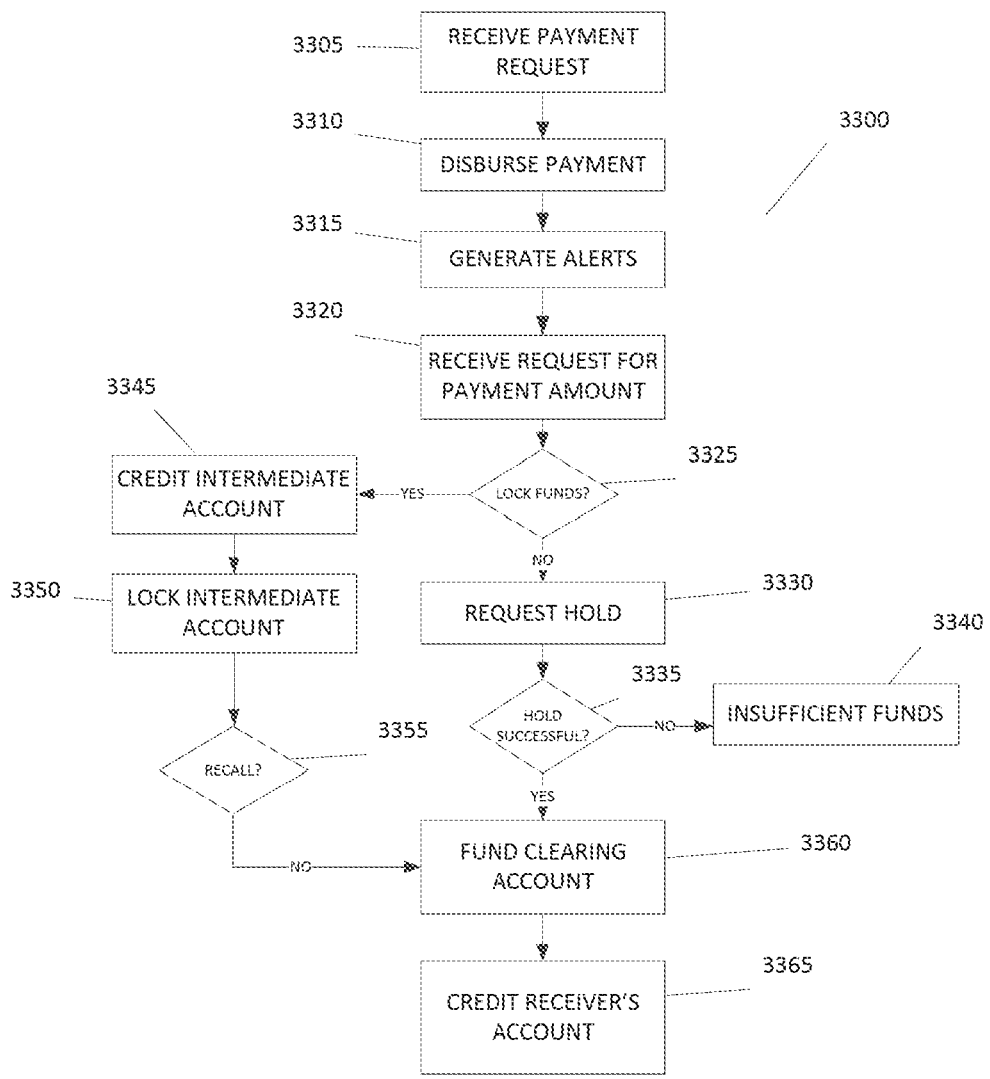
FIG. 33 is a flow diagram of a process according to various aspects of the present disclosure.

FIG. 33 depicts an exemplary process according to various aspects of the present disclosure. Process 3300 may be implemented, in whole or in part, using any combination of systems and devices, including by bill payment system 3130 in conjunction with system 3100 or system 3200. Systems and devices implementing process 3300 need not be physically co-located with each other, and may communicate in any desired manner, such as via network 3120. In this exemplary method, a request is received for a payment to be made from an originator to a receiver (3305). The payment request may be made between any number of accounts, such as from originator's account 3107 at Bank 1 3105 to receiver's account 3112 at Bank 2 3110.

In response to receiving the payment request, a payment instrument is disbursed to the receiver (3310). While the payment instrument is disbursed in response to the payment request by the bill payment system 3130 in this example, the payment instrument may be disbursed by any other system or entity operating as part of, or in conjunction with, system 3100. Any desired payment instrument (as well as multiple payment instruments) may be disbursed in response to the payment request, including: a check, a draft, a voucher, a payment card, a wire transfer, a credit transfer, an electronic funds transfer, and combinations thereof. The status of the payment instrument can be monitored and various alerts generated (3315) as desired. For example, an alert may be generated in response to not receiving the request for the payment amount (3320) within in a predetermined period of time after disbursal of the payment instrument (3310). An alert may also be generated in response to detecting the disbursal of a second payment instrument from the originator to the receiver before the request for the payment amount for the first payment instrument is received.

A request is received for a payment amount designated by the payment instrument (3320). The request for the payment amount may be received from any system or entity operating in conjunction with the embodiments of the present disclosure, and is typically received from the receiver's bank 3110 after the receiver presents the check or other payment instrument to bank 3110. The request for the payment amount may be in any desired format and may be presented in any desired manner. For example, when a paper check is presented to the receiver's bank 3110 by the receiver, the bank 3110 may process the check and request payment from the originator's bank 3105 in accordance with the Check Clearing for the 21st Century Act (also known as the Check 21 Act).

At 3325, if the bill payment system 3130 (or other system(s) performing method 3300) are not utilizing an intermediary account (steps 3345-3355), then a hold against the originator's account 3107 for the payment amount may be requested in response to receiving the request for the payment amount (3330). This hold may also be referred to as a "memo posting," and may be reflected as a charge to the originator's account 3107 in the payment amount to help the originator avoid overdrawing the account 3107. System 3200 (or another system with relatively quick processing between the originator's account 3107 and clearing account 3117) may request a real-time or near-real-time hold in response to the request for the payment amount.

If the hold is unsuccessful, the hold may be retried any number of desired times. If the hold is still ultimately unsuccessful (e.g., after failing a predetermined number of retries), the payment instrument is marked as having insufficient funds to complete the transaction (3340), and the payment amount is not credited to the clearing account 3117 and/or receiver's account 3112. The process of marking, and the labeling of, the failed transaction may vary according to the financial institution(s) involved. For example, some banks may mark the transaction as having a "positive pay exception".

If the hold is successful (indicating sufficient funds in the originator's account), the payment amount is credited to the clearing account 3117 (also known as "funding the clearing account") and the payment amount is credited to the receiver's account 3112 (3365) in conjunction with debiting the payment amount from the clearing account 3117. The receiver's account 3112 can be credited within a predetermined period of time of the payment amount being credited to the clearing account 3112, thereby allowing the originator to recall or dispute the transaction, or for other validation procedures to be implemented to verify the authenticity of the transaction.

The receiver's account 3112 may also be credited in real-time or near-real-time in response to the payment amount being credited to the clearing account 3117, performing any validation/verification procedures prior to funding the clearing account 3117. In this manner, embodiments of the present disclosure allow the receiver's account 3112 to be credited almost immediately after the clearing account 3117 is funded, in contrast to ACH transactions where funding the clearing account 3117 typically precedes disbursal of the payment instrument.

The receiver's account 3112 can be credited in any desired manner. For example, the bill-payment system 3130 may generate one or more files including a list of checks for which payment is to be made and that identifies funds to be transferred from the originator's account 3107 to the clearing account 3117. The one or more files may then be transmitted to the originator's bank 3105 and/or the receiver's bank 3110 to processes the payment from the clearing account 3117 to the receiver's account 3112. The originator's bank 3105 may receive (intermittently or at predetermined intervals) a set of debits for each originator's account 3107 specifying the amount of each payment instrument to be credited to the clearing account 3117. This transmission to the bank can be in the form of a NACHA file, an internal banking system format, or any other desired format. The receiver's account 3112 may be credited at any desired time in relation to the funding of the clearing account 3117. If desired, the receiver's account 3112 may be credited the payment amount on the same day in which the clearing account 3117 is funded to avoid delays in completing a payment transaction.

Referring again to 3325, if the bill payment system 3130 (or other system(s) performing method 3300) are utilizing an intermediary account, the payment amount can be credited to an intermediate account (3345). The funding of the clearing account (3360) may then occur in conjunction with debiting the payment amount from the intermediate account. The intermediary account can be at any financial institution, including the same financial institution holding the originator's account and the clearing account 3117 (i.e., Bank 1 3105 in FIG. 32).

The credit to the intermediate account can also be performed in conjunction with debiting the payment amount from the originator's account. A lock is placed on the intermediate account after it is credited (3350), the lock preventing recall of the payment amount. The lock may be placed on the intermediate account for a predetermined period of time and/or until occurrence of one or more events, as desired. For example, the lock may be placed on the intermediate account such that the process of crediting the payment amount to the clearing account in conjunction with debiting the payment amount from the intermediate account begins before the lock expires, and completes after the lock expires. Among other things, beginning the transfer with the lock in place and completing the transfer after expiration of the lock allows the transaction to be disputed or cancelled before the clearing account is funded. In 3355, for example, a request to recall the payment request may be received (e.g., from the originator), and cancelling the crediting of the payment to the clearing account and/or receiver's account in response to the recall request.

Table 2 illustrates an exemplary timeline for processing a transaction in accordance with various aspects of method 3300. In this example, as with the example depicted in Table 1, the bill payment system 3130 mails a paper check to the receiver to transfer funds from the originator's account 3107 to the receiver's account 3112. The mailing time is the same (3 days). In this case, however, the disbursal of the payment instrument (3310) occurs shortly after (and on the same day) as the receipt of the payment request (3305). The paper check is thereby placed in the mail two days sooner than for the ACH transaction described above. Additionally, payment processing may be accelerated in cases where (as shown in FIG. 32) the clearing account 3117 is maintained by the same financial institution as the originator's account 3107, allowing real-time or near-real-time holds to be put on the originator's account 3107 and thereby allowing the check or other payment instrument to be disbursed prior to funding the payment. In this example, the originator's account 3107 isn't debited until Day 5 when the payment amount is credited to the receiver's account 3112.

Accordingly, a bill payment system 3130 operating in accordance with the present disclosure is able to deliver a closed-loop check payment process and disburse payment instruments faster than comparable payment methods (such as ACH). Furthermore, embodiments of the present disclosure may perform transactions without requiring the funds from the originator's to be transferred into a clearing account prior to disbursing the payment instrument, thereby allowing the originator to have access to the funds while the check is being delivered to the recipient.

TABLE 2

| Day 1 | Request for payment from originator to receiver submitted; payment instrument disbursed. |
| --- | --- |
| Days 2-4 | Payment instrument en route to receiver. |
| Day 5 | Payment instrument is received by receiver, and presented to receiver's financial institution; payment is processed and receiver's account credited. |

As stated previously, embodiments of the present disclosure may be configured to provide a closed loop process that allows images of cashed checks and the payment status of checks to be retrieved by, for example, the bill payment system 3130. Embodiments of the present disclosure may provide any other desired features of a closed-loop process, including the display of cashed check images, retrieving check payment status, generating alerts when checks have not been cashed, fraud protection, and reporting on outstanding checks. A closed-loop process provided in accordance with the present disclosure may be a "positive pay system," meaning that all checks presented for payment are first verified before they are honored. Payments may be made in any suitable manner, including using check images for electronic or paper checks. Such images may include check clearing information on the back of the check, as well as other information.

As described above, alerts may be generated in response to various events, including when a check is not deposited by a receiver within a certain number of days, when funds are not withdrawn from the originator's account as expected, when a second check or other payment instrument is presented by a receiver before a first payment instrument is presented, and in response to any other desired condition or event. Additionally, embodiments of the present disclosure may analyze the status of transactions and generate reports including, for example, the number of outstanding checks for a given originator. Among other things, this helps originators to avoid being blindsided by a large number of outstanding checks coming in at once, as well as to allow the originator to follow up with its receivers to inquire why checks have not been cashed.

Synchronization of Record-Organized Data

Figure 34A:
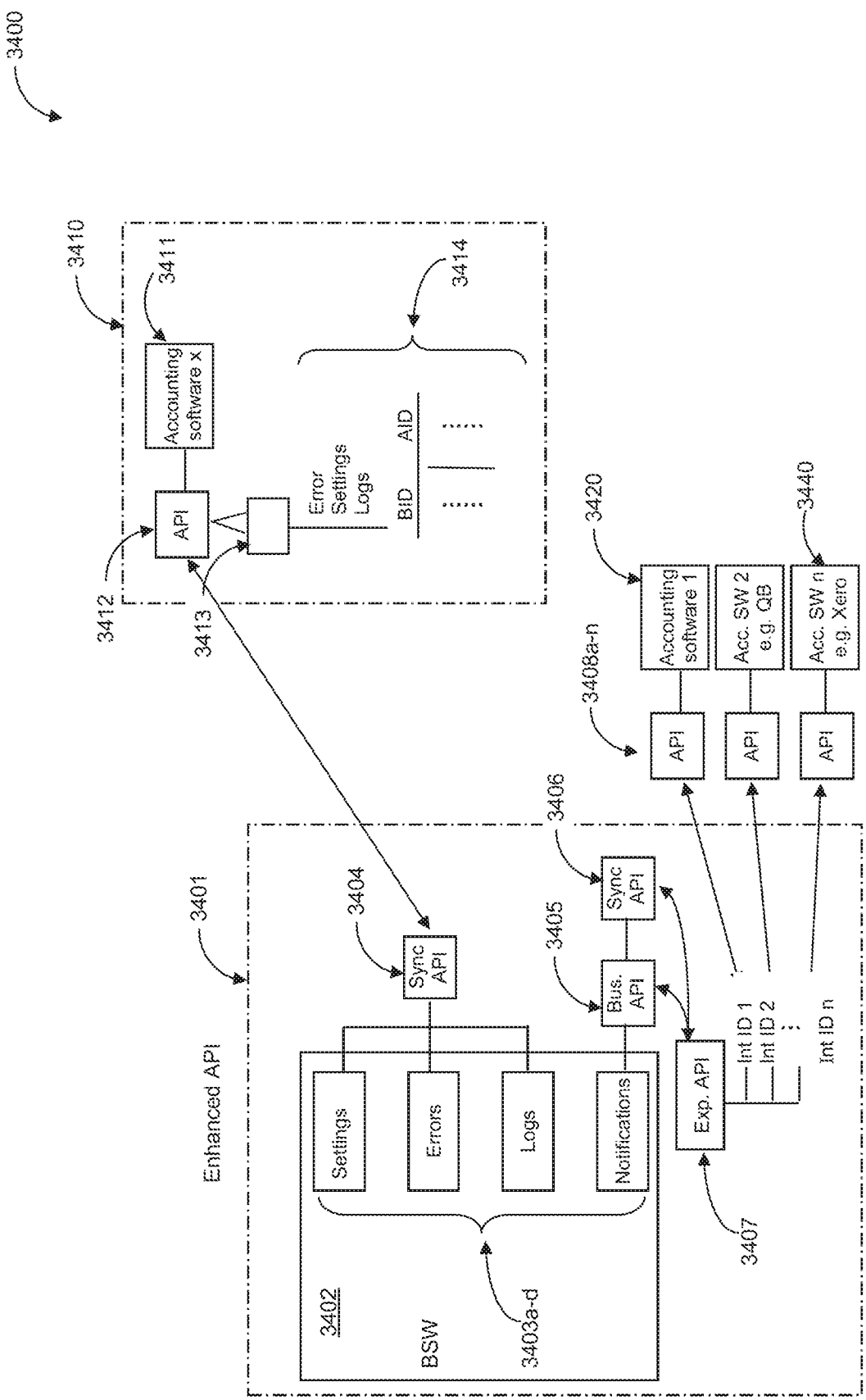
FIG. 34A is a block diagram of a system according to various aspects of the present disclosure.

FIG. 34A depicts an exemplary system 3400 according to various aspects of the present disclosure. In this example, environment 3401 contains a cloud-based billing system BSW 3402 and an enhanced control panel set 3403*a-d*, with settings, error settings, log settings, and notifications. Synchronization application programming interface (API) 3404 synchronizes with other applications, such as, for example, secondary API 3412 in environment 3410, which in turn interfaces with third-party accounting software 3411. API 3412 can generate logs, settings, and other information that can be mapped through a synchronization table 3414. In this example, billing software IDs are shown on the left side of the synchronization table 3414, and accounting software IDs shown on the right side of the table 3414. Such field mapping helps the system to interface with other accounting software applications by, for example, using a separate synchronization table for each connected application. Environment 3401 further includes a business API 3405 and system API 3406. Embodiments of the present disclosure may include any number of additional APIs, as well as other software and/or hardware components.

Environment 3401 further includes expanded API 3407, which enables the system to simultaneously interface with multiple accounting software instances. As shown, multiple APIs 3408*a-n* (assigned corresponding identifiers 1 through n) interface with, respectively, accounting software packages 3420, 3430, and 3440. Embodiments of the present disclosure may also interface with multiple accounting software instances via a single API. Embodiments of the present disclosure may also interface with multiple accounting software instances running on the same hardware platform, or on multiple hardware platforms.

In contrast to interfaces such as API 3412 in environment 3410, accounting packages 3420, 3430, and 3440 do not require a separate synchronization table to interface with environment 3401. In environment 3401, edits to documents and database records from the accounting packages 3420, 3430, and 3440 is managed centrally by the billing software BSW 3402. Among other things, embodiments of the present disclosure helps enhance the transfer of information and avoids conflicts by enabling separate programs to each make concurrent (i.e., simultaneous) changes to the same documents and records. The system can reconcile multiple changes in a single document from different sources.

Figure 34B:
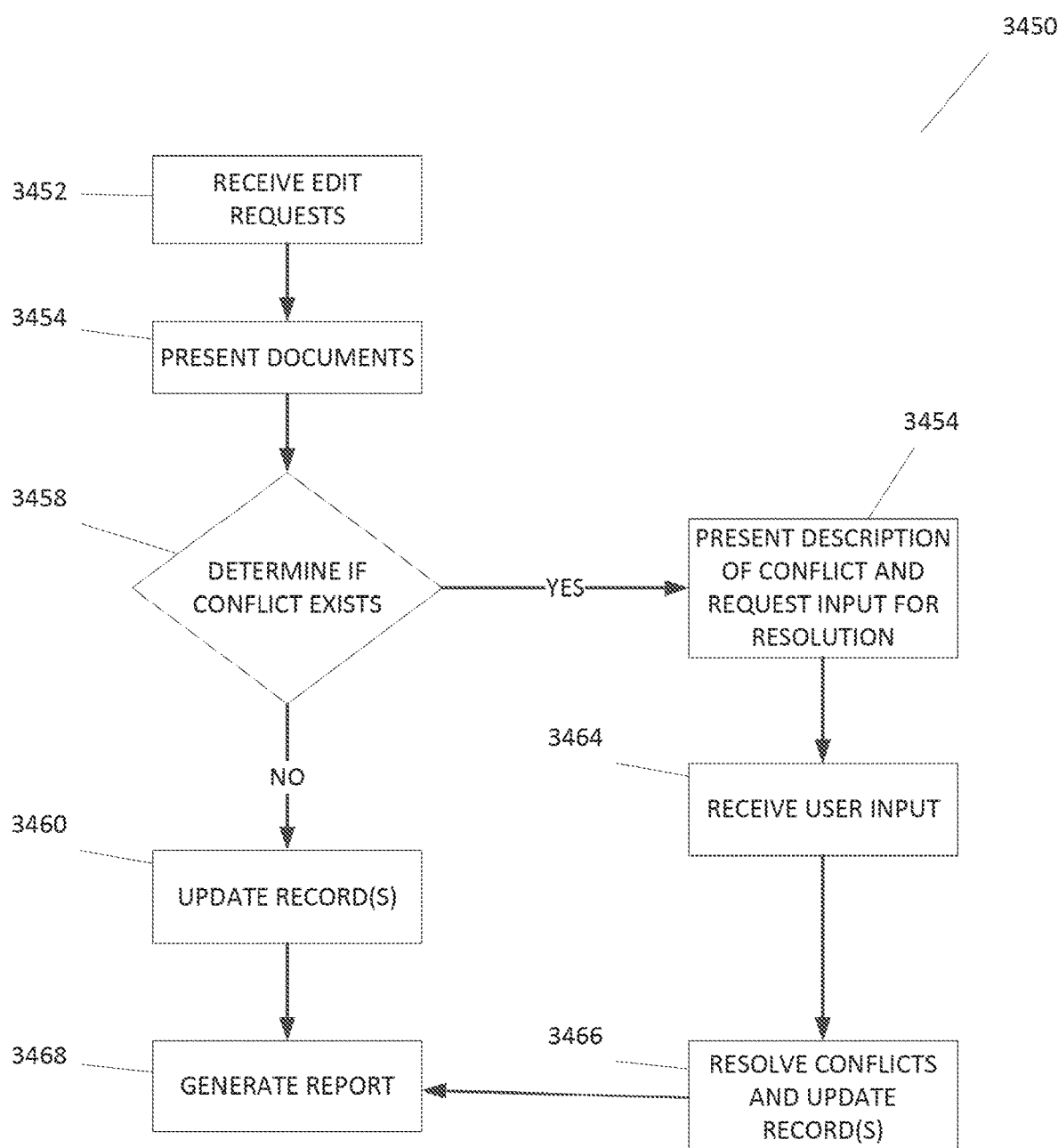
FIG. 34B is a flow diagram of a process according to various aspects of the present disclosure.

FIG. 34B is a flow diagram of an exemplary process that may be performed by various embodiments of the present disclosure, including system 3400 in FIG. 34A. Exemplary method 3450 includes receiving edit requests (3452), presenting documents for editing (3454), and receiving edits (3456). Method 3450 further includes determining whether conflicts exist between the received edits (3458), and updating the record(s) in the database (3460) if no conflict exists. If it is determined a conflict exists, a description of the conflict is presented along with a request for user input to resolve the conflict (3462). Input from the user is received (3464) and the conflict is resolved in accordance with the input (3466). One or more reports may also be generated (3468).

Figure 35:
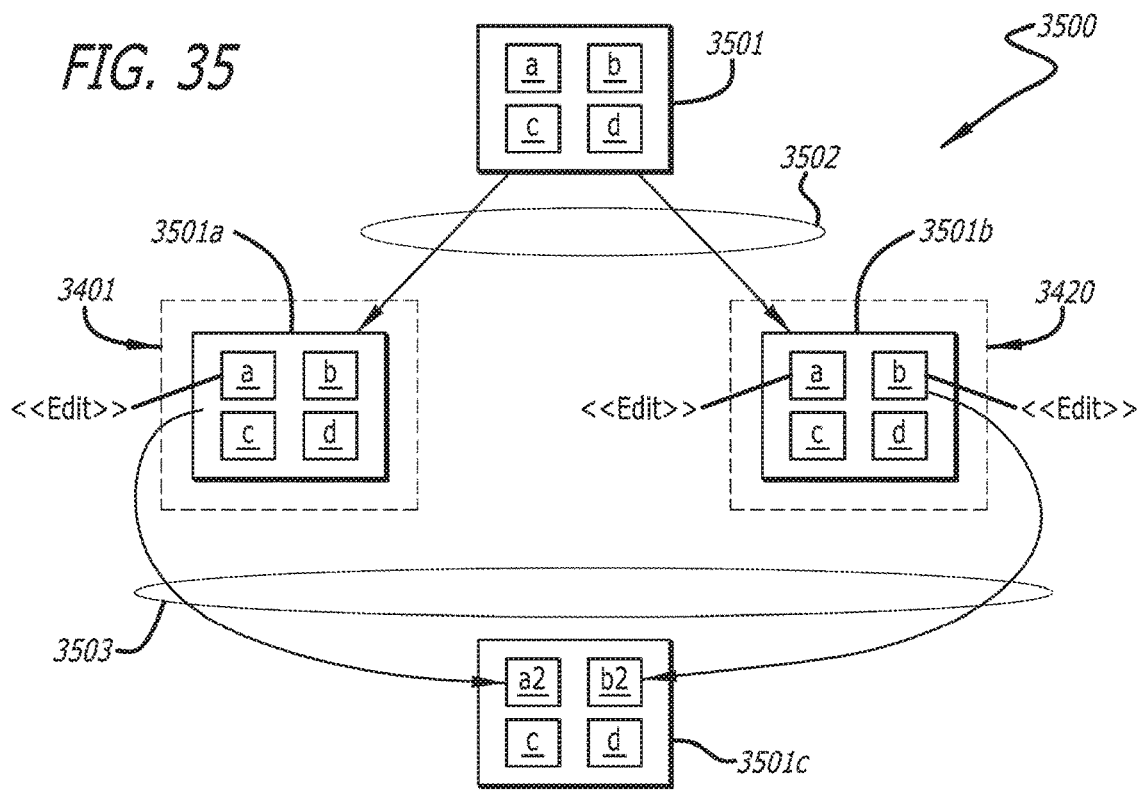
FIGS. 35 and 36 are diagram illustrating examples of record synchronization according to various aspects of the present disclosure.
Figure 36:
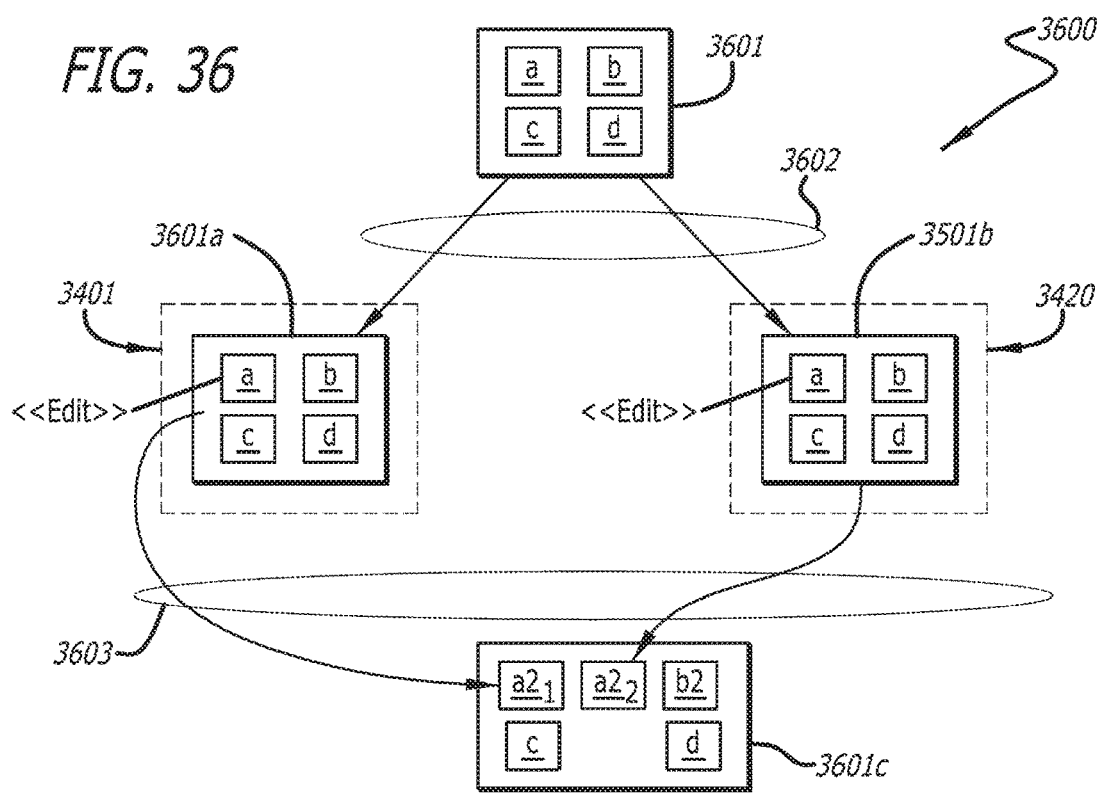

FIGS. 35 and 36 illustrate examples of synchronizing edits to fields of a database by two different accounting software packages in accordance with the method 3450 shown in FIG. 34B. In example 3500 in FIG. 35, two different software applications edit a document 3501. In this example, document 3501 is an invoice having four sections, a, b, c, and d, with each section corresponding to a field in one or more database records. For example, section "a" might correspond to the invoiced party, while section "b" may correspond to a description of the items in the invoice, section "c" to the invoice ID, and section "d" to the total due. Embodiments of the present disclosure may present any number of record fields for editing via a document or other interface (e.g., via a web page).

At 3502, two different accounting software applications request the invoice 3501 for editing (3458). In example 3500, two separate copies of document 3501 are provided to the two software packages for editing, 3501*a* and 3501*b*. In document 3501*a*, invoice field a is edited by tool 3401 (shown in FIG. 34A), while in document iteration 3501*b*, invoice field b is edited by accounting software 3420 (also shown in FIG. 34A). Embodiments of the present disclosure may interface with multiple instances of the same accounting software application, as well as with instances of different accounting software packages.

At 3503, the edits to documents 3501*a* and 3501*b* are received (3456) from the respective accounting software packages. The edits are analyzed to determine whether a conflict exists (3458). In some embodiments, determining whether a conflict exists may include withholding from updating the record(s) in the database until all pending edits from multiple software applications have been received. In example 3500, each accounting software application edited different fields (a and b), and accordingly it is determined there is no conflict between the edits. The edits to fields a and b (a$2_1$ and b$2_1$) are thus updated in the appropriate database record(s) having these fields. Additionally, the changes are further saved in document iteration 3501*c*, which can be provided for future edits of the invoice 3501. In this example, fields c and d are unchanged. Embodiments of the present disclosure can save updates to a record in a new version of the record instead of, or in addition to, saving a new version of the document, such as document 3501*c*. Multiple versions of records and files may be retrieved to, for example, view a history of changes.

FIG. 36 shows another example where two different accounting software applications edit the same field. In example 3600, the two applications each request to edit (3452) document 3601 and receive documents 3601*a* and 3601*b* in response to the requests (3454). In this example, both applications edit field a, and when the edits are received from the applications (3456) there are two different edits to the original field a: fields a$2_1$ and a$2_2$. The system determines a conflict exists (3458) and presents a description of the conflict along with a prompt for user input to resolve the conflict (3462).

FIGS. 37 through 45 show exemplary screenshots showing user interaction with the system to reconcile inconsistencies in edits. Embodiments of the present disclosure may identify any number of conflicts between edits from different sources based on any desired criteria. In some cases, for example, a conflict may be identified based on editing of record fields, while in other cases, conflicts may be identified based on documents being provided from different sources. Information regarding conflicts and prompts for input regarding them may be presented to a user in any desired manner, including using windows, graphics, icons, sounds, and/or any other user interface features. In some embodiments, the content of the fields may be displayed to the user. Additionally, a user dragging a pointer (e.g., from a mouse or other selection device) over of any of the various options may cause a window to pop up with data from a document, database record, or fields therein.

Figure 37:
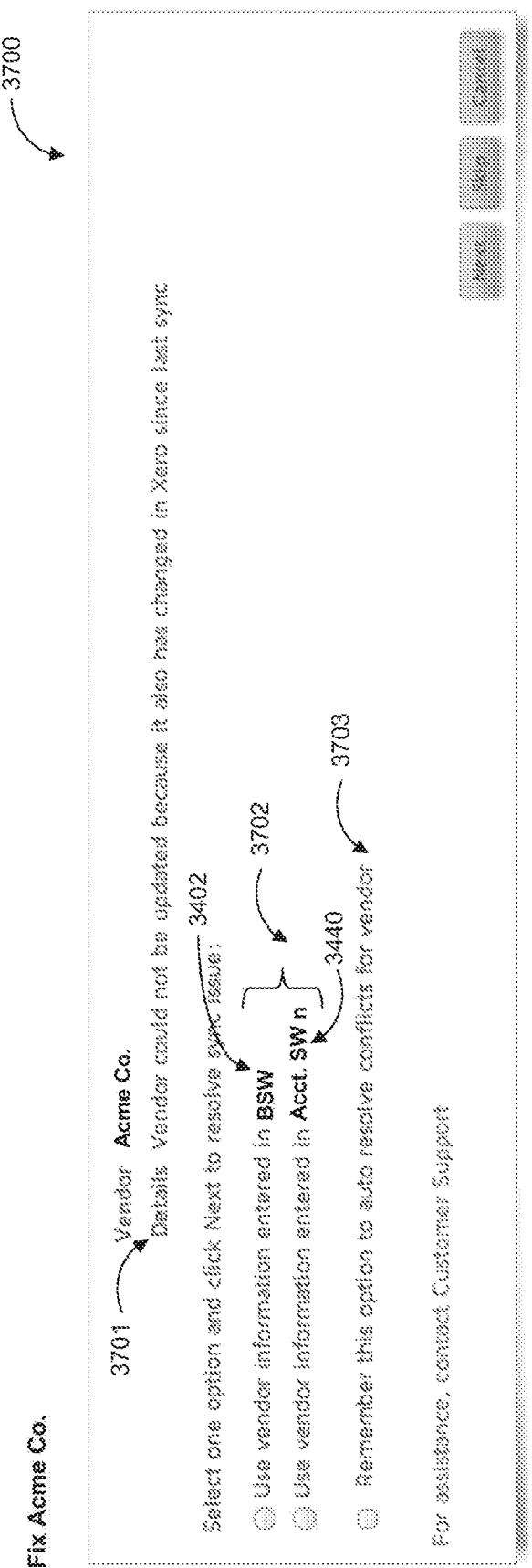

FIG. 37 shows an exemplary screen 3700, according to one aspect of the system and method disclosed herein, asking the user which data to keep in the event of a conflict between edits to the same record field from two different software packages. Section 3701 provides a description of the conflict that occurred, while section 3702 provides selectable options and prompts the user to choose whether to use data from application BSW 3402 or from accounting software n 3440. Section 3703 prompts the user to choose whether or not the user's selections in section 3702 should be remembered for future use. If the user selects the checkbox to remember the option, the system may, in the future, use that option automatically, or the system may use the option as the default selection displayed.

Figure 38:
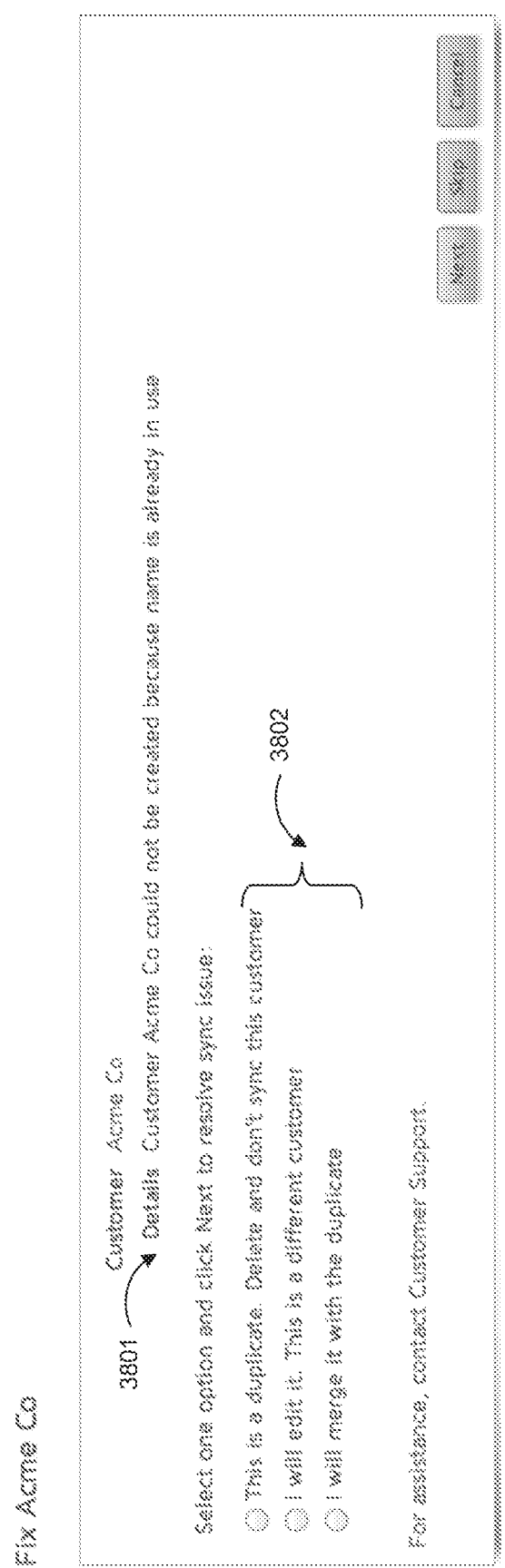

FIG. 38 shows an exemplary screen 3800 presenting an error message 3801 and a set of possible solutions 3802 in response to determining a conflict arising from duplicate customer names. In this example, the user is presented with three choices in section 3802: a first selectable option for deleting the duplicate data without updating the record, a second selectable option for editing the duplicate data by the user, and a third selectable option for merging the edited fields in the record with original data in the record by the user.

Figure 39:
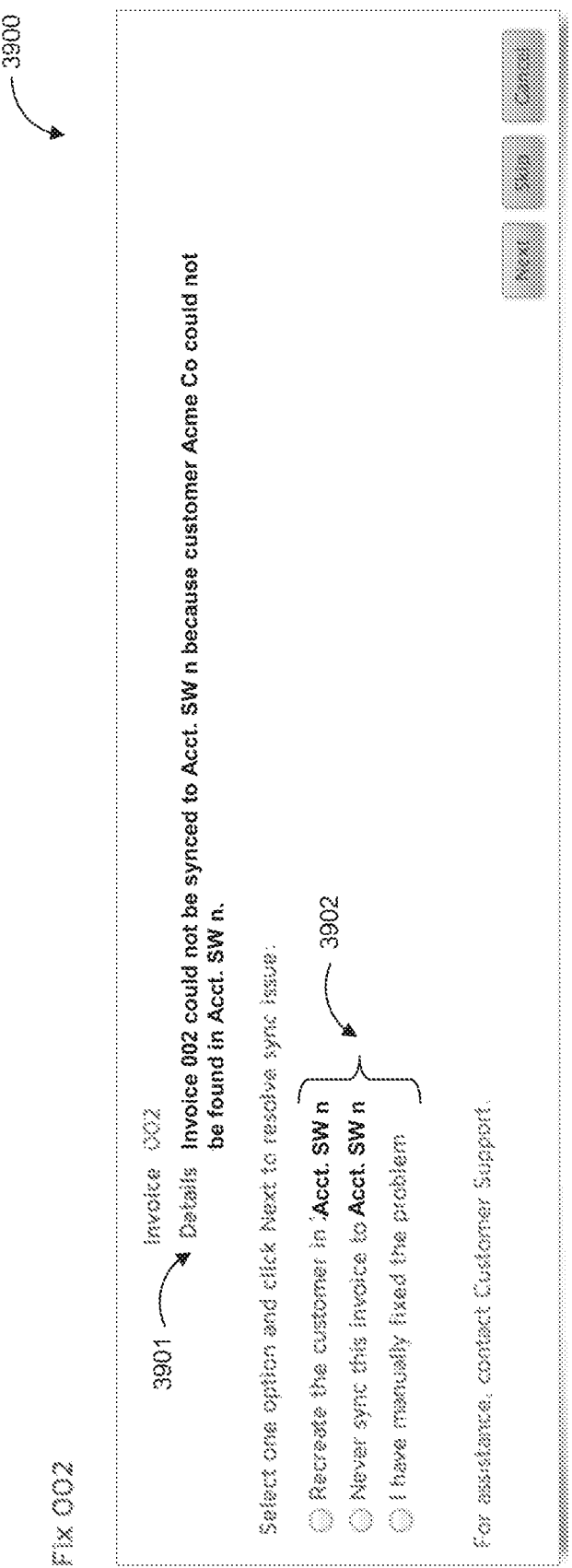

FIG. 39 shows an exemplary screen 3900 identifying, in section 3901, a conflict arising from information missing from the database where edits from one or more accounting software applications depend on the missing information. Options to resolve the conflict are presented in section 3902. The conflict in this example may arise where some records contain dependencies to other records, such as, for example, bills depending on vendors, chart of accounts, and the like. When the system tries to create a bill, if the vendor is not in the other system for some reason, the system can report the issue by passing the ID of the related object that is missing. Section 3902 presents three selectable options to the user for resolving a conflict based on missing information, including a first selectable option for creating the missing information in the database, a second selectable option for preventing updating the record in the database, a third selectable option for manually resolving the conflict by the user.

Figure 40:
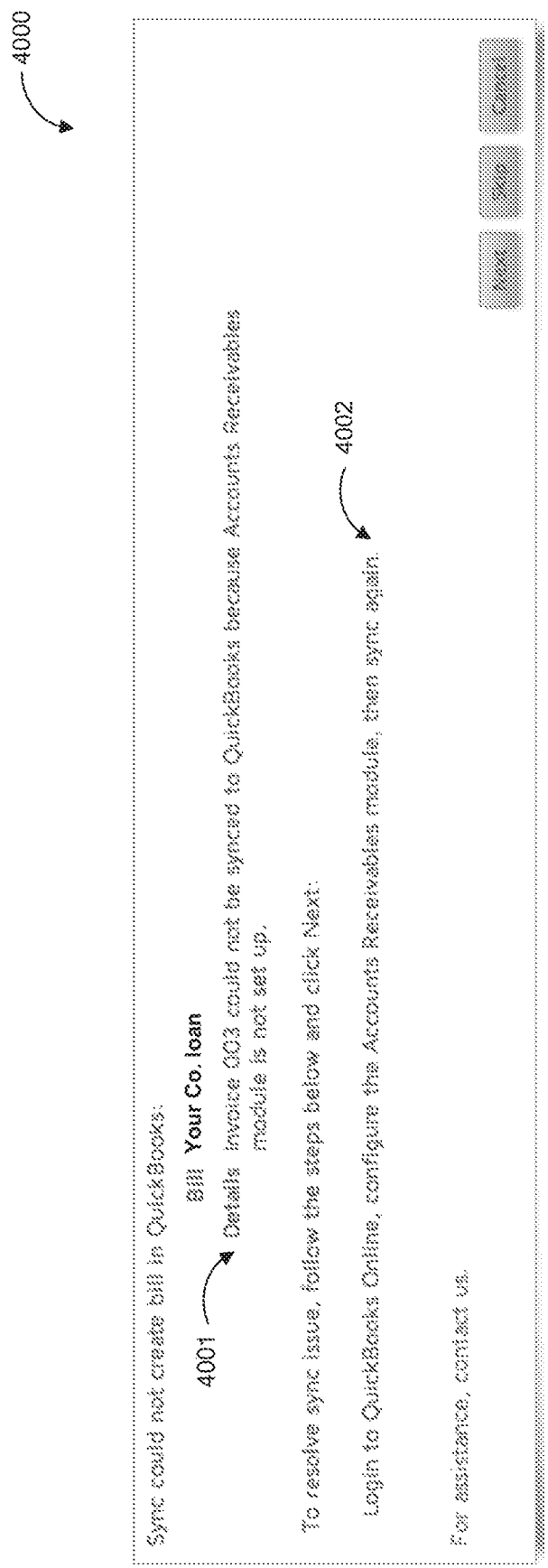

FIG. 40 shows an exemplary screen 4000 that identifies a conflict in section 4001 and presents a list of steps to be taken by the user to resolve the conflict in section 4002. Screens like screen 4000 may be used when the error or problem is a result of an incomplete configuration of one or more of the accounting applications making edits. Embodiments of the present disclosure may further offer to create a note or message to the user, so the user can execute the steps while keeping the note in a separate window. In some cases, the note may contain interactive links to call specific screens or wizards helping to automatically perform one or more tasks in the list.

Figure 41:
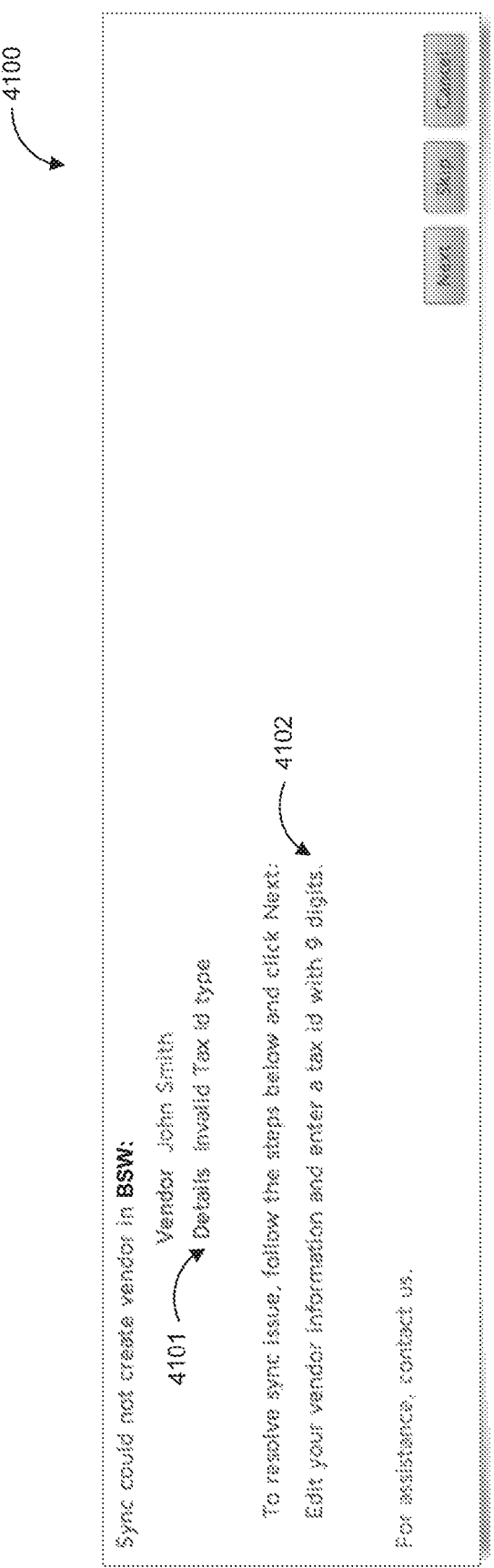

FIG. 41 shows an exemplary screen 4100, according to one aspect of the system and method disclosed herein, presenting an exemplary data consistency problem, for example, in section 4101. The solution in section 4102 may again involve step-by-step instructions, and the solution may also have added features as discussed just above or throughout. In this example, the list of steps to resolve the conflict is a single step indicating the user should add a correct tax ID to resolve the problem of an invalid tax ID.

Figure 42:
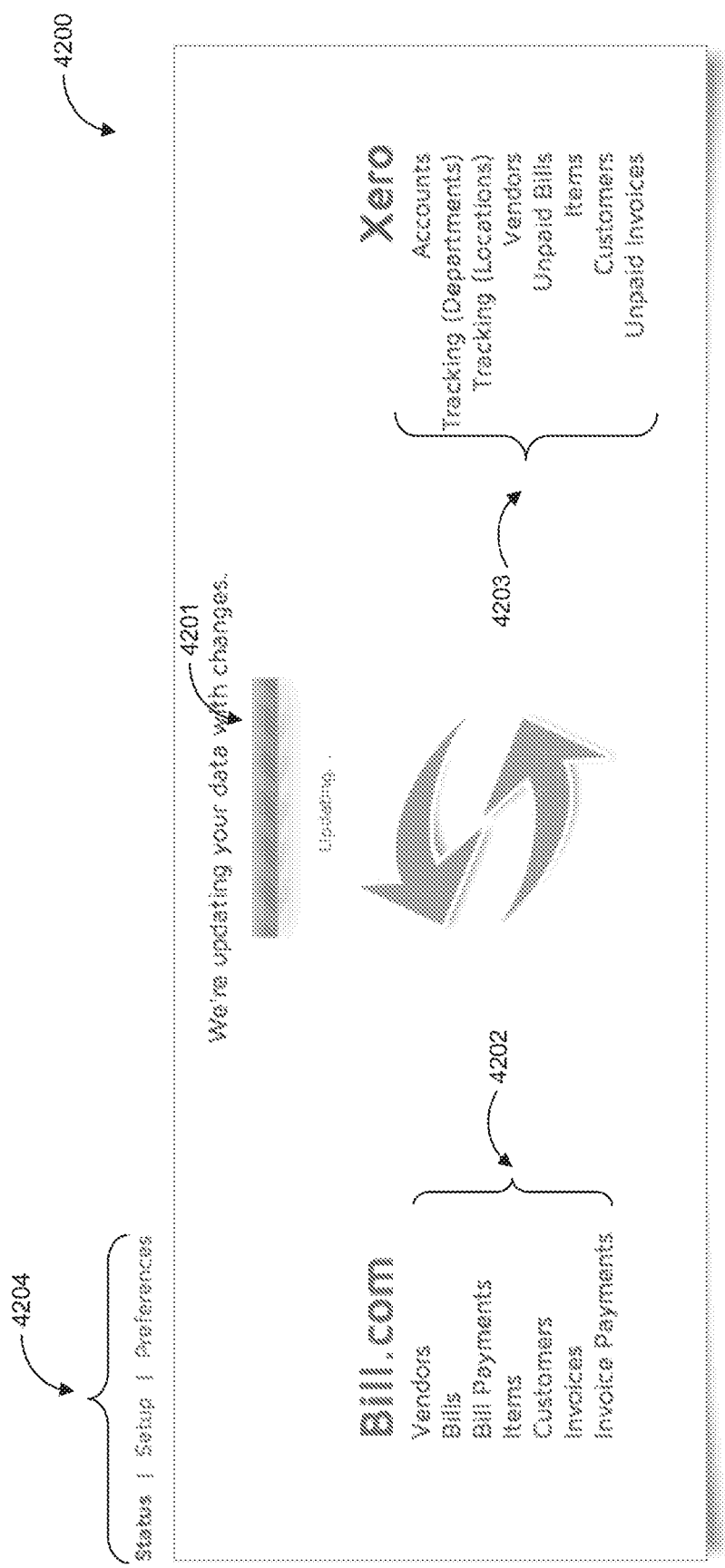

FIG. 42 shows an exemplary screen 4200, according to one aspect of the system and method disclosed herein, presenting a status page showing that synchronization is in progress. The page (or window or screen) shows a progress bar 4201, a command section 4204, and aspects of two exemplary accounting software applications 4202 and 4203. The tasks and subtasks being performed to synchronize edits to documents and records may also shown, giving the user a more detailed description of the progress of the synchronization process.

FIG. 43 shows an exemplary screen 4300 showing a report that may be generated (3468) for users or customer support agents. In this example, report screen 4300 presents the Sync Status page of a customer's system, while command bar navigation 4302 shows the user what portion of the report is being currently viewed, header section 4301 provides a description of the various conflicts that occurred, the resolution status of the conflicts (i.e. Fix or Fixed), and an indicator of when the conflicts occurred. Additionally, the report screen may include a list of suggested instructions for resolving each conflict and/or an option to display a request for user input for resolving the conflict as described previously.

Figure 44:
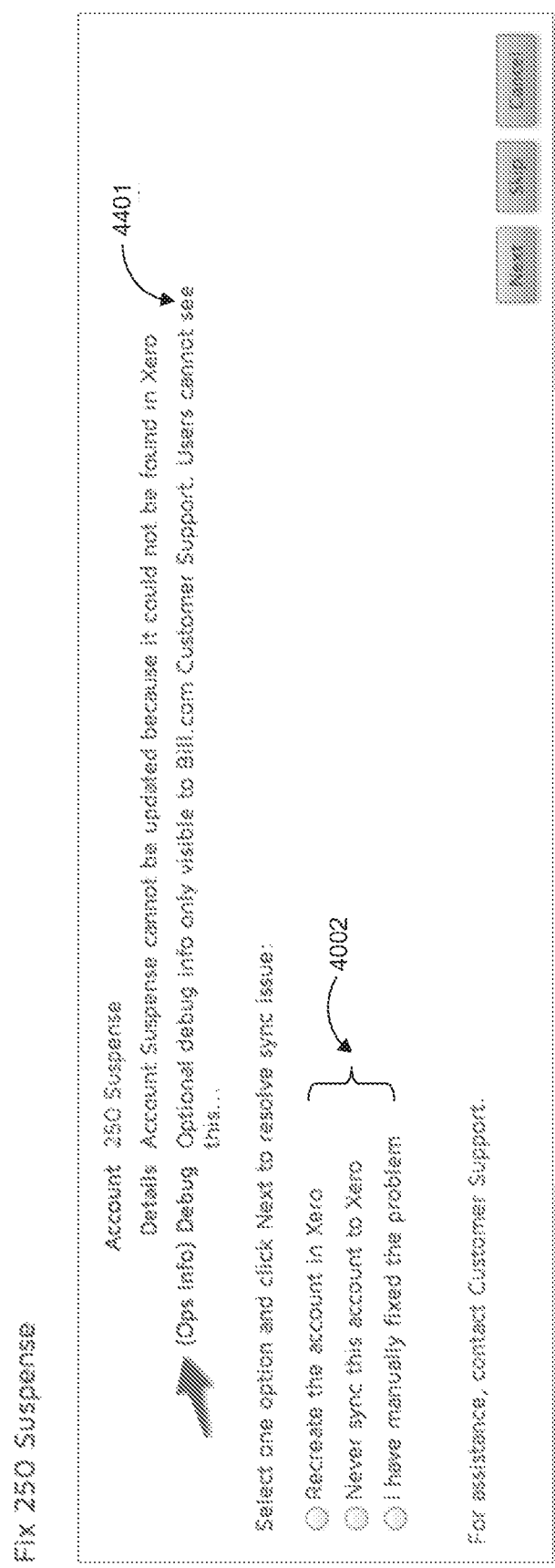

Reports may be restricted to customer service agents having at least a predetermined access level, particularly when information in the report (i.e., regarding operation of underlying software routines and debug information) is not appropriate to be displayed to an end user. FIG. 44 shows an exemplary screen 4400 presenting an error page that customer support or operation agents for a service provider (e.g., local or remote agents) can view to aid users in resolving conflicts. These agents can see the same errors (such as, for example, those previously discussed in detail) that the users can see in order to help the user correct the errors, or even fix the errors on behalf of the user if needed. Based on their access level, customer support agents may be provided additional information and options over other users. For example, on the Fix details page shown in FIG. 44, they can view an additional debug information field 4401, where the system can add debugging or other useful information for troubleshooting that is not appropriate for end users. The end user may contact such a support agent by chat or a call, either directly from the user's error screen, or just by dialing a support number.

FIG. 45 shows an exemplary screen 4500 that is the updated error summary 4300, after a customer support agent has fixed a problem in previous screen 4400, as shown by arrow 4505 now pointing to the line in which the Action is "fixed." In this example, when an agent clicks Edit Fields for Sync, the agent has the three choices for any object in an error state in Acme.com's account in BSW, namely a first selectable option for allowing edits from one or more of the first accounting software application and the second accounting software application to be updated to the record, a second selectable option for forcing edits from one or more of the first accounting software application and the second accounting software application to be updated to the record, and a third selectable option for clearing an identifier associated with the edits from one or more of the first accounting software application and the second accounting software application. If the agent does not check Allow Export 4501, "Allow integration" is set to false so record should not be synchronized. Force Re-sync 4502 forces a record tore-synchronized even if it didn't have any changes. Clear Integration Id 4503 clears the integration Id stored in Acme.com's account in BSW so the system re-creates it instead of trying to update it in the other system.

Modification of Auto-Learned Conflict Resolution and Related Rule and Value Replacements As shown in FIG. 37, a user may choose (via section 3702) to have the user's selections applied in the future automatically or as a default selection displayed. In alternate embodiments, a user's selections may be automatically learned by the system as rules to be applied to later processing and/or conflict resolution. Some conventional systems may permit users with limited access to such rules, but often provide the user with few options for changing them.

In many cases, a user's only recourse (if one is available at all) to addressing an incorrect rule is to delete all the stored rules and re-enter them. In other cases, a user may not even be provided with such an option, and is thus unable to delete or modify such a rule without help from a systems technician. Embodiments of the present disclosure address these and other issues by enabling a user to find the rules that apply contextually to various stages of a billing system's workflow and allowing the user to quickly and efficiently manipulate the rules associated with each workflow stage.

Figure 46:
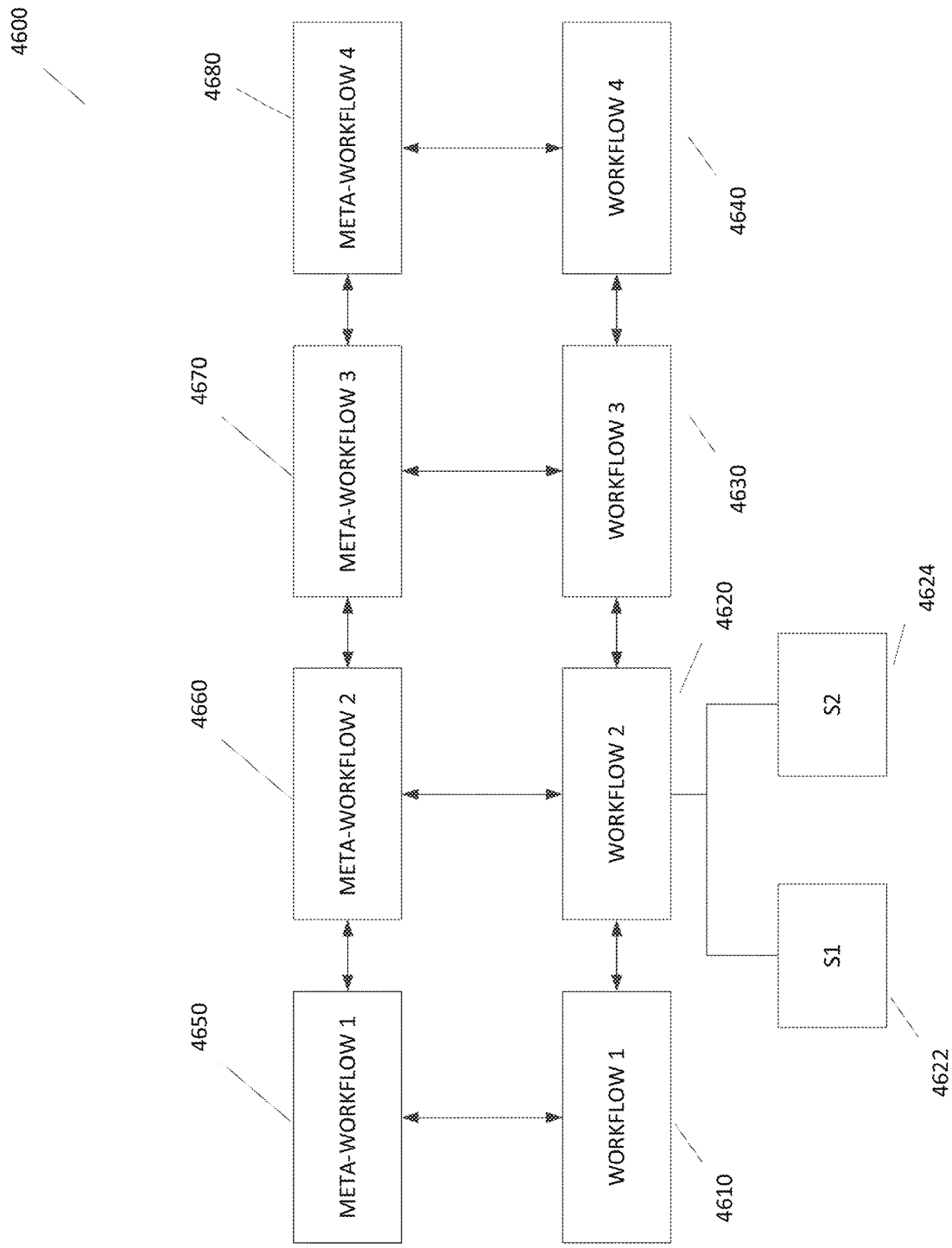
FIG. 46 is a diagram showing an exemplary accounting system workflow according to various aspects of the present disclosure.

FIG. 46 is a block diagram showing a high level-view of an exemplary workflow 4600 for an exemplary billing and accounting system, such as described above. The workflow 4600 in this example includes multiple steps (4610, 4620, 4630, 4640). Workflows presented in conjunction with embodiments of the present disclosure may include any number of desired steps. Each workflow step may include one or more pages that present data, user interface tools (such as buttons, pull-down menus, text boxes, and the like), and other information to the user. A workflow thus may include a plurality of different pages for effecting edits to database records and performing other functions. FIGS. 37-45 (described above) show exemplary screenshots of pages that may be presented as part of a workflow.

In the exemplary workflow 4600 shown in FIG. 46, the WORKFLOW 2 step 4620 contains a conflict that must be resolved, namely that two sources, S1 4622 and S2 4624, have different values for the same field. Sources S1 4622 and S2 4624 may include, as described above, different accounting software packages making simultaneous edits to the same fields of a database record. As described previously with reference to method 3450 shown in FIG. 34B, a user chooses which of the two values to use, and he has the option to say whether he wants the selected value to be used in the future automatically (see FIG. 37). Once the user has made such a selection, the system may generate a rule to automatically use the value from S1 or S2 (depending on the selection) for future transactions without further input from the user.

Conventional accounting software and billing systems often do not allow a user modify such rules once they are made. Embodiments of the present disclosure, however, allow a user to quickly and easily add, delete, or modify such rules using a meta-workflow track, represented in FIG. 46 by META-WORKFLOW steps 1-4 (4650, 4660, 4670, 4680). The user can access any desired meta-workflow step (4650, 4660, 4670, 4680) via a user interface features, such as by pressing a button or invoking other user interface feature displayed on the page associated with the workflow step (4610, 4620, 4630, 4640) currently active by the user.

For example, the user may select a user interface feature on the page presented in conjunction with the WORKFLOW 2 step (4620) and transition to META-WORKFLOW 2 step (4660) to open a view of the rules associated with processing a transaction in the WORKFLOW 2 step (4620). Such rules may be associated with a page or pages presented for a particular workflow step, as well as with a database record being viewed, modified, or otherwise associated with a workflow step. Through the meta-workflow steps, the user may modify and/or remove existing rules, as well as add new rules, via input through the user interface.

The user may freely navigate between the workflow steps (4610, 4620, 4630, 4640) and meta-workflow steps (4650, 4660, 4670, 4680) as desired. In the exemplary workflow 4600 shown in FIG. 46, the user can navigate from meta-workflow step 4660 to a previous step (i.e., 4650) or to a subsequent step (i.e., 4670 or 4680). In each meta-workflow step, the user can add, remove, or edit the rules associated with the corresponding workflow step, instead of being required by the system to delete and rewrite the entire set of rules for that workflow step, as is common in conventional accounting and billing software systems.

In this manner, problems that occur as a result of an incorrectly-learned rule, or a rule that is not appropriate for all cases, can be easily and efficiently addressed without disturbing existing rules. In the example of the conflicting data from sources S1 4622 and S2 4624, the user can change first a rule associated with the WORKFLOW 2 step (such as changing a rule that uses the value from S1 over S2 to use the value from S2 over S1). The user may then change any rule in any other workflow step that needs to be changed because it is affected by the original change. In some embodiments, the system may identify and present a list of other rules affected by the addition, removal, or editing of a rule by the user so that the user can properly address all related rules without having to manually check each individual rule in the system.

Embodiments of the present disclosure further allow a user to specify whether a user's edit to a rule is to be in effect only once to a single subsequent application of the rule, or whether the edit will be in effect permanently going forward. The user may also specify whether a rule that is added, removed, or edited should be applied retroactively, thus affecting results already determined. In this manner, the user can thus correct and rebook previous transactions, as well as to generate change transactions for transactions that are corrected after the original transactions are already closed.

Figure 47:
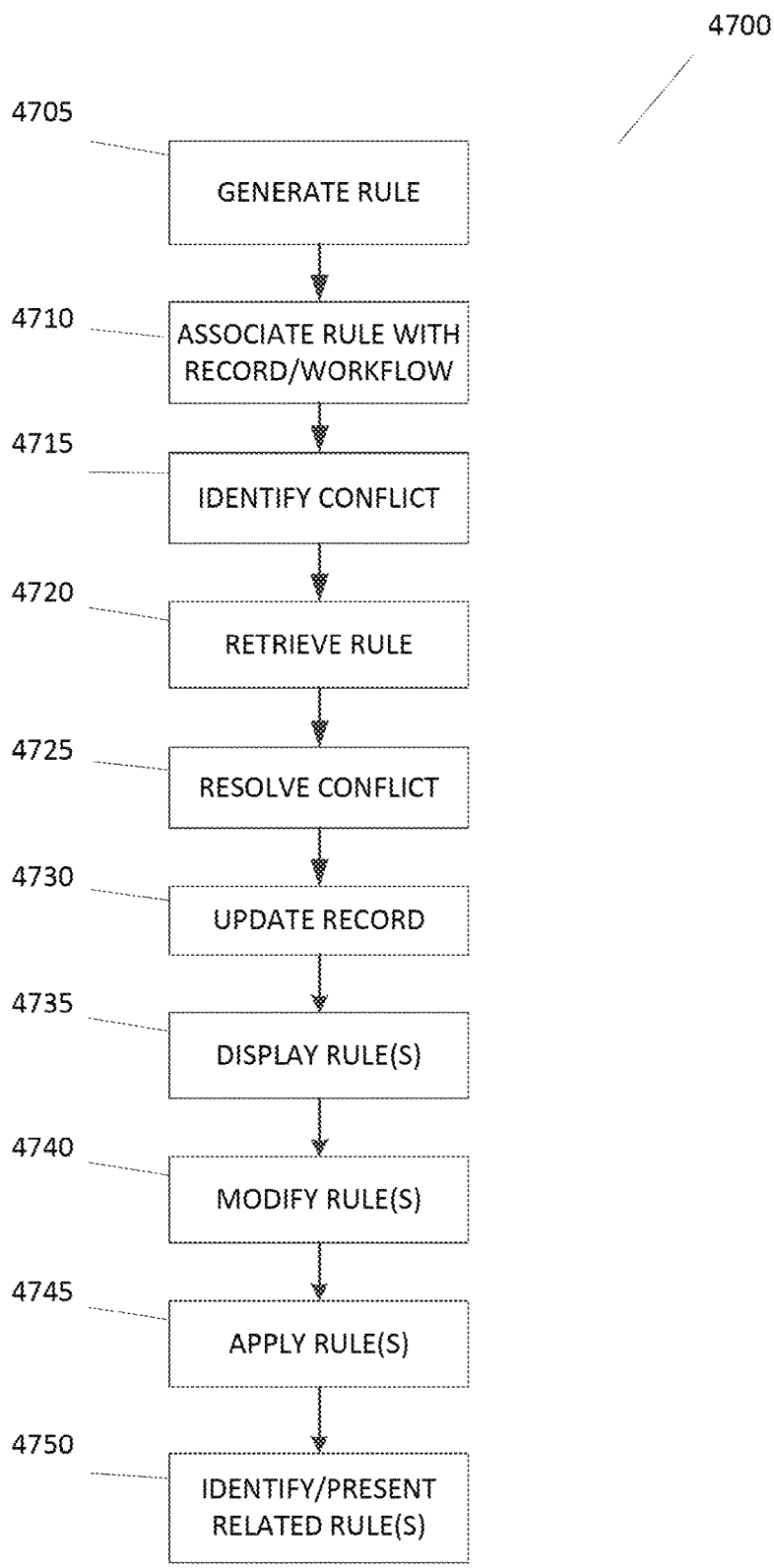
FIG. 47 is a flow diagram of an exemplary method according to various aspects of the present disclosure.

FIG. 47 depicts an exemplary process 4700 according to aspects of the present disclosure. Exemplary method 4700 may be practiced in conjunction with the steps of method 3450 (in whole or in part) shown in FIG. 34B, as well as with any other desired process. Method 4700 may be performed by various embodiments of the present disclosure, including the exemplary system 3400 shown in FIG. 34A.

For example, in conjunction with resolving conflicts and updating database records (3466), embodiments of the present disclosure may also generate a rule (4705) based on the received user input (3464) for use in resolving future conflicts. Such generated rules may be associated (4710) with a particular record, a workflow step, or both. For example, a generated rule may be associated with a workflow step presenting the page that presents the description of the conflict and the request for user input to resolve it (see step 3454 from FIG. 34B). Upon identifying a subsequent conflict with edits to a database record (4715), the generated rule may be retrieved (4720) and applied to resolve the conflict (4725), and the database record updated (4730).

As described above with reference to the exemplary meta-workflow steps, the rule(s) associated with a record and/or workflow step may be displayed to the user (4735) in response to user input. The system may then modify rules (i.e., by editing or deleting existing rules, or adding new ones) in response to the user's input (4740), and such rules may be applied (4745) as appropriate. As described above, for example, rule modifications may be applied once to a subsequent transaction, permanently going forward, as well as retroactively to past transactions. Additionally, other rule(s) related to the rule(s) modified by the user may be identified and presented (4750) to the user so that the user may address any changes to such dependencies without having to manually check each rule in the system.

Additionally, the system may receive and note the context in which the user elects to change the source of at least one field to be sourced from another application, and, upon repetition of the user's action, the systems memorizes that action and applies it in future cases. Further, before applying future changes, the system may prompt the user to confirm whether to make the change permanently.

Further, the system may not only change the source, but it may also add an algorithmic change of the field value. The user can open a meta view of the current location and see a list or graphical representation of all auto-fixes and algorithmic changes applied in that location, and he has the option to modify those auto-fixes and algorithms. Also, the system may not only change the source but may also add an algorithmic change of the field value. The user can also eliminate changes, and can navigate to previous or following steps to make changes on those auto-fixes and algorithms.

In some cases, an application may combine, synchronize, and process data from other applications for the purpose of processing and payment of bills and other related documents from one or more bank accounts, and when the data from the other applications is inconsistent, the synchronizing application controls the work flow and synchronizes data sets and workflow steps with the other applications. Further, the synchronizing application resolves most conflicts by synchronizing missing data between it and the other applications. In cases where the synchronizing application cannot resolve a conflict, a user is offered at least two options for resolving the conflict. In some cases this system is configured to be a multi-tenant system.

Connecting Entities and Effecting Payments in a Commercially Oriented Entity Network Conventional social networks are typically directed to person-to-person interactions or interactions between a person and a corporate entity. Missing is support for interactions between two or more corporate entities. Embodiments of the present disclosure provide support for such interactions, which may include social networking interactions, credibility rating, identity verification, and/or business transactions such as the facilitation of payment requests and payments.

Figure 48:
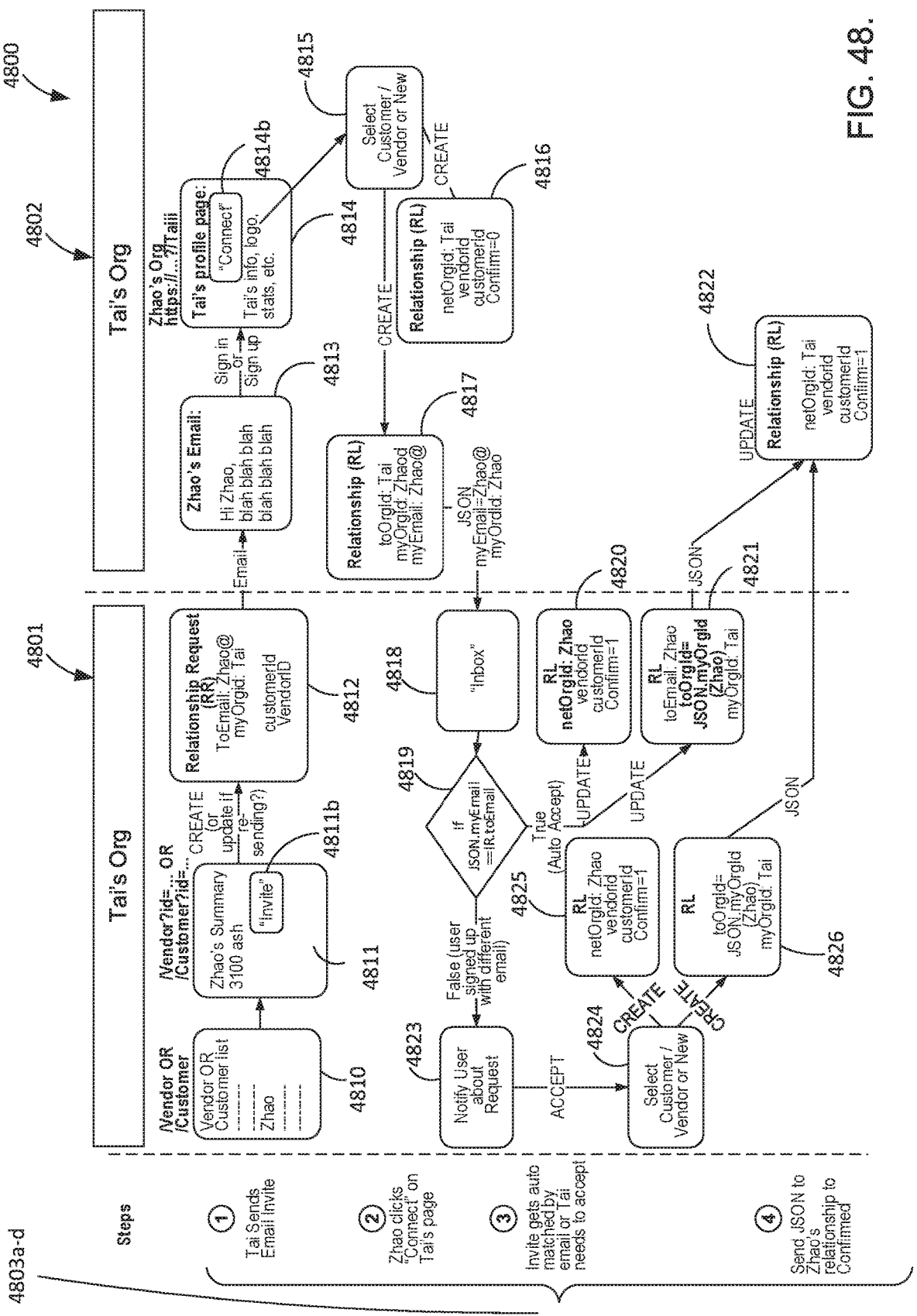
FIG. 48 is a block diagram illustrating and example of the connection of two corporate entities in a network of corporate entities.

Diagram 4800 in FIG. 48 illustrates an example of two corporate entities being connected within a network of commercially-oriented entities according to various aspects of the present disclosure. As used herein, the terms "corporate entity" and "commercially-oriented entity" may refer to any type of business organization (including for-profit and non-profit organizations), such as corporations, companies, partnerships, sole proprietorships, and/or the like. A network of corporate entities operating in conjunction with embodiments of the present disclosure may be accessed in any desired manner, such as via a website over the Internet, and may present any desired information, such as profiles of the respective corporate entities belonging to the network.

In the example depicted in diagram 4800, an "originating organization" section 4801 labeled "Tai's Org," shows actions and events related to an organization originating an invitation to join a network of corporate entities. Similarly, an "approached organization" section 4802 labeled "Zhao's Org" shows actions and events related to an organization receiving the invitation to join the network. Four steps (4803*a-d*) applicable to both organizations are listed on the left side of the diagram 4800.

In step 1 (4803*a*), an invitation is transmitted from the originating organization, Tai's Org, to the approached organization, Zhao's Org. The invitation may be transmitted using any desired form of communication. Diagram 4800 shows the invitation being sent via an email message, though alternate embodiments may provide the invitation using any other form of communication. Likewise, embodiments of the present disclosure may utilize any suitable form of communication to establish connections, perform payment transactions, and/or engage in any other interaction over the corporate entity network. The invitation may include any desired information, such as a link to access the network of corporate entities to which Tai's Org belongs, a link to view Tai's Org corporate profile on the network, and/or other information.

The approached organization may be selected in any desired manner. As indicated in block 4810, for example, the approached organization (Zhao's Org) is selected from a vendor list, customer list, or other similar list. The list may be received from any suitable source, such as from an accounting system or data repository. In block 4811, a vendor page with Zhao's summary is presented to Tai's Org along with an "Invite" button 4811*b*. In this example, selection of button 4811*b* transmits the invitation 4812.

In step 2 (4803*b*), the approached organization, Zhao's Org, is presented with Tai's Org corporate profile and generates a request to connect with Tai's Org within the network. The request to connect with Tai's Org may be generated in any desired manner, such as in response to selecting a "Connect" button or link embedded within the Tai's Org profile. In block 4813, for example, Zhao's Org receives the invitation from Tai's Org, which presents Tai's profile page at block 4814. Selection of the "Connect" button 4814*b* directs Zhao's Org to block 4815 to indicate the relationship of Zhao's Organization to Tai's organization, namely whether Zhao's Organization is a new customer, an existing customer, or a vendor. In block 4816, an entry for the relationship information is created, and a relationship confirmation message is transmitted in step 4817. In this case the confirmation message is sent within the network of corporate entities as a JavaScript Object Notation (JSON)-formatted message, but other forms of communication (such as email) could be used instead.

In step 3 (4803*c*) the invite is matched by email or by the acceptance, and then a JSON confirmation or any other kind of message is sent to confirm the relationship in step 4 (4803*d*). For example, in block 4818 the confirmation is received in the Inbox of Tai's organization. In block 4819 a test is performed to determine is the message matches the original transmitted message and, if the message matches, then Zhao's organization is confirmed (block 4820) as a vendor, customer, or both. The organization's status is updated in (block 4821), and a message is sent to confirm the connection (block 4822). If the received message is not an accurate match to the original transmitted message, then Tai's organization is notified about the connection request (block 4823) and Tai's Organization can confirm the request, or add a connection to Zhao's Organization as a new vendor or customer. In block 4825 the vendor or customer is added to the database of entities in the network of corporate entities. In block 4826 the connection between Tai's Organization and Zhao's Organization is verified, and a message is sent to confirm the relationship (block 4822).

Figure 49A:
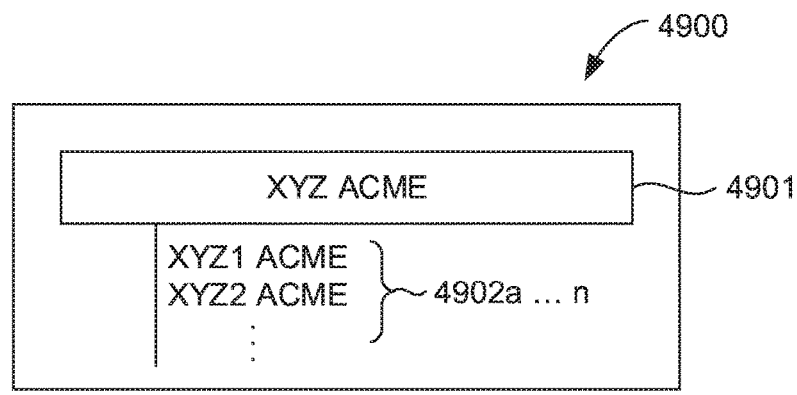
FIGS. 49A and 49B are exemplary screens according to various aspects of the present disclosure.
Figure 49B:
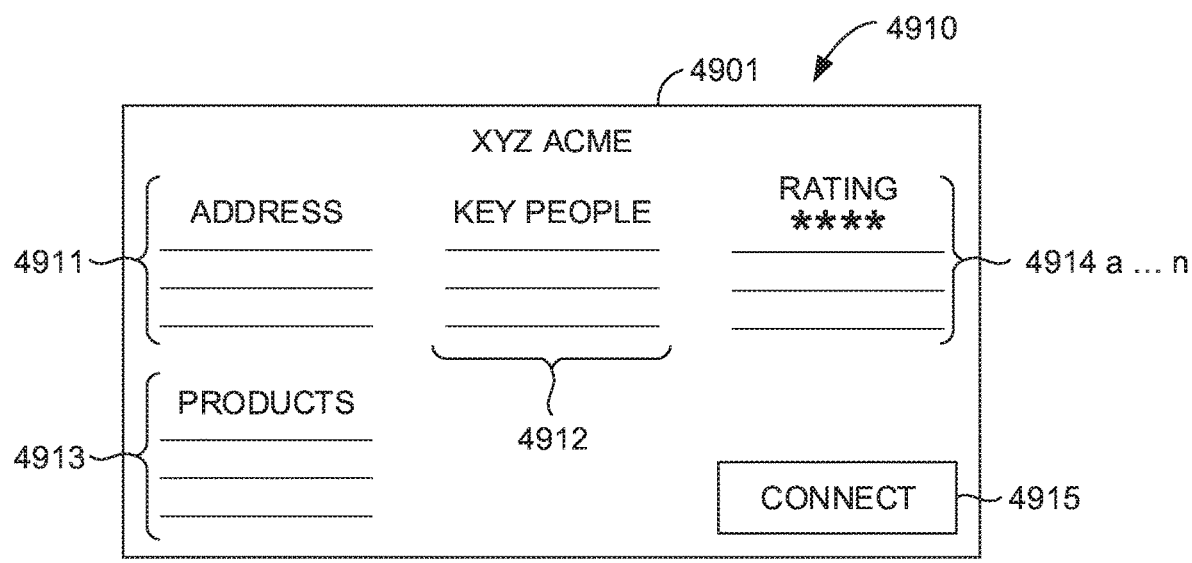

FIGS. 49*a* and 49*b* depict two exemplary screens 4900 and 4910 that may be utilized in conjunction with embodiments of the present disclosure. In FIG. 49*a*, screen 4900 shows a list of contacts in a directory, from which a user may select the desired contact in a process similar to the process described above in the discussion of FIG. 48. After entering a partial name, the system returns a list of matching possible selections 4902*a-n*. The user can then select a name 4901. In FIG. 42*b*, screen 4910 shows information about the selected company 4901, including, but not limited to, data such as address 4911, products or services 4913, key people 4912, and ratings 4914*a-n*. A user may click on Connect button 4915 to connect the user's company with company 4911. In particular, the system may show the ratings in great detail, including types of transactions, transaction partners, directionality of transactions (e.g., receiving or paying), timeliness of payments, etc. It is possible to show a great deal of data. In some cases, data may be shown as a minimal aggregate; in other cases, it may be possible to view highly detailed data.

Figure 50:
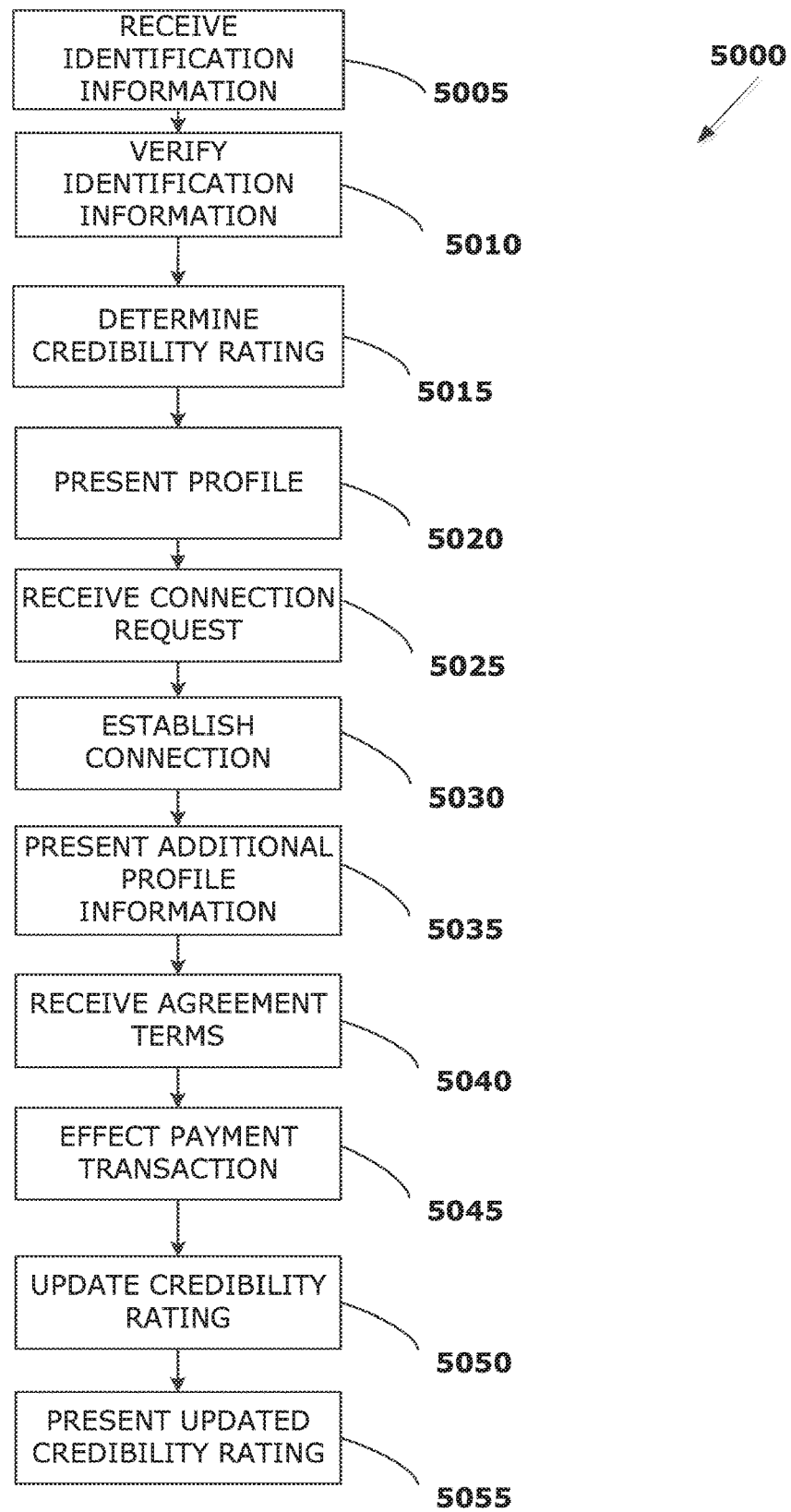
FIG. 50 is a flow diagram of an exemplary method according to various aspects of the present disclosure.

FIG. 50 illustrates an exemplary method 5000 according to various aspects of the present disclosure. Method 5000 (or portions thereof) may be performed via software operating on one or more computer systems, including any of the systems described previously and/or computer system 5110 shown in FIG. 51, which is described in more detail below.

Exemplary method 5000 includes receiving identification information for a corporate entity (5005) and verifying the received identification information (5010). Such information (or portions thereof) can be presented in the entity's profile on the network of corporate entities. Such information may also be used by the network to categorize the entity, gather metrics on the connections and transactions between the entity and other entities within the network, or for other purposes.

Any type and amount of identification information may be received for a corporate entity, such as, for example, the entity's name, address, subsidiaries, products, services, pricing, and other identifiers. The identification information may be received directly from the corporate entity or from another source. Likewise, received identification information may be verified using any number of different sources, such as comparing the received information to information regarding the entity that is retrieved from one or more websites, social networks, databases, or combinations thereof. In some embodiments, the failure to verify a piece of information about a corporate entity may cause an alert to be transmitted to the corporate entity to provide additional information to complete the verification. Unverified information may be omitted from the entity's profile on the network of corporate entities.

In method 5000, a credibility rating is determined for a corporate entity (5015) and presented as part of the entity's profile (5020). The credibility rating may be based on a variety of different factors, such as, for example, a certification of the entity (e.g., by governmental agency, trade group, or other accredited organization), a verification of a payment by the entity to another corporate entity in the network, a verification of a payment received by the entity from another corporate entity in the network, a connection between the entity and another entity in the network, a type of connection between the entity and another entity in the network (e.g., who invited whom, who paid whom, etc.), and/or a duration of a connection between the entity and another entity in the network.

The profile of an entity may be presented (5020) in any desired manner, such as via screen 4910 depicted in FIG. 49B (described above). In some embodiments, each corporate entity in the network may display a public profile that allows other companies to connect with it from the profile display, as shown in FIG. 49B. Among other things, utilizing a public profile eliminates the need for special identifiers to link two corporate entities. In other embodiments, presentation of the profile of an entity may be restricted to only those entities specifically identified by the entity. Presentation of an entity's profile may also be restricted based on membership in the network or subgroups thereof. For example, an entity's profile (or portions thereof) may not be visible to any other entity that is not part of the network, is not part of a subgroup to which the entity belongs (e.g., a group that manufactures a particular type of product or provides a particular type of service), and/or is not directly connected to the entity within the network.

In one exemplary embodiment, the presentation of an entity's profile (5020) includes providing a graphical representation of connections between the entity and other entities within the network. In one exemplary embodiment, a graphical representation showing multiple corporate entities and the manner in which they are connected to each other is includes the use of lines showing the connections between various entities. In some embodiments, the thickness of the lines between different entities may vary based on factors such as the duration of the connection between the respective entities, the number of payment transactions performed by the respective entities, the aggregate amount of payment transactions performed, and/or any other desired factor. Connections between entities (such as a line) may include a selectable link for displaying additional information regarding the connection between entities. Subgroups of different entities may likewise be shown graphically (e.g., using boundaries surrounding each subgroup).

The credibility rating may be any numerical or non-numerical format. For example, the credibility rating may be tied to a 100-point scale, a letter-grade system (e.g., "A+," "A," "A−," "B+," etc.), and/or another format. Alternatively or additionally, the individual factors contributing to the credibility rating of a corporate entity may be shown. Among other things, this provides transparency to the credibility rating system and allows corporate entities to more easily dispute errors in the calculation of the credibility ratings.

The credibility rating may be higher or lower for a corporate entity that is part of a particular subset of corporate entities within the network of entities. For example, an entity that is a member of a group of companies that collectively have a high track record of successful payment transactions may receive an increase in its credibility rating simply by belonging to the group. On the other hand, a company belonging to a subset of companies having a poor track record of payment transactions may receive a decrease in its credibility rating. In some embodiments, corporate entities may be provided with an option to 'self-verify' themselves using, for example, a service provided by the provider of the network or a 3rd party service. In this manner, a corporate entity can proactively provide information to help define an accurate credibility rating for itself.

A second corporate entity can review a first corporate entity's profile and decide (e.g., based on the first corporate entity's credibility rating) whether to connect with the first entity. In method 5000, systems operating in conjunction with the present disclosure may receive a connection request (5025) from the second entity wishing to connect with the first entity. The communication request may be transmitted, for example, in response to a user of the second entity selecting the "Connect" button 4915 displayed in the first company's profile page 4910. Connection requests may be received from corporate entities in any other suitable manner, such as via email, telephone, or using another communication method.

A connection between two corporate entities may be established (5030) in response to receiving the connection request (5025). The connection between two entities may be established in any desired manner, such as is described above with regards to FIG. 48. In some embodiments, establishing a connection between two corporate entities may result in additional information being presented (5035) in the profiles of the connected entities that is not available to non-connected entities. In some embodiments, a corporate entity may select the information that is shown to various connected entities, such that not all connected entities see the same information for a given entity. Any desired additional information may be provided subsequent to the connection of two entities, such as information regarding payment transactions between entities in the network, information on the connection between two corporate entities (e.g., when the connection was established, who requested the connection, the number of transactions completed by the two connected entities, the amounts of such transactions, the goods and services exchanged between the two entities, etc.).

Embodiments of the present disclosure may receive terms (5040) defining one or more agreements between the corporate entities in the network. In some embodiments, such agreements can be stored and viewed as part of a corporate entity's profile. In some such embodiments, agreements may only be viewable by the corporate entities that are party to the agreement. In other embodiments, an agreement may be viewable by corporate entities that a party to an agreement expressly allows to see the agreement.

Embodiments of the present disclosure may effect (i.e. facilitate) payment transactions (5045) between different corporate entities in the network of entities. Payment transactions may be effected independent of, or through, the network of corporate entities. Embodiments of the present disclosure may effect any type of transaction in any desired manner, including any of the transactions using the payment processing methods described previously.

In one exemplary embodiment, effecting a payment transaction includes receiving, from a first corporate entity, a request for payment from a second corporate entity. The payment request is provided to the second corporate entity, and a payment from the second entity is received in response. The payment is then provided to the first corporate entity. In some embodiments, a fee may be charged to the first entity, the second entity, or both for effecting the payment transaction, and such fees need not be the same. Payment transaction may be facilitated between any number of different entities in the network.

Payment transactions between corporate entities in a network may be monitored for a variety of purposes, such as to display a history of transactions between two connected entities. In some embodiments, the credibility rating of a corporate entity may be updated (5050) based on criteria such as a single transaction between the entity and another entity in the network and/or the entity's payment transaction history with multiple entities. The updated credibility rating may then be displayed in the entity's profile (5055).

In cases where the terms of an agreement between two or more entities are received by the embodiments of the present disclosure (5040), the credibility rating for an entity may be updated based on satisfaction of the agreement terms as they apply to the entity's payment transactions. For example, consider a first corporate entity that has a supply contract agreement with a second corporate entity with terms that specify that (1) the first entity shall purchase at least 100 widgets per month for 12 months, and (2) the first entity shall provide payment by the last day of each month. The credibility rating of the first entity may be raised after each monthly transaction where the first corporate entity purchases at least 100 widgets and pays for the widgets in full by the last day of the month. Conversely, the credibility rating for the first entity may be lowered where the first entity fails to purchase 100 widgets in a given month, fails to provide payment by the end of the month, or both. In this manner, embodiments of the present disclosure can dynamically maintain the credibility rating of an entity in the network by updating the rating after each transaction, after a predetermined number of transactions have occurred, over a predetermined period of time, or a combination thereof.

In some cases, a system for inter-company payments may enable two entities, such as a company or other, similar organization, to connect in a virtual space, whether or not they have been working together. One company has, in this virtual space area, a page or other area of data available to users of the system, including data such as, for example, name, address and other identifiers, and also, in particular, a rating of credibility that is based, for example, on such criteria as certification by an approved agent, payment verifications, directionality of payments to other companies in the system, a prior successful payment by an entity in the system, directionality of interactions with other entities in the system, etc. When another company wants to enter into business with the first company, the other company can access the first company's data and use the credibility rating to decide whether to use the system to connect with the first company. In further cases, the request by the first company must be approved by the second company, and also, the request may have an attached payment. Additionally, a final confirmation by the first company may be required to enable the connection and/or payment.

Figure 51:
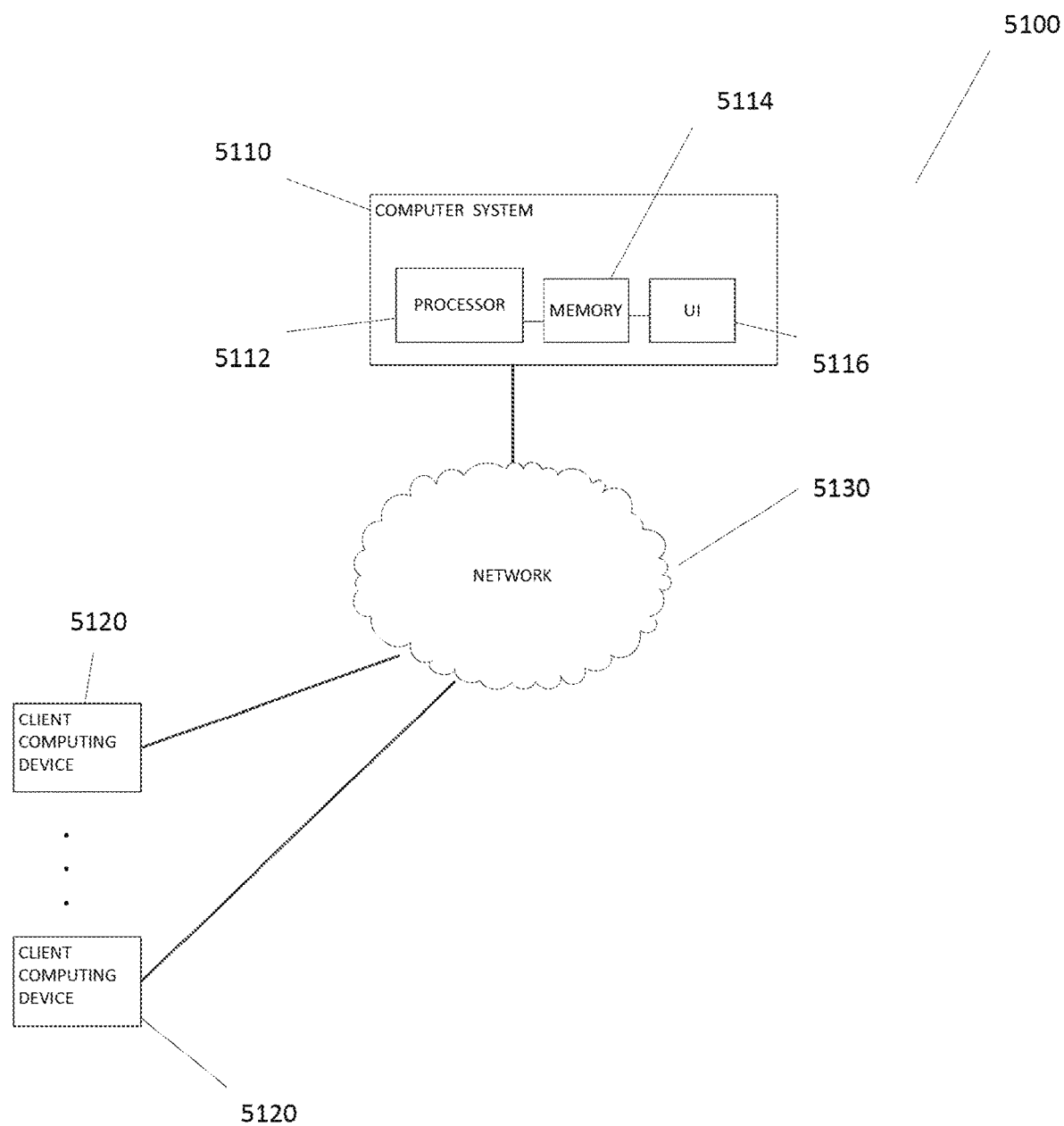
FIG. 51 is a block diagram of an exemplary system according to various aspects of the present disclosure.

FIG. 51 is a block diagram of an exemplary system according to various aspects of the present disclosure. While FIG. 51 illustrates various components of a computer system, it is not intended to represent any particular architecture or manner of interconnecting the components. Other systems that have fewer or more components may also be used.

In FIG. 51, the system 5100 includes a computer system 5110 comprising a processor 5112, memory 5114, and user interface 5116. Computer system 5110 may include any number of different processors, memory components, and user interface components, and may interact with any other desired systems and devices in conjunction with embodiments of the present disclosure.

The functionality of the computer system 5110, including the steps of the methods described above (in whole or in part), may be implemented through the processor 5112 executing computer-readable instructions stored in the memory 5114 of the system 5110. The memory 5114 may store any computer-readable instructions and data, including software applications, applets, and embedded operating code. Portions of the functionality of the methods described herein may also be performed via software operating on one or more of the client computing devices 5120.

The functionality of the system 5110 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 5112 retrieves and executes instructions stored in the memory 5114 to control the operation of the system 5110. Any type of processor, such as an integrated circuit microprocessor, microcontroller, and/or digital signal processor (DSP), can be used in conjunction with embodiments of the present disclosure. A memory 5114 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 5114 in any desired manner, such as in a relational database.

The system 5110 includes a user interface 5116 that may include any number of input devices (not shown) to receive commands, data, and other suitable input. The user interface 5116 may also include any number of output devices (not shown) to provides the user with data, notifications, and other information. Typical I/O devices may include mice, keyboards, modems, network interfaces, printers, scanners, video cameras and other devices.

The system 5110 may communicate with one or more client computing devices 5120, as well as other systems and devices in any desired manner, including via network 5130. The computer system 5110 and/or client computing devices 5120 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 5130 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware. Further, the terms "screen," "window," "display," etc. may be used interchangeably.

Changes and modifications may be made to the disclosed embodiments without departing from the scope of the present disclosure. These and other changes or modifications are intended to be included within the scope of the present disclosure, as expressed in the following claims.

What is claimed is:

1. A computer-implemented method comprising:
   communicating, by a computer system, a connection request to a first corporate entity, the connection request includes an invitation, by a second corporate entity, for the first corporate entity to join a network of corporate entities, a corporate entity being a business organization, the second corporate entity being included in the network of corporate entities;
   determining, by the computer system, that the first corporate entity has confirmed the connection request to join the network of corporate entities based in part on the first corporate entity accessing a uniform resource locator provided in association with the connection request;
   based at least in part on the determining, connecting, by the computer system, the first corporate entity with the network of corporate entities; and
   in response to the connecting, causing the first corporate entity to have access to information associated with each corporate entity, of the network of corporate entities, the connecting further enabling network interaction between the first corporate entity and the network of corporate entities.

2. The method of claim 1, wherein the uniform resource locator is selectable for the first corporate entity to view a corporate profile of the second network entity.

3. The method of claim 1, wherein the communication of the connection request is based on the first corporate entity being selected among a vendor list or customer list, and wherein the communication of the connection request is further based on a selection of an invite button.

4. The method of claim 1, wherein the connecting of the first corporate entity with the network of corporate entities is further based on a selection of a connect button.

5. The method of claim 1, further comprising: subsequent to the connecting, identifying whether the first corporate entity is a new customer, an existing customer, or a vendor to the second corporate entity.

6. The method of claim 1, further comprising:
   prior to the communication of the connection request, causing presentation, at a device associated with the second corporate entity, profile data of the first corporate entity; and
   in response to the connecting of the first corporate entity with the network of corporate entities, causing presentation, at the device, of additional profile data that was not among the profile data prior to the connecting.

7. The method of claim 1, further comprising in response to the connecting of the first corporate entity with the network of corporate entities, generating metadata, wherein the metadata includes one or more of: when the connection was established, who requested the connection, a number of transactions completed by the connected entities, a dollar amount of the transactions, and a set of goods and services exchanged between the connected corporate entities.

8. The method of claim 1, wherein the first corporate entity instructs a programming interface for accounting software utilized by the second corporate entity to reflect a payment transaction between the first corporate entity and the second corporate entity based on the first corporate entity joining the network of corporate entities.

9. The method of claim 1, further comprising:
receiving terms defining an agreement between the first corporate entity and the second corporate entity that applies to a payment transaction between the first corporate entity and the second corporate entity;
updating a credibility rating of the first corporate entity based on satisfaction of the terms in the agreement by the first corporate entity; and
associating the updated credibility rating with a profile of the first corporate entity.

10. A tangible non-transitory, computer-readable medium storing instructions that, when executed by a computer system, instructions comprising:
communicating, by a computer system, a connection request to a first corporate entity, the connection request includes an invitation for the first corporate entity to join a network of corporate entities, a corporate entity being a business organization;
determining, by the computer system, that the first corporate entity has confirmed the connection request to join the network of corporate entities based in part on the first corporate entity accessing a uniform resource locator provided in association with the connection request;
based at least in part on the determining, connecting, by the computer system, the first corporate entity with the network of corporate entities;
in response to the connecting, causing the first corporate entity to have access to information associated with each corporate entity, of the network of corporate entities, the connecting further enabling network interaction between the first corporate entity and the network of corporate entities; and
in response to the connecting, generating metadata, wherein the metadata includes one or more of: when the connection was established, who requested the connection, a number of transactions completed by the connected entities, a dollar amount of the transactions, and a set of goods and services exchanged between the connected corporate entities.

11. The computer-readable medium of claim 10, wherein the communication of the connection request is based on the first corporate entity being selected among a vendor list or customer list, and wherein the communication of the connection request is further based on a selection of an invite button.

12. The computer-readable medium of claim 10, further comprising:
updating a credibility rating of the first corporate entity based on the payment transaction between the first corporate entity and a second corporate entity; and
associating the updated credibility rating with a profile of the first corporate entity.

13. The computer-readable medium of claim 10, wherein the connecting of the first corporate entity with the network of corporate entities is further based on a selection of a connect button.

14. The computer-readable medium of claim 10, further comprising subsequent to the connecting, identifying whether the first corporate entity is a new customer, an existing customer, or a vendor to the second corporate entity.

15. The computer-readable medium of claim 10, further comprising:
prior to the communication of the connection request, causing presentation, at a device associated with a second corporate entity, of the network of corporate entities, profile data of the first corporate entity; and
in response to the connecting of the first corporate entity with the network of corporate entities, causing presentation, at the device, of additional profile data that was not among the profile data prior to the connecting.

16. A system comprising:
at least one processor; and
memory in communication with the at least one processor and storing instructions that, when executed by the processor, cause the system to:
causing presentation, at a device associated with a second corporate entity, of profile data of a first corporate entity;
communicating, by a computer system, a connection request to the first corporate entity, the connection request includes an invitation for the first corporate entity to join a network of corporate entities, the network of corporate entities including the second corporate entity, each corporate entity being a business organization;
determining, by the computer system, that the first corporate entity has confirmed the connection request to join the network of corporate entities based in part on the first corporate entity accessing a uniform resource locator provided in association with the connection request;
based at least in part on the determining, connecting, by the computer system, the first corporate entity with the network of corporate entities;
in response to the connecting, causing the first corporate entity to have access to information associated with the second corporate entity, the connecting further enabling network interaction between the first corporate entity and the network of corporate entities; and in response to the connecting, causing presentation, at the device, of additional information in the profile data.

17. The system of claim 16, wherein the communication of the connection request is based on the first corporate entity being selected among a vendor list or customer list, and wherein the communication of the connection request is further based on a selection of an invite button.

18. The system of claim 16, wherein the system is further caused to: in response to the connecting of the first corporate entity with the network of corporate entities, generating metadata, wherein the metadata includes one or more of: when the connection was established, who requested the connection, a number of transactions completed by the connected entities, a dollar amount of the transactions, and a set of goods and services exchanged between the connected corporate entities.

* * * * *